US012601034B2

(12) United States Patent
Holcomb et al.

(10) Patent No.: US 12,601,034 B2
(45) Date of Patent: Apr. 14, 2026

(54) SYSTEM AND METHOD FOR MANUFACTURING A PART

(71) Applicant: Grid Logic Incorporated

(72) Inventors: Matthew J. Holcomb, Metamora, MI (US); Ira J. Holcomb, Jr., Shelby Township, MI (US)

(73) Assignee: Grid Logic Incorporated, Lapeer, MI (US)

( * ) Notice: Subject to any disclaimer, the term of this patent is extended or adjusted under 35 U.S.C. 154(b) by 747 days.

(21) Appl. No.: 17/818,903

(22) Filed: Aug. 10, 2022

(65) Prior Publication Data

US 2022/0379377 A1 Dec. 1, 2022

Related U.S. Application Data

(62) Division of application No. 16/751,009, filed on Jan. 23, 2020, now Pat. No. 11,446,739, which is a
(Continued)

(51) Int. Cl.
*B22F 10/10* (2021.01)
*B22F 3/10* (2006.01)
(Continued)

(52) U.S. Cl.
CPC .............. *C22C 1/04* (2013.01); *B22F 3/1039* (2013.01); *B22F 3/105* (2013.01); *B22F 3/24* (2013.01); *B22F 10/16* (2021.01); *B22F 12/52* (2021.01); *B22F 12/53* (2021.01); *B22F 12/55* (2021.01); *B33Y 10/00* (2014.12); *B33Y 30/00* (2014.12); *B33Y 50/02* (2014.12); *B33Y 70/00* (2014.12); *B33Y 70/10* (2020.01); *C22C 29/00*

(2013.01); *C22C 32/00* (2013.01); *B22F 2003/1053* (2013.01); *B22F 2003/247* (2013.01); *B22F 10/66* (2021.01); *B22F 12/90* (2021.01);
(Continued)

(58) Field of Classification Search
CPC ....................................... B22F 10/16
See application file for complete search history.

(56) References Cited

U.S. PATENT DOCUMENTS 2,622,238 A 12/1952 Boltson
2,870,418 A 1/1959 Hewitt, Jr.
(Continued)

FOREIGN PATENT DOCUMENTS

DE 102008027315 A1 12/2009
DE 1020080027315 A1 12/2009
(Continued)

OTHER PUBLICATIONS

"Communication Pursuant to Article 94(3) EPC mailed on Jul. 23, 2020", European Patent Application No. 17748302.1, (7 pages).
(Continued)

*Primary Examiner* — Christopher S Kessler
(74) *Attorney, Agent, or Firm* — Stephen M. De Klerk

(57) ABSTRACT

The invention relates to a manufacturing system and method for manufacturing a part. A negative powder forms a holder suitable to hold particles of a positive powder in proximity to one another. A connection scheme such as heating, the use of pressure and/or a binder, when employed, connects the particles to one another to form the part.

21 Claims, 42 Drawing Sheets

Heated Portion

No Heating

Diameter

Skin Depth

Bulk Heating

Diameter

Skin Depth

Surface Heating

Related U.S. Application Data division of application No. 15/424,609, filed on Feb. 3, 2017, now Pat. No. 10,576,542.

(60) Provisional application No. 62/400,944, filed on Sep. 28, 2016, provisional application No. 62/379,808, filed on Aug. 26, 2016, provisional application No. 62/357,465, filed on Jul. 1, 2016, provisional application No. 62/290,533, filed on Feb. 3, 2016.

(51) Int. Cl.

| | |
|---|---|
| *B22F 3/105* | (2006.01) |
| *B22F 3/24* | (2006.01) |
| *B22F 10/16* | (2021.01) |
| *B22F 12/52* | (2021.01) |
| *B22F 12/53* | (2021.01) |
| *B22F 12/55* | (2021.01) |
| *B33Y 10/00* | (2015.01) |
| *B33Y 30/00* | (2015.01) |
| *B33Y 50/02* | (2015.01) |
| *B33Y 70/00* | (2020.01) |
| *B33Y 70/10* | (2020.01) |
| *C22C 1/04* | (2023.01) |
| *C22C 29/00* | (2006.01) |
| *C22C 32/00* | (2006.01) |
| *B22F 10/66* | (2021.01) |
| *B22F 12/90* | (2021.01) |

(52) U.S. Cl.
CPC ....... *B22F 2998/10* (2013.01); *B22F 2999/00* (2013.01); *Y02P 10/25* (2015.11)

(56) References Cited

U.S. PATENT DOCUMENTS

| | | | |
|---|---|---|---|
| 3,241,956 A | 3/1966 | Inoue | |
| 3,427,710 A | 2/1969 | Williams | |
| 3,704,600 A | 12/1972 | Prast et al. | |
| 4,087,322 A | 5/1978 | Marcus | |
| 4,231,796 A | 11/1980 | Clark et al. | |
| 4,255,494 A | 3/1981 | Reen et al. | |
| 4,305,784 A | 12/1981 | Ohkawa | |
| 4,521,659 A | 6/1985 | Buckley et al. | |
| 4,528,532 A | 7/1985 | Keim | |
| 4,688,132 A | 8/1987 | Dustman | |
| 4,785,243 A | 11/1988 | Abramczyk et al. | |
| 5,076,869 A | 12/1991 | Bourell et al. | |
| 5,147,587 A | 9/1992 | Marcus et al. | |
| 5,389,408 A | 2/1995 | Devolk | |
| 5,446,379 A | 8/1995 | Machi | |
| 5,555,481 A | 9/1996 | Rock et al. | |
| 5,640,667 A | 6/1997 | Freitag et al. | |
| 5,675,306 A | 10/1997 | Diaz | |
| 5,874,713 A | 2/1999 | Cydzik | |
| 5,963,771 A | 10/1999 | Chan et al. | |
| 5,965,282 A | 10/1999 | Baermann | |
| 5,965,959 A | 10/1999 | Gamble et al. | |
| 6,031,215 A | 2/2000 | Nanataki et al. | |
| 6,046,426 A * | 4/2000 | Jeantette | B33Y 30/00 |
| | | | 219/121.84 |
| 6,066,285 A | 5/2000 | Kumar | |
| 6,069,479 A | 5/2000 | Taicher et al. | |
| 6,078,781 A | 6/2000 | Takagi et al. | |
| 6,150,809 A | 11/2000 | Tiernan et al. | |
| 6,157,094 A | 12/2000 | Gamble et al. | |
| 6,417,754 B1 | 7/2002 | Bernhardt et al. | |
| 6,489,701 B1 | 12/2002 | Gamble et al. | |
| 6,533,995 B1 | 3/2003 | Wullenweber et al. | |
| 6,664,875 B2 | 12/2003 | Yuan et al. | |
| 6,809,618 B2 | 10/2004 | Leghissa et al. | |
| 6,875,966 B1 | 4/2005 | Barber et al. | |
| 7,038,178 B2 | 5/2006 | Suzuki | |

| | | | | |
|---|---|---|---|---|
| 7,378,376 B2 | 5/2008 | Holcomb | | |
| 7,723,653 B2 | 5/2010 | Clark et al. | | |
| 7,767,941 B2 | 8/2010 | Kagan | | |
| 7,864,013 B2 | 1/2011 | Muelleman | | |
| 8,316,683 B2 | 11/2012 | Tomizawa et al. | | |
| 8,334,747 B2 | 12/2012 | Matsumoto | | |
| 8,382,834 B2 | 2/2013 | Prescott | | |
| 8,444,800 B2 | 5/2013 | Nagaura et al. | | |
| 8,606,160 B2 | 12/2013 | Nakase et al. | | |
| 8,732,939 B2 | 5/2014 | Uchida | | |
| 8,738,147 B2 | 5/2014 | Hasints | | |
| 9,261,573 B1 | 2/2016 | Radparvar et al. | | |
| 9,457,403 B2 | 10/2016 | Holcomb | | |
| 9,636,868 B2 | 5/2017 | Crump et al. | | |
| 10,259,072 B2 | 4/2019 | Holcomb | | |
| 10,576,542 B2 | 3/2020 | Holcomb et al. | | |
| 11,135,643 B2 | 10/2021 | Holcomb et al. | | |
| 11,198,178 B2 | 12/2021 | Xu et al. | | |
| 11,446,739 B2 | 9/2022 | Holcomb et al. | | |
| 11,813,672 B2 | 11/2023 | Holcomb et al. | | |
| 2001/0050448 A1 | 12/2001 | Kubo et al. | | |
| 2002/0105114 A1 | 8/2002 | Kubo et al. | | |
| 2002/0121953 A1 | 9/2002 | Ries et al. | | |
| 2002/0171521 A1 | 11/2002 | Ries | | |
| 2003/0024916 A1 | 2/2003 | Wright et al. | | |
| 2004/0099983 A1 | 5/2004 | Dirscherl | | |
| 2004/0189427 A1 | 9/2004 | Leghissa et al. | | |
| 2004/0191406 A1 | 9/2004 | Crum et al. | | |
| 2004/0192558 A1 | 9/2004 | Holcomb | | |
| 2004/0222789 A1 | 11/2004 | Pinsky et al. | | |
| 2005/0253594 A1 | 11/2005 | Eberhardt et al. | | |
| 2006/0124631 A1 | 6/2006 | Alfredeen | | |
| 2007/0022823 A1 | 2/2007 | Knill et al. | | |
| 2007/0085534 A1 | 4/2007 | Seki et al. | | |
| 2007/0235445 A1 | 10/2007 | Wilgen et al. | | |
| 2007/0241482 A1 | 10/2007 | Giller et al. | | |
| 2008/0145566 A1 | 6/2008 | Cretegny et al. | | |
| 2009/0085511 A1 | 4/2009 | Meinke et al. | | |
| 2009/0295407 A1 | 12/2009 | Blew et al. | | |
| 2010/0015002 A1 | 1/2010 | Barrera et al. | | |
| 2011/0297658 A1 | 12/2011 | Peters et al. | | |
| 2013/0189385 A1 | 7/2013 | Zoppas et al. | | |
| 2014/0163717 A1 | 6/2014 | Das et al. | | |
| 2014/0228671 A1 | 8/2014 | Subramaniam et al. | | |
| 2014/0314964 A1 | 10/2014 | Ackelid | | |
| 2014/0361464 A1 | 12/2014 | Holcomb | | |
| 2015/0008928 A1 | 1/2015 | Miles et al. | | |
| 2015/0296571 A1 | 10/2015 | Holcomb | | |
| 2015/0322799 A1 | 11/2015 | Xu | | |
| 2015/0329659 A1 | 11/2015 | Brown et al. | | |
| 2015/0367448 A1 | 12/2015 | Buller et al. | | |
| 2016/0375523 A1 * | 12/2016 | Killian | B23K 26/144 |
| | | | 219/601 |
| 2017/0072614 A1 | 3/2017 | Lind et al. | | |
| 2017/0173887 A1 | 6/2017 | Myerberg et al. | | |
| 2017/0216915 A1 | 8/2017 | Holcomb et al. | | |
| 2018/0154573 A1 | 6/2018 | Miles | | |
| 2019/0047089 A1 | 2/2019 | Reimann | | |

FOREIGN PATENT DOCUMENTS

| | | |
|---|---|---|
| DE | 102010038249 | 4/2012 |
| JP | 2001-047520 A | 2/2001 |

OTHER PUBLICATIONS

"Extended European Search Report issued on Jul. 19, 2019", European Patent Application No. 17748302.1, (10 pages).

"Final Office Action mailed on Dec. 13, 2018", U.S. Appl. No. 14/502,665, (7 pages).

"Final Office Action mailed on Feb. 19, 2019", U.S. Appl. No. 15/167,257, (18 pages).

"Final Office Action mailed on Mar. 25, 2021", U.S. Appl. No. 16/202,453, (16 pages).

"First Office Action mailed on Mar. 3, 2020 with English translation", Chinese Patent Application No. 201780008924.8, (47 pages).

"International Search Report and Written Opinion mailed on Dec.

(56) References Cited

OTHER PUBLICATIONS 31, 2014", International Patent Application No. PCT/US14/58389 with International Filing Date of Sep. 30, 2014, (8 pages).

"International Search Report and Written Opinion mailed on May 11, 2022", International Patent Application No. PCT/US2021/031402, (18 pages).

"International Search Report and Written Opinion mailed on May 25, 2017", International PCT Patent Application No. PCT/US201/016574 with International Filing Date of Feb. 3, 2017, (17 pages).

"Invitation to Pay Additional Fees p PCT Article 17(3)(a) and Rules 40.1 and 40.2(e) mailed on Apr. 2, 2017", International PCT Patent Application No. PCT/US17/16574 with International Filing Date of Feb. 3, 2017, (3 pages).

"Materials safety data sheet for carbon nanotubes", supplied by Cheap Tubes Inc. Revision Date: Apr. 13, 2015, (9 pages).

"Non Final Office Action mailed on Feb. 22, 2018", U.S. Appl. No. 14/459,096, (10 pages).

"Non Final Office Action mailed on Jun. 12, 2017", U.S. Appl. No. 14/300,621, (9 pages).

"Non Final Office Action mailed on Oct. 26, 2020", U.S. Appl. No. 16/202,453, (23 pages).

"Non Final Office Action mailed on Oct. 27, 2021", U.S. Appl. No. 16/751,009, (7 pages).

"Physical properties of titanium and its alloys", Total Materia. http://www.totalmateria.com/Articles122.htm. Published May 2005. Accessed Dec. 29, 2016., (2 pages).

Agarwal, D. , "Microwave sintering of ceramics, composites and metal powders. Sintering of advanced materials", Woodhead Publishing. 2010. (Year: 2010), pp. 222-248.

Popovic, Zoya , et al., "The Skin Effect, Introductory Electromagnetics", Chapter 20, Prentice-Hall. (Year: 1999), pp. 382-392.

"Extended European Search Report issued on May 28, 2024", European Patent Application No. 24160432.1, (10 pages).

"Non Final Office Action mailed on Mar. 8, 2023", U.S. Appl. No. 17/315,093, (12 pages).

Anonymous , "Promoting Power Metallurgy Technology Introduction to Additive Manufacturing Technology", XP055295594, Retrieved from the Internet: URL:http://www.sf2m.asso.fr/Commissions Thematiques/DocComThematiques/EPMA_Additive_Manufacturing. pdf [retrieved on Aug. 16, 2016] * sections 2.2 and 2.3 *, Apr. 1, 2013, (44 pages).

* cited by examiner

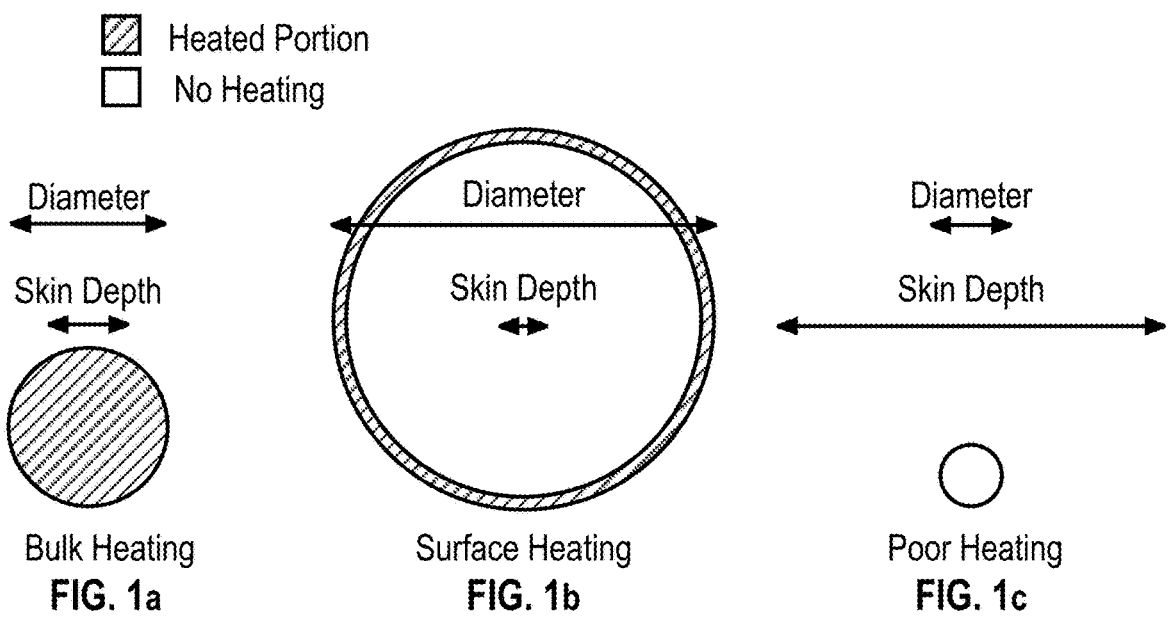
Bulk Heating
FIG. 1a
Surface Heating
FIG. 1b
Poor Heating
FIG. 1c
Power transfer factor versus the "electrical dimension"
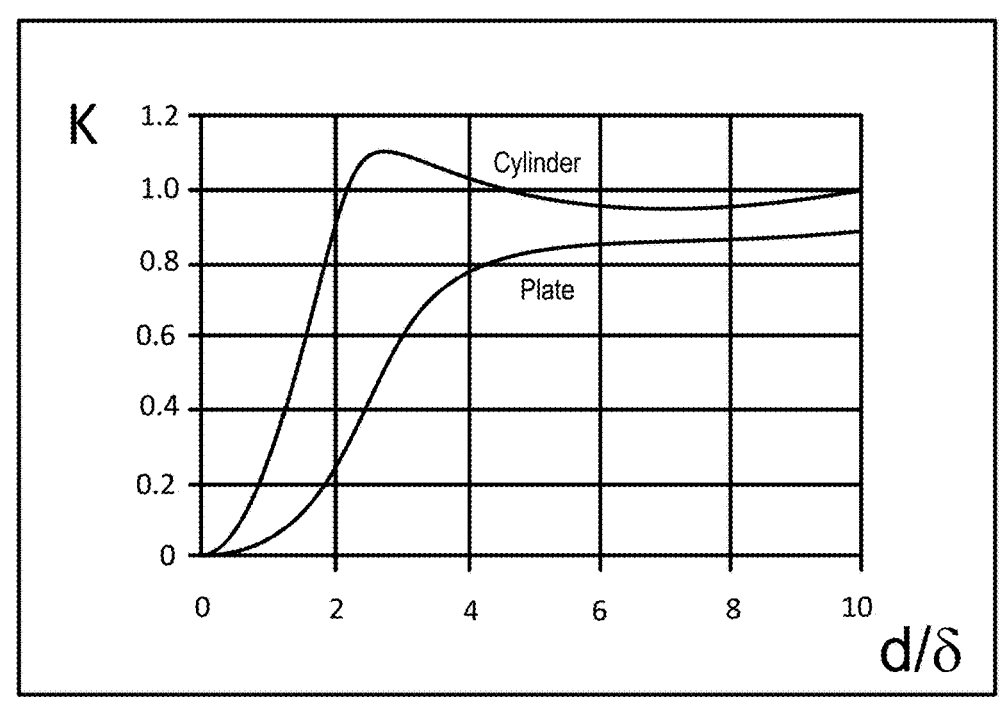
FIG 2

FIG. 3a
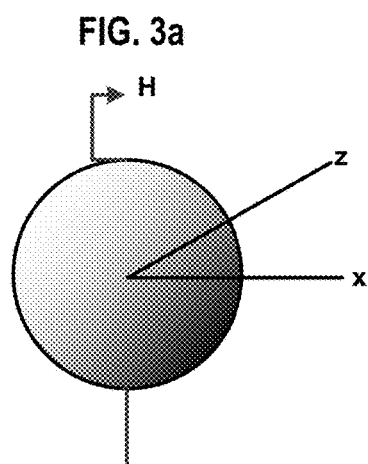
FIG. 3b
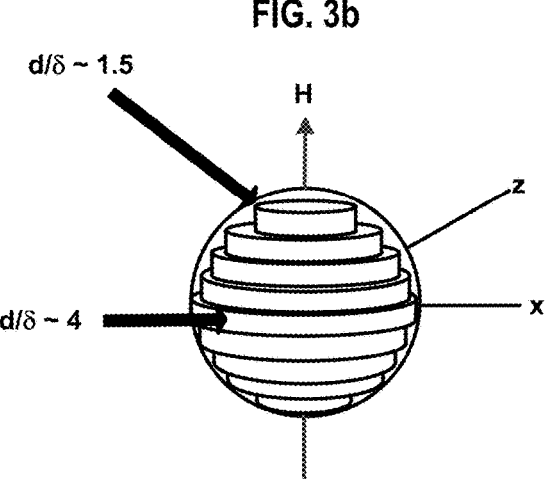
FIG. 3c
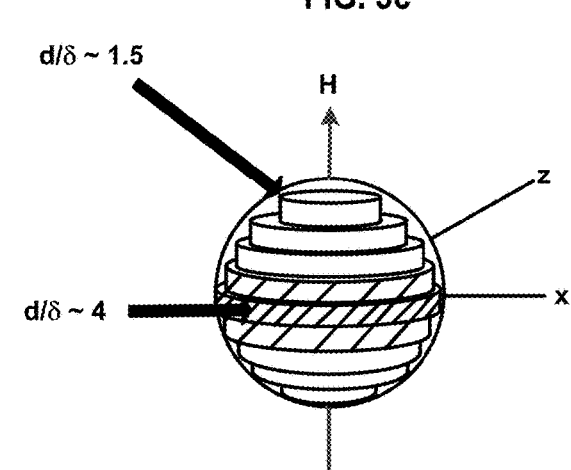
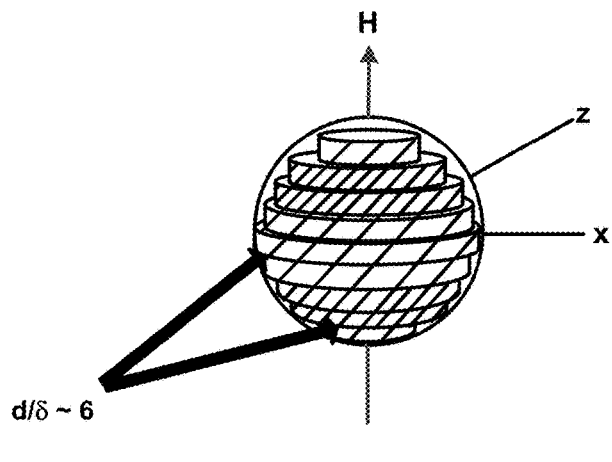
FIG. 4

MIS-FC flux density vs. frequency with a variety of capacitance values

Normalized MgB$_2$/Ga ScNc particle size distribution

Geldart classification scheme for powders

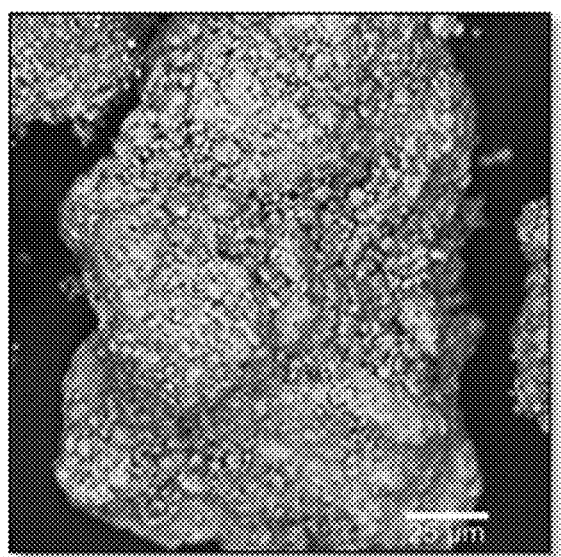 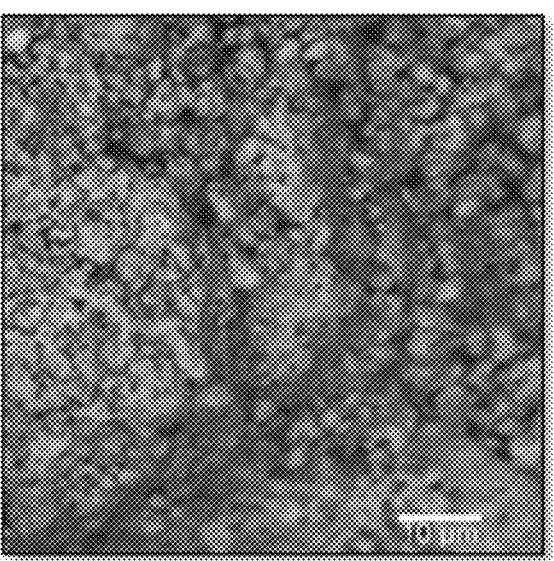
FIG. 21
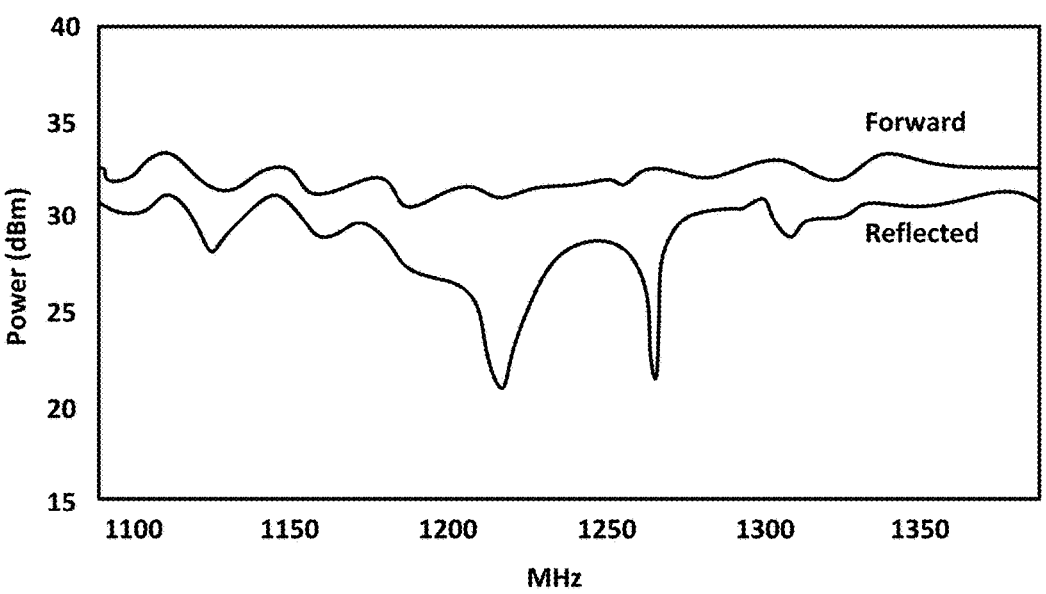
FIG. 22

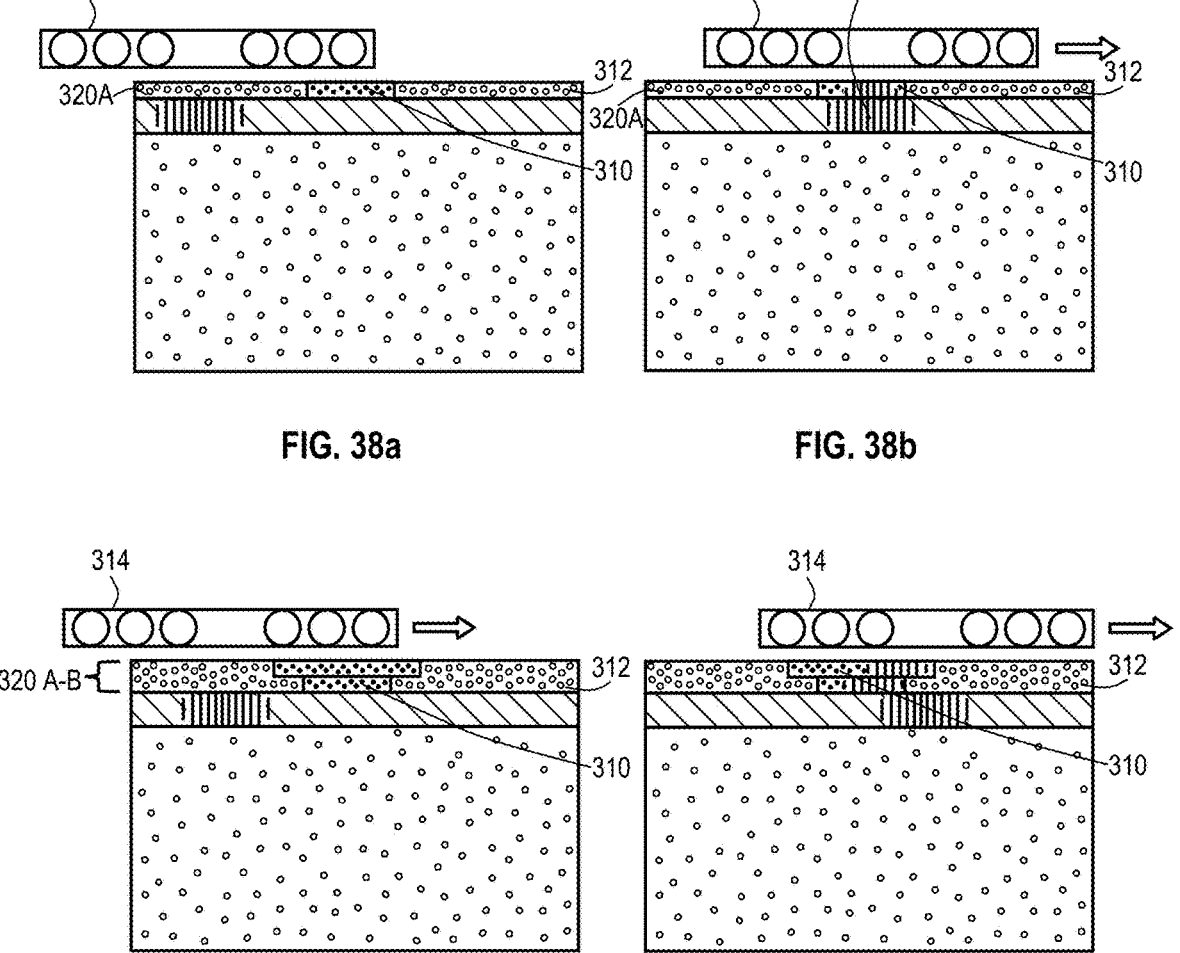
FIG. 38a                    FIG. 38b
FIG. 38c                    FIG. 38d

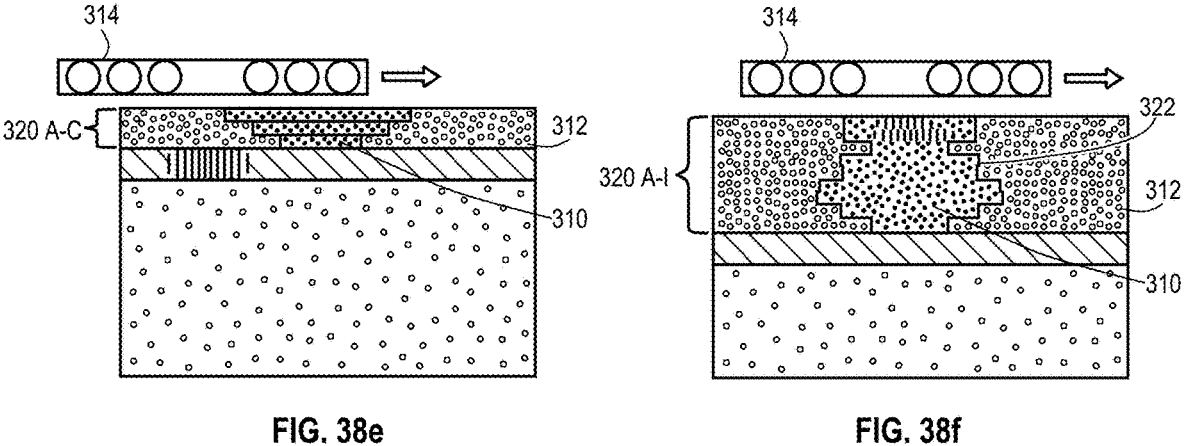
FIG. 38e
FIG. 38f
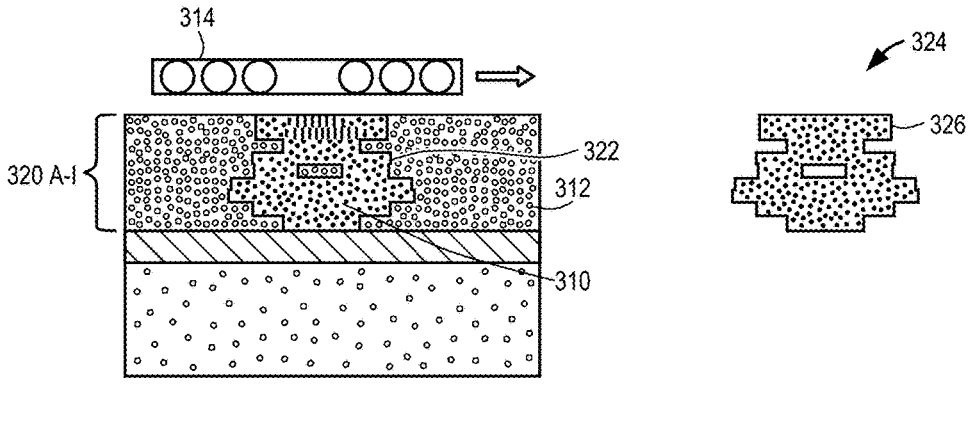
FIG. 38g
FIG. 38h

332

330

330

328

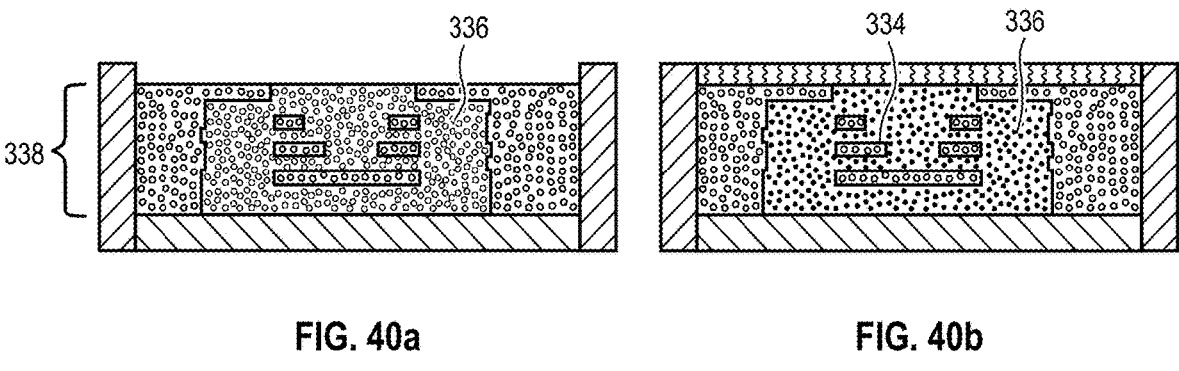
FIG. 40a                    FIG. 40b
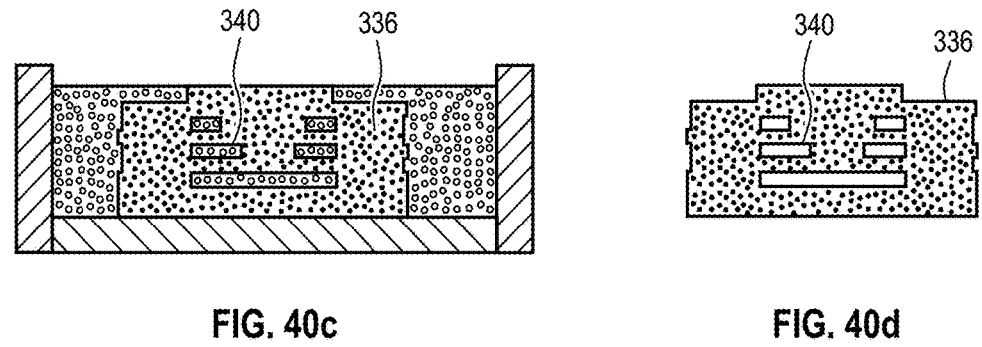
FIG. 40c                    FIG. 40d
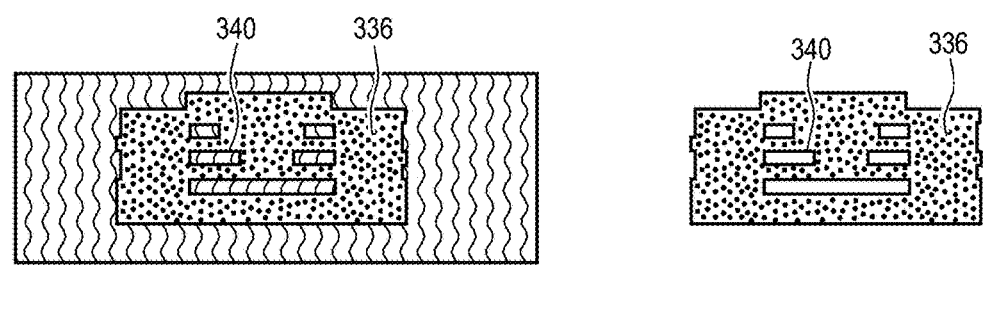
FIG. 40e                    FIG. 40f

FIG. 43a          FIG. 43b
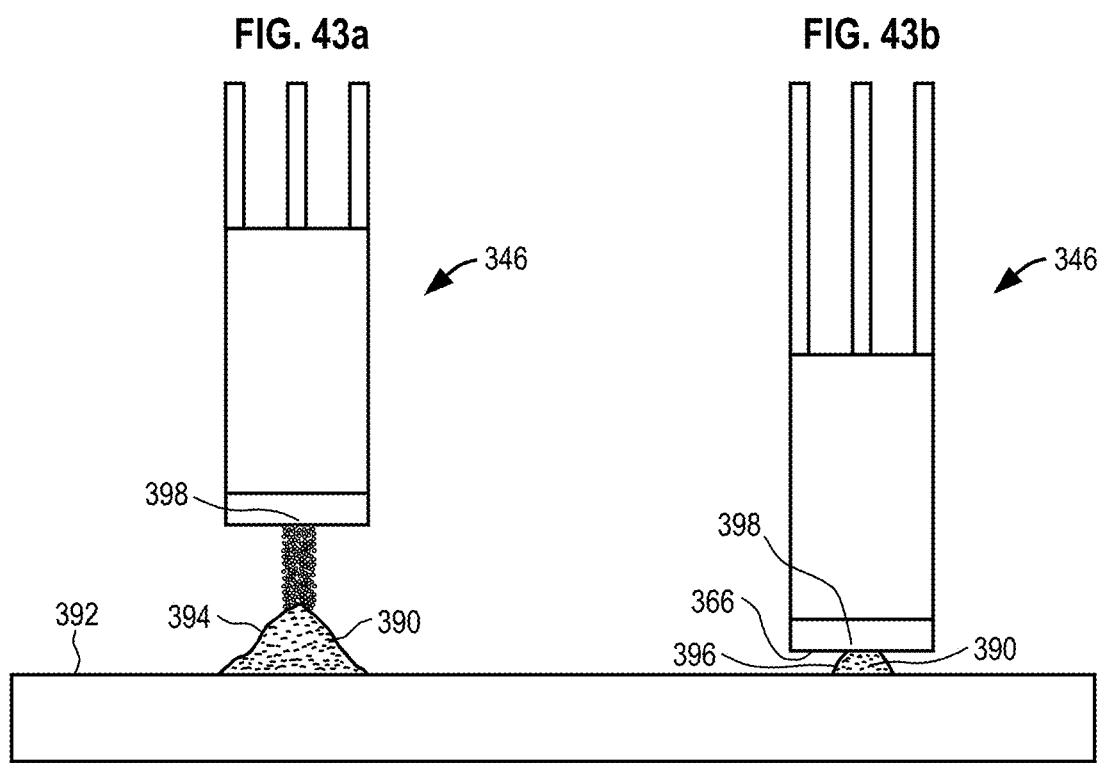
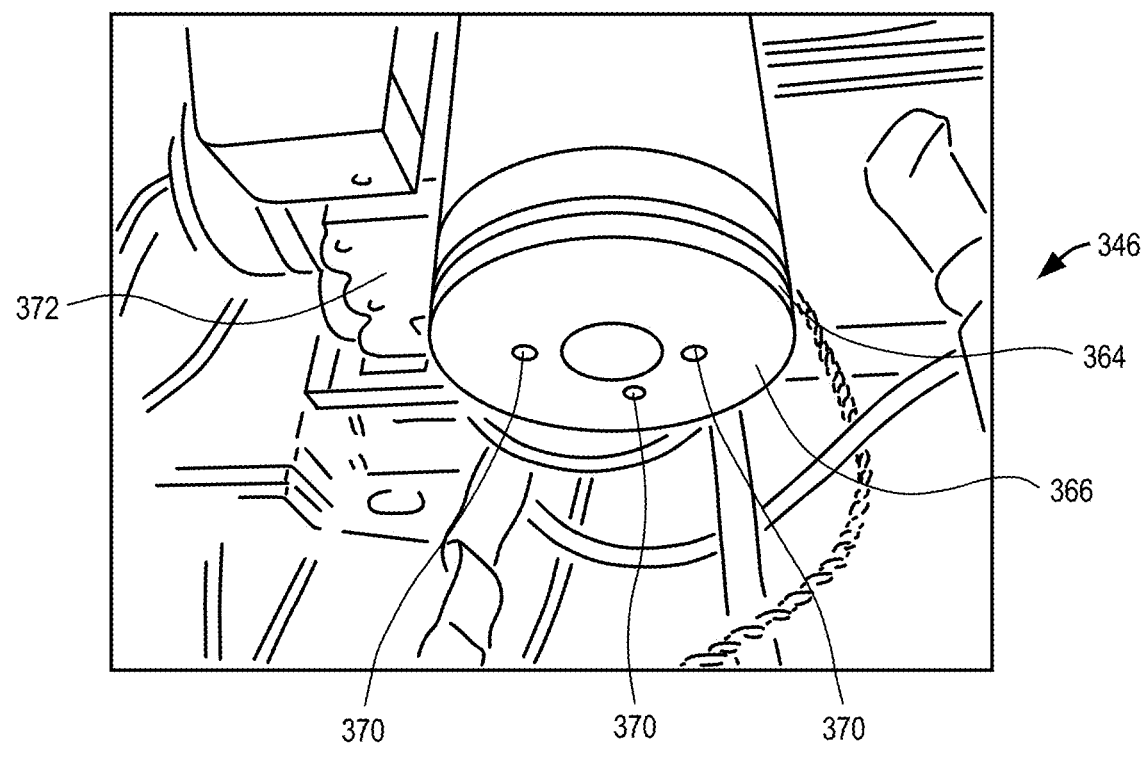
FIG. 44

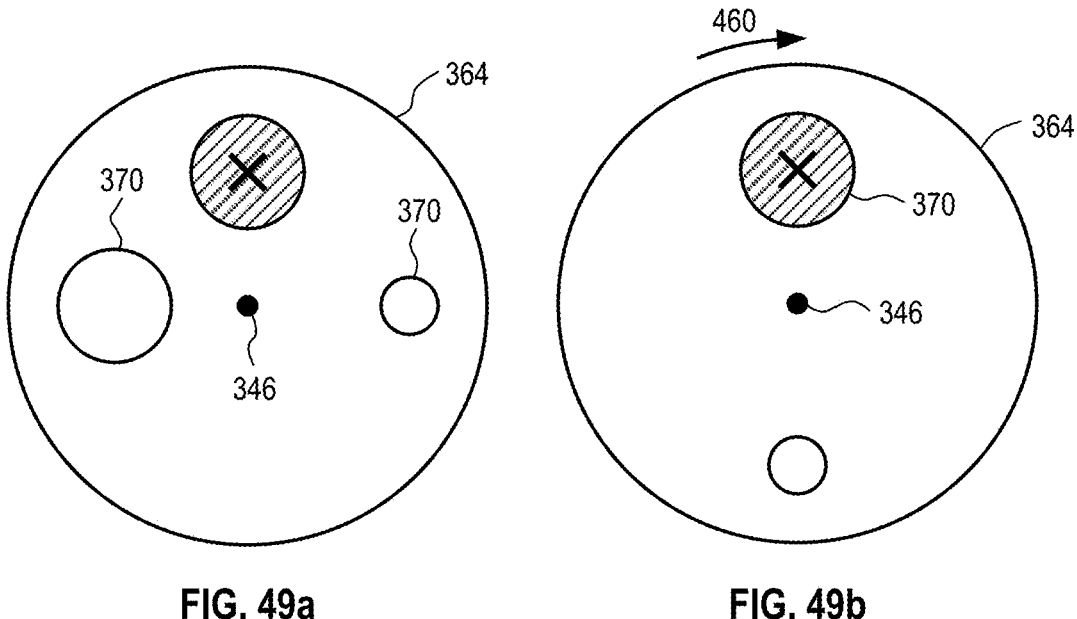
FIG. 49a                    FIG. 49b
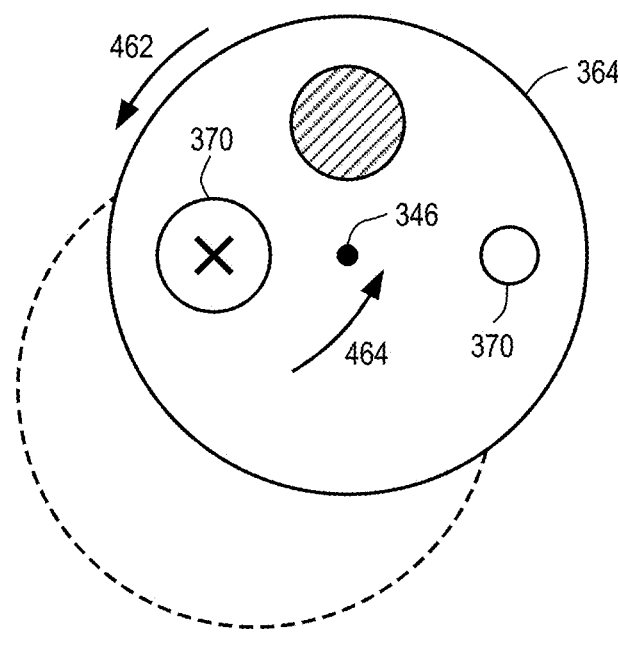
FIG. 49c

CAD Model

AM Tool Path

Heating / Sintering

OPL Print

Infiltration If Necessary

Near Net Shape Part

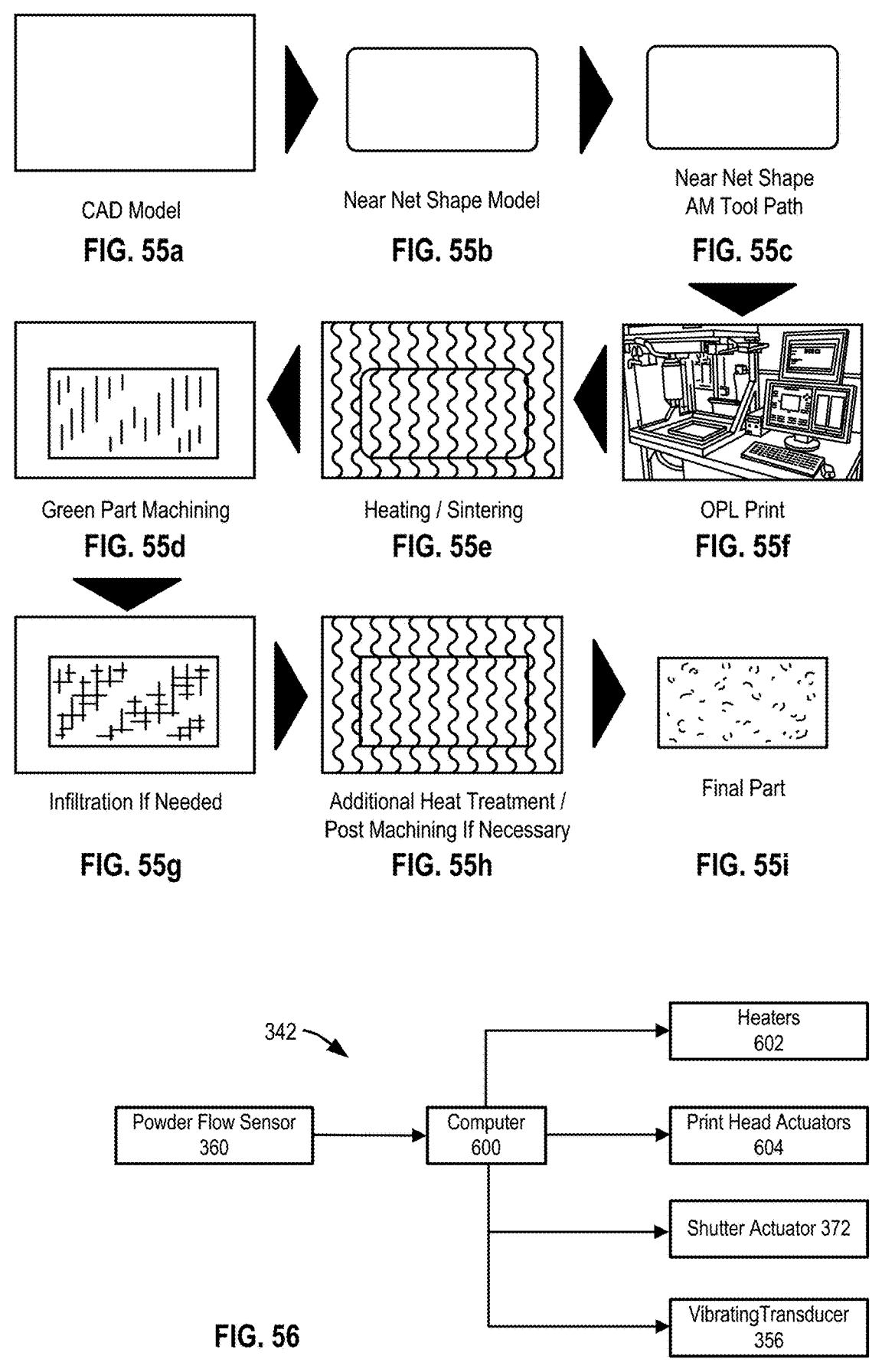

CAD Model

FIG. 55a

Near Net Shape Model

FIG. 55b

Near Net Shape
AM Tool Path

FIG. 55c

Green Part Machining

FIG. 55d

Heating / Sintering

FIG. 55e

OPL Print

FIG. 55f

Infiltration If Needed

FIG. 55g

Additional Heat Treatment /
Post Machining If Necessary

FIG. 55h

Final Part

| Powder Flow Sensor 360 | → | Computer 600 | → | Heaters 602 |
| | | | → | Print Head Actuators 604 |
| | | | → | Shutter Actuator 372 |
| | | | → | VibratingTransducer 356 |

FIG. 56

SYSTEM AND METHOD FOR MANUFACTURING A PART

CROSS-REFERENCE TO RELATED APPLICATIONS

This application is a divisional of U.S. patent application Ser. No. 16/751,009, filed on Jan. 23, 2020, which is a divisional of U.S. patent application Ser. No. 15/424,609, filed on Feb. 3, 2017 now U.S. Pat. No. 10,576,542, which claims priority from U.S. Provisional Patent Application No. 62/290,533, filed on Feb. 3, 2016; U.S. Provisional Patent Application No. 62/357,465, filed on Jul. 1, 2016; U.S. Provisional Patent Application No. 62/379,808, filed on Aug. 26, 2016 and U.S. Provisional Patent Application No. 62/400,944, filed on Sep. 28, 2016, each of which are incorporated herein by reference in their entirety.

BACKGROUND OF THE INVENTION

1). Field of the Invention

This invention relates to a system and method for manufacturing a part.

2). Discussion of Related Art

It has become common place to fabricate three-dimensional components using Computer Numerical Control (CNC) systems. State of the art solid freeform fabrication (SFF) methods span a number of technologies including stereolithography, 3D printing, selective laser sintering, direct metal deposition, electron beam melting, and microplasma powder deposition. Thermoplastic-based SFF technologies allow designers to verify product design with three-dimensional models at an early stage, but are not capable of fabricating high-strength end products. In principle, metal-based SFF technologies allow for the rapid manufacture of structurally sound, dimensionally accurate metallic parts directly from computer aided design (CAD) models. Laser-based SFF technologies (e.g. DMD and SLS) are highly dependent on specific process parameters to achieve structurally sound parts. These process parameters are specific to the composition, morphology, and materials properties of the metallic powder, as well as the characteristics of the laser beam used to consolidate the powder. Selective Laser Sintering (SLS) and Direct Metal Deposition (DMD) are examples of three-dimensional additive manufacturing systems wherein a high power laser is used to fuse components or particles, such as metal powders or ceramic/metal composite powders, to one another as a means of building up a macroscopic part. These components or particles to be fused may be located in a dense particle bed, as in SLS, or may be entrained in a gas flow and fused in a weld pool on the surface of the part being manufactured, as in DMD. However, in both SLS and DMD technologies, the entire unfused components or particles that comprise the powdered material is heated indiscriminately by the high intensity laser beam. In certain applications, such as when the powdered material includes a ceramic component, the laser may cause thermal decomposition of the ceramic part resulting in the degradation of the physical characteristics of the macroscopic part.

Additive Manufacturing (AM) is a manufacturing process in which complex parts are fabricated by the fusing together of small individual components to create a large macroscopic part. Typically, the small individual components are particles in a powder of a specific material. In powder bed AM systems, for example, complex parts are usually fabricated through the layer-by-layer consolidation of the particles in a powder bed. This consolidation can be realized through the input of energy to the particles, which causes the particles to heat, sinter, and/or melt together or otherwise connect to one another to form a dense solid. Energy can be delivered to the particles by using a laser, electron beam, or by exposing the material to a high frequency magnetic field.

In conventional powder bed AM, each layer of powder is consolidated sequentially to form the complex part. An earlier layer holds a subsequent layer that is deposited. During the fabrication process, particles of the topmost layer of loose powder are fused to both the parent part (i.e. the substrate or an earlier layer) and the neighboring loose particles. This is accomplished by using spatially compact energy sources (e.g. laser, electron beam, high frequency magnetic fields, etc.) to locally consolidate the particles in a specific pattern defined by a two-dimensional cross section of the three-dimensional (3D) part.

SUMMARY OF THE INVENTION

The invention provides a manufacturing system including a holder suitable to hold first particles of a first powder in proximity to one another and a connection scheme which, when employed, connects the particles to one another to form a part.

The manufacturing system may further include a deposition system. The deposition system may include a first hopper for a first powder having first particles of a first material, a first nozzle through which the first powder flows out of the first hopper to form a first volume, a second hopper for a second powder having second particles of a second material a second nozzle through which the second powder flows out of the second hopper to form a second volume in contact with the first volume with an interface between the first and second volumes, the second particles forming at least part of a holder suitable to hold first particles in proximity to one another and a connection scheme which, when employed, connects the particles to one another, wherein the first material is a positive material and the second material is a negative material so that the positive material preferentially connects the first particles to one another relative to the negative material connecting the second particles to one another, the positive material forming the part with an edge of the part defined by the interface.

The manufacturing system may further include that the connection scheme includes a heater and the particles are connected by heating the particles to consolidate the particles.

The manufacturing system may further include that the heater is an induction heater, laser heater, high intensity light heater, radiant heater or electron beam heater.

The manufacturing system may further include that the heater is an induction heater and the particles are selectively heated using induction heating and by tuning an induction frequency to heat the first particles preferentially over the second particles.

The manufacturing system may further include that the induction heater uses pulsed duty cycles to heat the first particles preferentially over the second particles.

The manufacturing system may further include that the deposition system may include a support structure, a print head through which the first powder and the second powder are deposited, a print head actuator, a computer that is programmable to cause movement of the print head actuator for the print head actuator to move the first and second nozzles relative to the support structure to deposit a plurality of layers on one another, wherein at least a first of the layers includes a portion of the first material and a portion of the second material and at least a second of the layers includes a portion of the first material and a portion of the second material, wherein the first material of the second layer is in contact with the first material of the first layer, and a connection scheme which, when employed, connects the particles of the first material of the second layer to the first material of the first layer.

The manufacturing system may further include that the print head actuator is programmable to move the first and second nozzles relative to the support structure to deposit the second volume is within the first volume.

The manufacturing system may further include that the print head actuator is programmable to move the first and second nozzles relative to the support structure so that the first volume entirely encloses the second volume.

The manufacturing system may further include that the print head print head actuator is programmable to move the first and second nozzles relative to the support structure so that the first and second layers have different thicknesses.

The manufacturing system may further include a heater positioned to heat the first layer to consolidate the particles of the first material of the first layer before depositing the second layer on the first layer, and heat the second layer, after depositing the second layer on the first layer, to consolidate the particles of the first material of the second layer.

The manufacturing system may further include a heater positioned to simultaneously heat the first layer and the second layer to consolidate the particles of the first material of the first layer and the second layer.

The manufacturing system may further include a machining apparatus to machine the part.

The manufacturing system may further include that the part is a green part with structural integrity, further including a heater for heat treatment of the green part to form heat treated part.

The manufacturing system may further include that the deposition system may include a print head through which the first powder and the second powder are deposited, a print head actuator and a computer that is programmable to cause movement of the print head actuator for the print head actuator to move the print head relative to the support structure to deposit the first material through the first nozzle.

The manufacturing system may further include that the second powder is deposited through the print head.

The manufacturing system may further include that the first and second powders are simultaneously deposited onto the substrate through the print head.

The manufacturing system may further include a shutter that is mounted for movement from a first position to a second position and a shutter actuator connected to the shutter, wherein the computer is programmable for the shutter actuator to move the shutter such that the shutter dispenses the first powder without dispensing the second powder when the shutter is in the first position and the shutter dispenses the second powder without dispensing the first powder when the shutter is in the second position.

The manufacturing system may further include that the computer is programmable to actuate the print head actuator and the shutter actuator such that (1) moving a shutter from a first position to a second position relative to the print head to close a dispensing hole defined by the shutter, such that, when the shutter moves from the first position to the second position, a finite mass of the first powder is retained in the hole of the shutter and at a location on the substrate, and (2) moving the print head while moving the shutter in a simultaneous coordinated motion to keep the finite mass of powder in the location on the substrate.

The manufacturing system may further include a vibrating transducer which, when activated, to partially or completely fluidized the first powder.

The manufacturing system may further include a flow transducer positioned to monitor flow of the first powder.

The manufacturing system may further include that the flow transducer is a tank circuit that resonates at a frequency that couples to the first powder.

The manufacturing system may further include that the computer is programmable to set a frequency limit wherein a lower bound of the frequency limit for the flow transducer is set so that diameters of the first particles in the first powder are greater than 4 to 6 times the skin depth of the material.

The manufacturing system may further include that the computer measures an impedance of the tank circuit to measure flow characteristics of the powder through the first powder.

The manufacturing system may further include that the negative material includes Tungsten, Zircon, Silicon Carbide, Alumina, WC, or Chromite.

The manufacturing system may further include that the positive material includes Iron, copper, aluminum, titanium or a ceramic.

The manufacturing system may further include that the first and second powders are deposited at the same time with an interface between the powders where the powders meet.

The manufacturing system may further include that the connection scheme may include a mold suitable for locating the first and second powders into and a pressurizing device suitable for creating a pressure to increase the density of the first powder under pressure.

The manufacturing system may further include that the connection scheme may include a binder included in the first powder.

The manufacturing system may further include that the connection scheme may include a press heater to increase a temperature of the mold.

The manufacturing system may further include a support structure, a first powder hopper for holding the first powder, a print head having a first nozzle for directing the first powder from the first powder hopper onto a substrate, the print head having a lower surface that is sufficiently near the substrate for powder to flow out of the first nozzle and stop flowing out of the first nozzle when there is no more room below the print head, a print head actuator and a computer that is programmable to cause movement of the print head actuator for the print head actuator to move the print head relative to the support structure, causing the powder to resume flow out of the first nozzle.

The manufacturing system may further include regulating flow of the first powder through the first nozzle.

The manufacturing system may further include a feed tube, the first powder being directed through the feed tube into the first powder hopper, the first powder hopper forming a first powder accumulator, the first powder accumulating within the first powder accumulator until the first powder forms a cork over a mouth of the feed tube, the cork preventing more of the first powder from entering the first powder accumulator until a level of the first powder in the first powder accumulator has dropped.

The manufacturing system may further include that the first particles are of a first material and connecting the first particles leaves voids within the first material, further including a first holding structure for holding the first particles within a first volume, wherein the first particles are of a first material and connecting the first particles leaves voids within the first material, a second holding structure holding an infiltration material within a second volume and an infiltration system directing the infiltration material into the voids so that the second material infiltrates the first material.

The manufacturing system may further include that the connection scheme may include a heater positioned to heat the first particles to connect the first particles to one another.

The manufacturing system may further include a passage with a smaller cross-section than the second volume connecting the second volume to the first volume for directing the infiltration material from the second volume through the passage into the first volume.

The manufacturing system may further include a heater positioned to heat the infiltration material so that the infiltration material melts and flows into the first material.

The manufacturing system may further include a heater positioned to heat the first particles to a first temperature to sinter the first particles, to connect the first particles to one another, and heat the infiltration material to a second temperature that is higher than the first temperature so that the infiltration material melts and flows into the first material.

The manufacturing system may further include a holder formed out of a negative material to define the first and second volumes, the negative material being removable from the first material after the infiltration.

The manufacturing system may further include a part fabrication apparatus, a machining apparatus and a computer. The computer may include a processor, a computer readable medium connected to the processor and a set of instructions on the computer readable medium. The set of instructions may include a CAD model storing module for storing an original CAD model with details of the part, a CAD model modifying module for modifying the original CAD model by eliminating fine details of the part in the original CAD model to render a fabrication target model, a target fabrication module executable for the part fabrication apparatus to form and hold the first powder in a shape according to the fabrication target model before connecting the first particles of the first powder to one another to form a green part and a machining module for the machining apparatus to machine the green part to the details of the original CAD model to form the part.

The manufacturing system may further include a print head, a tool path module for developing a tool path based on the fabrication target model, the target fabrication module moving a print head relative to a substrate based on the tool path, the print head forming the shape according to the fabrication target.

The invention also provides a manufacturing method including holding first particles of a first powder in proximity to one another and connecting the particles to one another to form a part.

The manufacturing method may further include forming a first volume of first powder having first particles of a first material in contact with a second volume of second powder having second particles of a second material with an interface between the first and second volumes and employing a connection scheme to connect the particles to one another, wherein the first material is a positive material and the second material is a negative material so that the positive material preferentially connects the first particles to one another relative to the negative material connecting the second particles to one another, the positive material forming the part with an edge of the part defined by the interface.

The manufacturing method may further include that the particles are connected by heating the particles to consolidate the particles.

The manufacturing method may further include that the particles are heated using induction heating, laser heating, high intensity light heating, radiant heating or electron beam heating.

The manufacturing method may further include that the particles are selectively heated using induction heating and by tuning an induction frequency to heat the first particles preferentially over the second particles.

The manufacturing method may further include that the induction heating uses pulsed duty cycles to heat the first particles preferentially over the second particles.

The manufacturing method may further include depositing a plurality of layers on one another, wherein at least a first of the layers includes a portion of the first material and a portion of the second material and at least a second of the layers includes a portion of the first material and a portion of the second material, wherein the first material of the second layer is in contact with the first material of the first layer and connecting the particles of the first material of the second layer to the first material of the first layer.

The manufacturing method may further include that the second volume is within the first volume.

The manufacturing method may further include that the first volume entirely encloses the second volume.

The manufacturing method may further include that the first and second layers have different thicknesses.

The manufacturing method may further include heating the first layer to consolidate the particles of the first material of the first layer before depositing the second layer on the first layer and heating the second layer, after depositing the second layer on the first layer, to consolidate the particles of the first material of the second layer.

The manufacturing method may further include simultaneously heating the first layer and the second layer to consolidate the particles of the first material of the first layer and the second layer.

The manufacturing method may further include machining the part.

The manufacturing method may further include that the part is a green part with structural integrity, further including heat treating the green part to form heat treated part.

The manufacturing method may further include that the first powder is deposited by holding the first powder in a first powder hopper, directing the first powder from the first powder hopper through a first nozzle of a print head onto a substrate and moving the print head relative to the substrate.

The manufacturing method may further include depositing a second powder by holding the second powder in a second powder hopper and directing the second powder from the second powder hopper through a second nozzle of the print head onto the substrate.

The manufacturing method may further include that the first and second powders are simultaneously deposited onto the substrate.

The manufacturing method may further include moving a shutter from a first position to a second position, wherein the shutter dispenses the first powder without dispensing the second powder when the shutter is in the first position and the shutter dispenses the second powder without dispensing the first powder when the shutter is in the second position.

The manufacturing method may further include moving a shutter from a first position to a second position relative to the print head to closes a dispensing hole defined by the shutter, such that, when the shutter moves from the first position to the second position, a finite mass of the first powder is retained in the hole of the shutter and at a location on the substrate and moving the print head while moving the shutter in a simultaneous coordinated motion to keep the finite mass of powder in the location on the substrate.

The manufacturing method may further include activating a vibrating transducer to partially or completely fluidize the first powder.

The manufacturing method may further include monitoring flow of the first powder with a flow transducer.

The manufacturing method may further include that the flow transducer is a tank circuit that resonates at a frequency that couples to the first powder.

The manufacturing method may further include setting a frequency limit wherein a lower bound of the frequency limit for the flow transducer is set so that diameters of the first particles in the first powder are greater than 4 to 6 times the skin depth of the material.

The manufacturing method may further include measuring an impedance of the tank circuit to measure flow characteristics of the powder through the first powder.

The manufacturing method may further include that the negative material includes Tungsten, Zircon, Silicon Carbide, Alumina, WC, or Chromite.

The manufacturing method may further include that the positive material includes Iron, copper, aluminum, titanium or a ceramic.

The manufacturing method may further include that the first and second powders are deposited at the same time with an interface between the powders where the powders meet.

The manufacturing method may further include that the connection scheme may include locating the first and second powders in a mold and increasing the density of the first powder under pressure.

The manufacturing method may further include that the connection scheme may include including a binder in the first powder.

The manufacturing method may further include that the connection scheme may include increasing a temperature of the mold.

The manufacturing method may further include that the first powder is deposited by holding the first powder in a first powder hopper, directing the first powder from the first powder hopper through a first nozzle of a print head onto a substrate, the print head having a lower surface that is sufficiently near the substrate for powder to flow out of the first nozzle and stop flowing out of the first nozzle when there is no more room below the print head; and moving the print head relative to the substrate, causing the powder to resume flow out of the first nozzle.

The manufacturing method may further include regulating apparatus for regulating flow of the first powder through the first nozzle.

The manufacturing method may further include directing the first powder through a feed tube into the first powder hopper, the first powder hopper forming a first powder accumulator, the first powder accumulating within the first powder accumulator until the first powder forms a cork over a mouth of the feed tube, the cork preventing more of the first powder from entering the first powder accumulator until a level of the first powder in the first powder accumulator has dropped.

The manufacturing method may further include holding the first particles within a first volume, wherein the first particles are of a first material and connecting the first particles leaves voids within the first material, holding an infiltration material within a second volume and directing the infiltration material into the voids so that the second material infiltrates the first material.

The manufacturing method may further include that the first particles are connected to one another by heating the first particles to sinter the first particles.

The manufacturing method may further include directing the infiltration material from the second volume through a passage with a smaller cross-section than the second volume into the first volume.

The manufacturing method may further include heating the infiltration material so that the infiltration material melts and flows into the first material.

The manufacturing method may further include that the first particles are connected to one another by heating the first particles to a first temperature to sinter the first particles, further including heating the infiltration material to a second temperature that is higher than the first temperature so that the infiltration material melts and flows into the first material.

The manufacturing method may further include forming a holder that defines the first and second volumes out of a negative material and removing the negative material from the first material after the infiltration.

The manufacturing method may further include storing an original CAD model with details of the part, modifying the original CAD model by eliminating fine details of the part in the original CAD model to render a fabrication target model, wherein the first powder is formed and held in a shape according to the fabrication target model before connecting the first particles of the first powder to one another to form a green part and machining the green part to the details of the original CAD model to form the part.

The manufacturing method may further include developing a tool path based on the fabrication target model and moving a print head relative to a substrate based on the tool path, the print head forming the shape according to the fabrication target.

BRIEF DESCRIPTION OF THE DRAWINGS

The invention is further described by way of example with reference to the accompanying drawings, wherein:

FIGS. 1a-c illustrate the effect of skin depth on the manner in which a small particle is heated;

FIG. 2 is a graph showing power transfer factor as it depends on "electrical dimension";

FIGS. 3a-c are perspective views of a metallic sphere wherein the "electrical dimension" is not fixed;

FIG. 4 is perspective view of a metallic sphere wherein the "electrical dimension" is fixed;

FIGS. 9a-b are perspective and plan views, respectively, of a flux concentrator according to an embodiment of the invention;

FIG. 10 is a perspective view illustrating a toroidal shape of magnetic flux lines that are created by a coil formed by a hole of the flux concentrator;

FIG. 21 shows Scanning Electron Microscope (SEM) images of a ScNc material;

FIG. 22 is a graph showing forward and reflected power spectrum for a ScNc;

FIGS. 37*a-f* are cross-sectional side views illustrating a conventional AM process;

FIGS. 38*a-h* are cross-sectional side views illustrating a manufacturing method according to an embodiment of the invention;

FIGS. 40*a-f* illustrate fabrication of a three-dimensional part;

FIGS. 43*a* to 43*b* are cross-sectional side views illustrating a self screeding print head;

FIG. 44 is a perspective view of a shutter of the print head;

FIGS. 49*a-c* are bottom views illustrating movement of a shutter and a print head;

FIGS. 50*a-501* are cross-sectional side views a manufacturing method where layers are uniformly thick;

FIGS. 51*a-i* are cross-sectional side views a manufacturing method where layers have different thicknesses;

FIGS. 55*a-i* include schematics that illustrate a manufacturing method that includes the design and manufacture of a near net shape part; and FIG. 56 is a block diagram illustrating control components of the system.

DETAILED DESCRIPTION OF THE INVENTION

Induction Heating of Fine Metal Powders

Figure 5A:
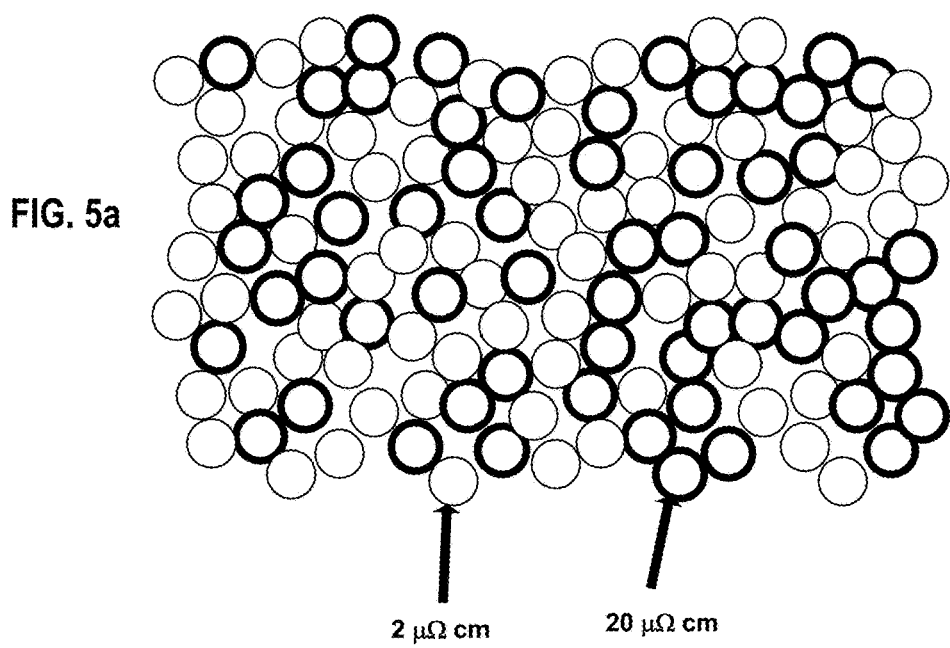
FIGS. 5a-c are plan views illustrating the application of micro-inductive sintering (MIS) technology on an ideal mixture of mono-disperse metal powders.

Micro-Induction Sintering (MIS) is a new additive manufacturing process described herein in which a metallic powder is consolidated via high frequency induction heating. Unlike laser- or electron beam-based additive manufacturing techniques in which the metal powder is heated indiscriminately by an external energy source, the MIS technique allows for the selective heating of individual particles by tailoring the frequency of an applied magnetic field. A localized high frequency magnetic field is produced at the powder bed using a specifically designed flux concentrator (FC) system.

Heating of metallic particles by induction is a result of both Joule heating due to eddy currents in non-magnetic metallic particles and hysteresis loss in magnetic particles, both of which result from the application of a high frequency magnetic field. For non-magnetic metals, eddy currents flow within a certain distance from the surface of the material. The distance within the metal at which the eddy current is reduced to approximately 37% of the value at the surface is called the skin depth δ and can be written as, $$\delta = \sqrt{\frac{\rho}{\pi f \mu}}$$ [1]

where ρ is the resistivity and μ is the permeability of the material, and f is the selected frequency of the magnetic field. In order to heat a metal particle by induction, it is important to immerse the particle in a high frequency magnetic field such that the skin depth is less than one half the diameter of the particle. As shown in FIG. 1a, the dimension of the particle is approximately 2δ. In this case, the eddy currents penetrate deep into the particle and bulk heating occurs by induction. In FIG. 1b, the dimension of the part is much larger than δ. Here, only the surface of the part is heated via induction. In FIG. 1c, the skin depth is much larger than the dimension of the part and the eddy currents largely cancel in the particle. In this case, the part does not couple well to the alternating magnetic field and the material absorbs very little power.

For simple shaped (e.g. flat or cylindrical) materials placed in a uniform alternating magnetic field, the power absorbed by the part ($P_w$) can be written as:

$$P_w = \frac{\rho}{\delta} A K H^2 = A K H^2 \sqrt{\pi f \mu \rho} \qquad [2]$$

where ρ is the resistivity of the material, δ is the skin depth, A is the surface of the part exposed to the magnetic field, K is a power transfer factor that depends on a geometry of the part relative to the applied magnetic field, and H is the magnetic field strength. In principle, it is possible to calculate the power absorbed by a given metallic part in an induction heating process using modern finite element analysis methods. As a rule of thumb, with a fixed resistivity, magnetic permeability, and part dimensions, the power absorbed by the part in an induction heating process increases with increasing frequency and magnetic field strength.

In equation [2], the only ill-defined quantities are A and K, which describes how well the high-frequency magnetic field couples to an individual part. For a given component geometry and form factor of the applied AC magnetic field, A can be calculated. The power transfer factor K, on the other hand, depends on the "electrical dimension" of the part being heated, which is defined as the ratio of the diameter (outside dimension) of the part to the skin depth, d/δ. This is shown in FIG. 2 for two limiting cases of a plate and a cylinder. In the plate geometry, for example, the power transfer factor K has a maximum for d/δ of approximately 3. In order to maximize the total transfer of power to the part, however, the "electrical dimension" of the part must be as low as possible while still maintaining a large K. In general, the maximum power transfer to bulk heat cylinders or plates is achieved when d/δ is approximately 4. This illustrates the critical relationship between the dimension of the part to be heated by induction and the frequency of the magnetic field.

Unlike plates or cylinders, metal powders typically used in additive manufacturing processes consist of spherical particles. Consider a metallic sphere immersed in a high frequency magnetic field as shown in FIG. 3a. In this case, the "electrical dimension" of the sphere is not fixed. This results in an additional frequency dependent component to K for spherical metal powders. To illustrate, consider the approximation to the spherical particle shown in FIG. 3b, which consists of a stack of circular plates with diameters that inscribe the surface of a sphere. Each circular plate is at right angles to a magnetic flux field line H forming an axis of the sphere. Within each layer in this approximation, the K for plates shown in FIG. 2 can be used to describe the efficiency of power transfer. For a fixed frequency such that d/δ=4, where d is the particle diameter, the power transfer factor is large and bulk heating of the plate occurs because the eddy currents flow around the perimeter and penetrate deep within the plate. As the effective diameter decreases towards the "poles" of the sphere, however, the "electrical dimension" of each plate decreases and the effective K decreases to zero. This means, that for a fixed induction heating frequency, the "equator" of the particle is heated, but the "poles" do not couple well to the applied magnetic field and are only heated by thermal conduction within the material. This is shown schematically in FIG. 3c where thicker cross-hatching at the equator of the sphere indicates the inhomogeneous heating of the spherical particle by induction for magnetic field frequencies such that d/δ=4.

The effective heating of spherical particles can be achieved by selecting the frequency of the applied magnetic field to maximize the overall power transfer to the particle. This is illustrated in FIG. 4, where the frequency is fixed such that d/δ~6. In this case, the power transfer factor is large above and below the "equator" and bulk heating of the "tropic" plates occurs because the eddy currents flow around the perimeter and penetrate deep within the plate. At the "equator", K is still large and d/δ is larger than 6, which results in the surface heating of the spherical particle at and near the equator in addition to the bulk heating at the "tropics".

In general, the reduced effective diameter near the "poles" of the spherical particle will require higher induction frequencies to cause bulk heating of the entire particle. It is estimated that the "electrical dimension" appropriate for the efficient heating of spherical metal particles will be between 4 and 8. The determination of the frequency dependent K appropriate for the bulk heating of spherical metal powders is of critical importance to the MIS additive manufacturing method. A detailed model of K for a sphere will guide the continued design of power supplies for the MIS flux concentrator.

Induction Heating of Composite Powders

Equations [1] and [2], along with the functional dependence of K(d/δ), provide a powerful toolbox for the selective heating of individual particles in composite materials. This is a distinctive advantage of the MIS method over competing metal-based additive manufacturing techniques such as selective laser sintering (SLS) and electron beam deposition (EBD). Here, we describe two conceptual composite architectures with an emphasis on the selective heating of individual components of the composite during the consolidation process.

Figure 5B:
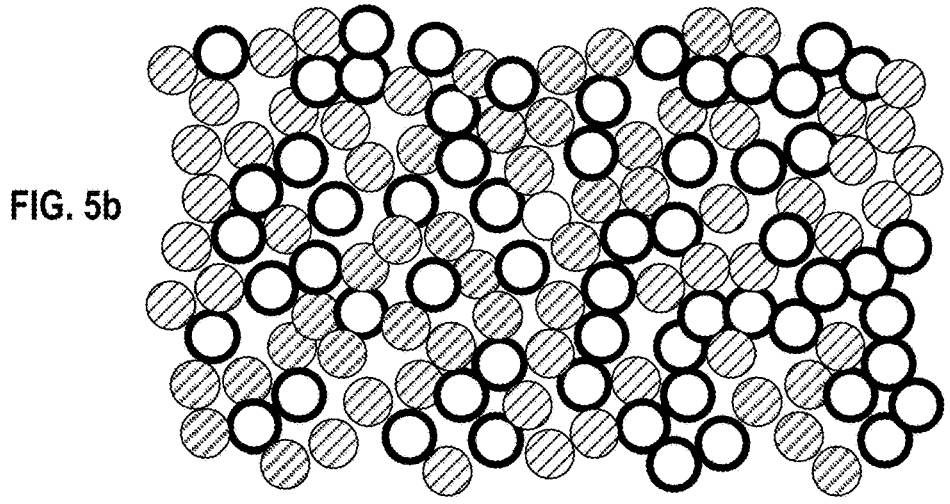
Figure 5C:
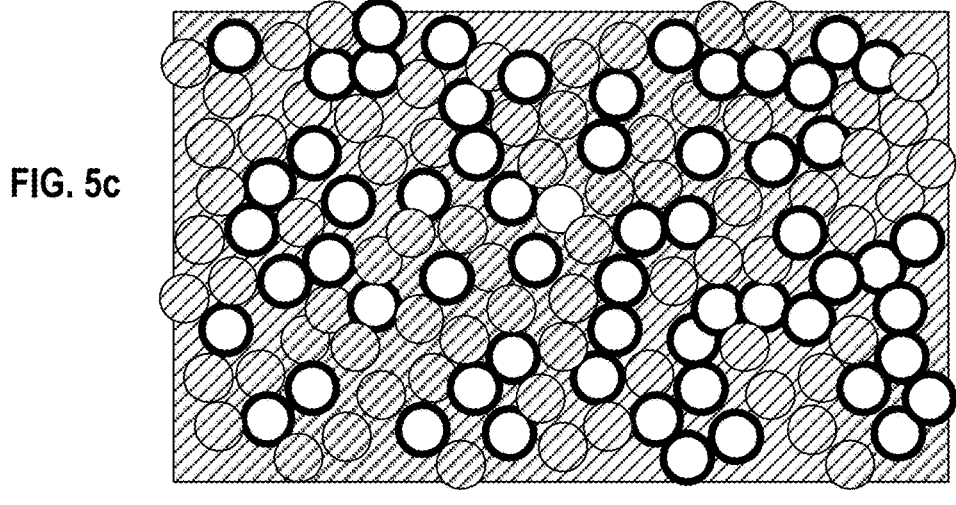

FIGS. 5a to 5c illustrate the application of MIS technology to an ideal mixture of mono-disperse metal powders. In FIG. 5a, it is seen that this mixture consists of two different materials (represented as solid circles and empty circles) with approximately the same particle size, but with different materials properties. In this example, the resistivity ρ of the grey particle is 10 ten times greater than the resistivity of the blue particle. Assuming that bulk heating of the particles occurs when d/δ is approximately 6 the ideal induction frequency can be written as, $$f = \frac{36\rho}{\pi \mu d^2} \qquad [3]$$

where d is the diameter of the particle. Thus, for a given particle size and magnetic permeability, the ideal induction frequency to achieve bulk heating of a particle scales linearly with the resistivity of the material. In this case, the thin circle particles can be selectively heated in bulk using an oscillating magnetic field with a frequency 10 times smaller than that which would be used to bulk heat the thick circle particles. This is illustrated in FIG. 5*b*, which explicitly shows the selective heating of the thin circle particles. Note that the thick circle particles are also heated in this process, but only by conduction and convection heating that results from the selective induction heating of the thin circle particles. FIGS. 5*a* to 5*c* depict the heating of the thin circle particles in this example because the frequency of the magnetic field is set such that the "electrical dimension" at the "tropics" of the spherical particle is approximately 4. Referring to equation [1], the skin depth of the thick circle is approximately $\sqrt{10} \sim 3.2$ times that of the thin circle particle at this frequency, as described with reference to FIG. 1*c*. Since the skin depth in the thick circle particle is much larger than the particle diameter, there is very poor coupling to the high frequency magnetic field and these particles are not heated directly by induction.

In this example, the consolidation of the composite is driven by the selective sintering of the thin circle particles, with the thick circle particles remaining as inclusions in the solid. This is illustrated in FIG. 5*c* that shows the consolidation of the thin circle particles with isolated thick circle particles in the composite. Note that upon consolidation of the thin circle particles, the effective domain size of the thin circle material increases and the high frequency magnetic field tuned to the initial size of the thin circle particles no longer couples well to the thin circle material. In this case, the effective particle size is much larger than the skin depth at this frequency and the entire consolidated domain is heated at the surface as depicted schematically in FIG. 1*b*.

The coupling and de-coupling of the high frequency magnetic field based on the domain size of the metallic material allows for real-time diagnostics of the MIS consolidation process through the monitoring of the forward and reflected power to the powder bed. In addition, it allows for the rapid and automatic de-coupling of the external heat source (i.e. the high frequency magnetic field) upon consolidation of the particles. This is an important control feature in the consolidation of heat sensitive materials or composite materials that may degrade upon exposure to elevated temperatures.

Figure 6A:
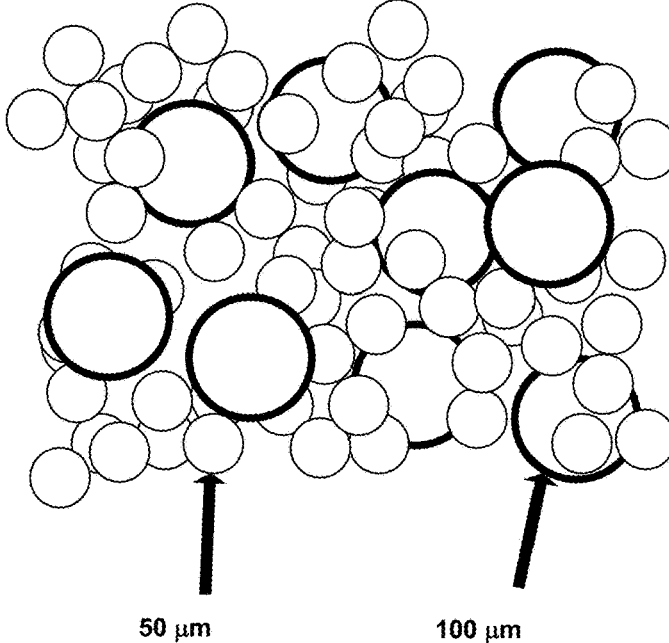
FIGS. 6a-c illustrate the application of MIS technology on a bi-modal distribution of particles.
Figure 6B:
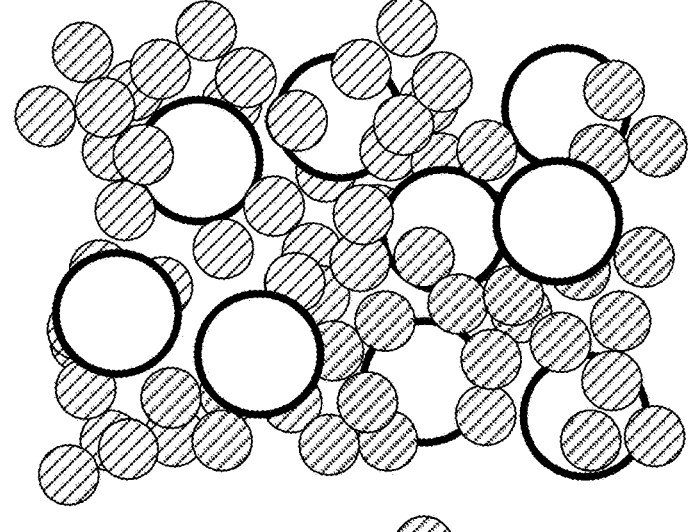
Figure 6C:
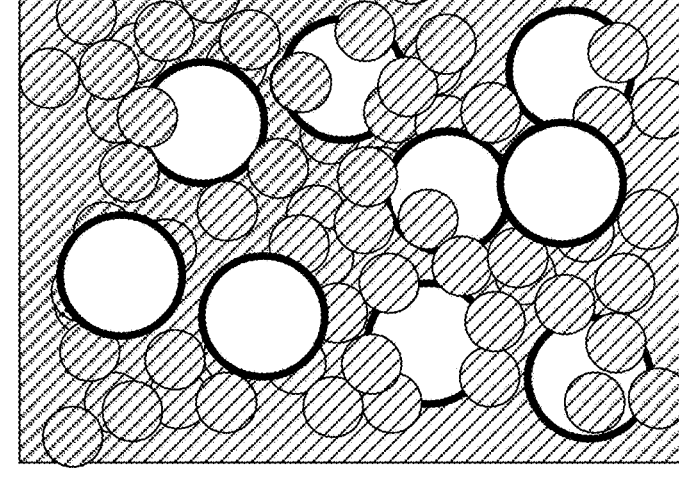

The previous example illustrates the selectivity that the MIS process has with powders that possess similar particle size distributions, but different materials properties. Here, we illustrate the selectivity of the MIS process simply based on the size of the particles in the powder. Consider the ideal metal powder shown in FIG. 6*a*, which consists of a bimodal distribution of particles with the larger of the two particles being approximately twice the diameter of the smaller particles. Again, the smaller particles can be selectively heated by the ideal induction frequency defined by equation [3], where it is seen that the ideal induction frequency varies as $d^{-2}$. Thus, a twofold increase in particle size implies a fourfold decrease in the frequency of the oscillating magnetic field necessary to achieve bulk heating. FIG. 6*b* illustrates the bulk heating of the smaller particles and the surface heating of the larger particles that is characteristic of the MIS process using narrow bandwidth fixed frequencies, with complete consolidation shown in FIG. 6*c*. As in the previous example, upon consolidation of the particles, the effective domain size of the material increases and the high frequency magnetic field tuned to the initial diameter of the smaller particles becomes de-coupled from the consolidated material and the entire domain is heated by induction only at the surface.

In the composite architectures described above, the frequency of the induction heating process is used to selectively heat specific components of the composite based on the physical or materials characteristics of the powder. In the previous example, the small particles are selectively heated by induction, which results in the consolidation of the material. By changing the frequency of the magnetic field, however, the large particles could have been selectively heated by induction, which may lead to an improved density of the final part. In practice, the specific sintering characteristics of the material will determine the operating frequency and bandwidth of the MIS flux concentrator.

General Aspects of the MIS Process

Micro-Induction Sintering is a unique additive manufacturing process capable, in principle, of producing complex parts and components directly from advanced metal and ceramic/metal matrix composite powders. The MIS process, however, is not without limitations imposed by the radio frequency (RF) power electronics, the electrical characteristics of the flux concentrator, the specific sintering characteristics of the metallic powders, and the fundamental physics of induction heating. In general, the MIS process is viable within the following approximate operational parameters:

1) Materials with electrical resistivities between 1 μΩcm and 400 μΩ cm.
2) Powders with particle sizes between 1 μm and 500 μm.
3) MIS-FC operational frequencies between 0.5 MHz and 3 GHz.

Figure 7:
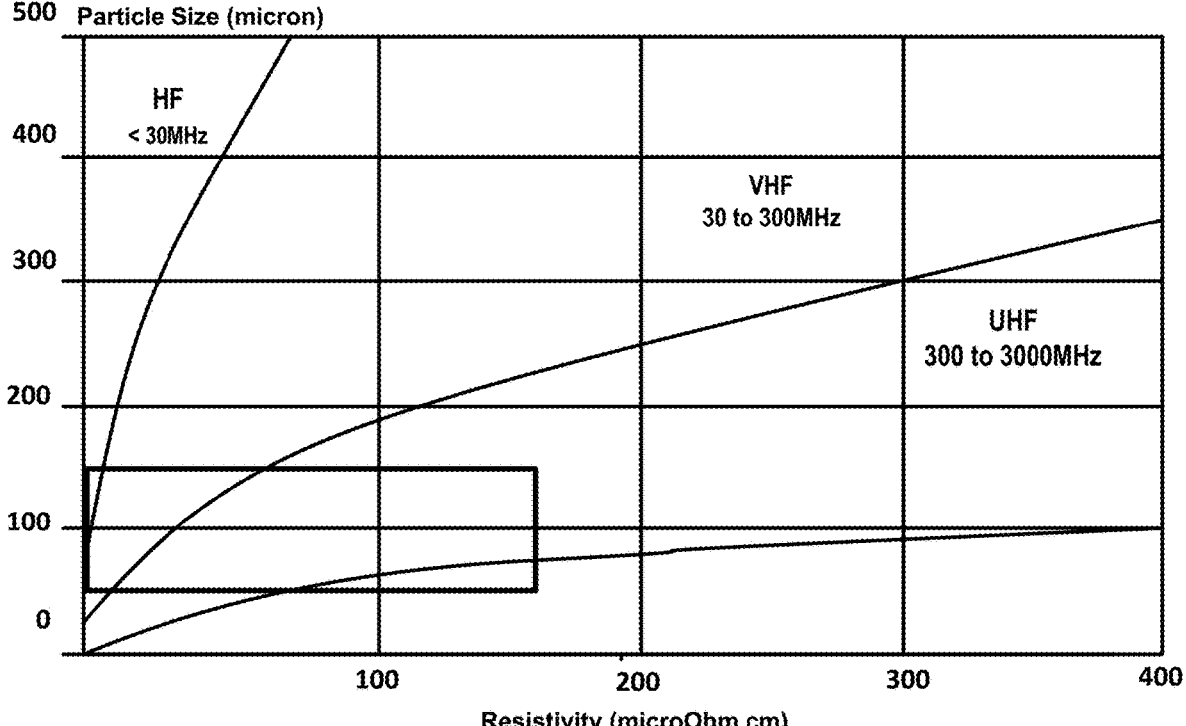
FIG. 7 is a graph illustrating the operational bandwidth of an MIS system.

Using this parameter space and equation [3], the operative phase space for the bulk heating of powders by high frequency induction can be determined. FIG. 7 illustrates the operational frequencies of the MIS system as a function of particle size and resistivity. There are three primary operational frequency bands show in the Figure:

1) High Frequency (HF)—frequencies less than 30 MHz and greater than 0.1 MHz.
2) Very High Frequency (VHF)—frequencies greater than 30 MHz and less than 300 MHz.
3) Ultra High Frequency (UHF)—frequencies greater than 300 MHz and less than 3 GHz.

The vast majority of materials used in additive manufacturing processes possess particle size distributions ranging between 50 μm and 150 μm with electrical resistivities less than 100 μΩcm. This operational space is highlighted by the box in FIG. 7, which shows that most materials can be heated by the MIS process in the VHF and UHF bands. Any material that falls below the UHF band is not a practical candidate for the MIS process based on the operational parameters listed above.

Figure 8:
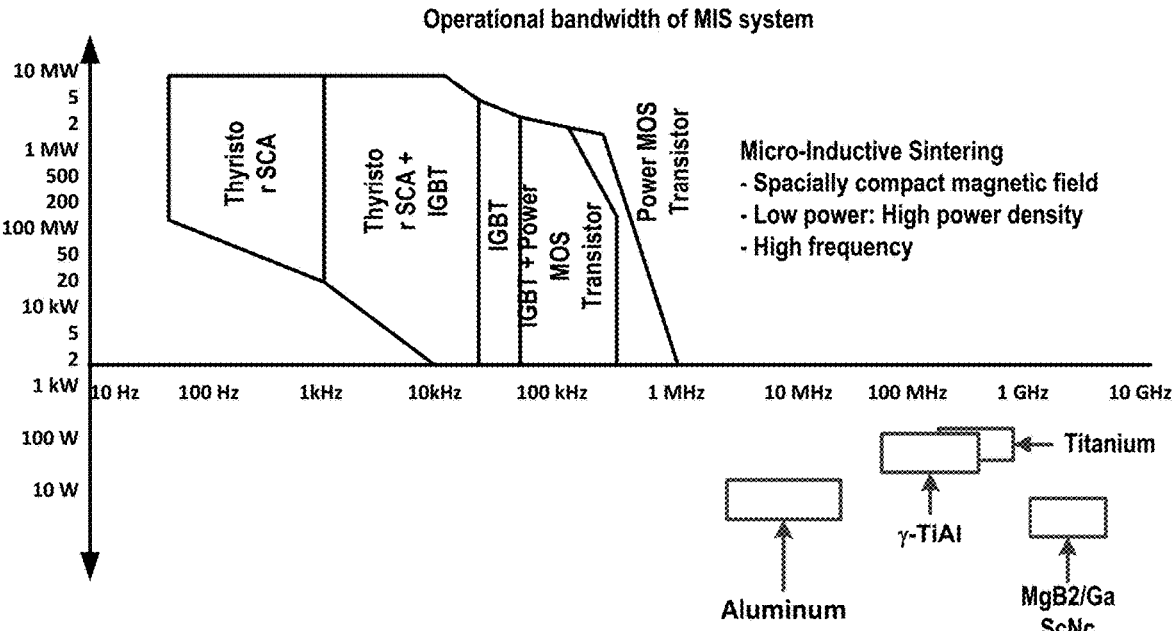
FIG. 8 is a graph illustrating the frequencies and power of commercially available power supplies and the frequencies and power required for MIS technology.

FIG. 8 shows a general list of commercially available power supplies for induction heating systems is shown in FIG. 8, where it is seen that the vast majority of commercial systems operate at frequencies less than 1 MHz and possess power levels up to 10 MW. In contrast, the heating and subsequent consolidation of fine metal powders requires a power supply with a bandwidth from greater than 1 MHz to nearly 5 GHz at power levels up to a few hundred watts. The highlighted areas in FIG. 8 shows the operating specifications of the power supply suitable for the MIS process based on commercial particle size distributions and the electrical properties of the materials. Note that the frequencies required to heat and sinter fine metal and ceramic/metal matrix powders using MIS are 10 to 1000 times higher than conventional induction heating frequencies.

The Evolution of the Flux Concentrator

A central component in the MIS additive manufacturing system is the flux concentrator. This component focuses a high frequency magnetic field into a spatially compact region on a powder bed, resulting in the rapid joule heating of the individual metallic particles and subsequent sintering and consolidation.

Based on MIS-FC concepts that are modeled on a 3D computer aided design (CAD) platform and include advanced 3D magnetic field calculations at both DC and MHz frequencies and models that incorporate the measured physical properties of the material used to fabricate the MIS-FC. The following characteristics for a flux concentrator suitable for the MIS process:

1) 1 mT magnetic flux density at 0.5 mm distance
2) Induction heating spatial resolution of approximately 1 mm
3) Operating frequencies from 0.5 MHz to approximately 3 GHz, preferable at least 1 MHz.
4) A coil having a diameter of less than 10 mm.
5) Inductance of less than approximately 10 nH, preferably less than 5 nH These performance characteristics not only determine the final configuration of the MIS-FC, but also the appropriate power supply for the MIS system.

The approach at the beginning of the development effort involved the use of magneto-dielectric materials and high amp-turn conductors to generate a localized, high frequency magnetic field at the air gap of the magnetic circuit. In general, the flux concentrators fabricated and tested along this path consisted of various permutations of the "horse shoe" design and the "pointed cylinder" design.

In our "horse shoe" shaped flux concentrators, a high current conductor that is located in the "yoke" of the "horse shoe" induces magnetic flux in the magneto-dielectric material. In this geometry, the flux density is increased as the cross-sectional area of the "horse shoe" arms decreases near the air gap in the magnetic circuit. At the air gap, the flux density "spills" out of the magneto-dielectric material and forms a localized high frequency magnetic field. The shape and magnitude of this high frequency magnetic field is determined by the shape of the "horse shoe" FC near the air gap, the amplitude of the current passing through the "yoke", and the electromagnetic properties of the magneto-dielectric material. In general, this FC configuration could achieve the target flux densities only at very high amp-turns. By increasing the number of turns through the "yoke", it was possible to significantly increase the flux density at the air gap and reduce the power requirements of the RF amplifier. Unfortunately, the increased number of turns in the "yoke" dramatically increased the inductance of the FC. This high inductance resulted in a MIS-FC with limited bandwidth that required a sophisticated multi-stage matching network. This approach was abandoned after we determined that the required flux densities could only be achieved at frequencies less than 100 MHz with very high RF power levels (e.g., greater than 500 W).

In our "pointed cylinder" shaped flux concentrators, several turns of a low current conductor wrapped around the cylindrical portion of the FC induces magnetic flux in the magneto-dielectric material. Similar to the "horse shoe" FC, the flux density is increased in this geometry as the cross-sectional area of the conical portion of the cylinder decreases near the very large air gap in the magnetic circuit. Near the point of the FC, the flux density "spills" out of the magneto-dielectric material and forms a localized high frequency magnetic field. The shape and magnitude of this high frequency magnetic field is determined by the shape of the cone, the amp-turns of the solenoid around the cylindrical portion of the FC, and the electromagnetic properties of the magneto-dielectric material. Overall, this FC configuration could achieve the target flux densities at modest currents. Unfortunately, this configuration has a very high inductance, which again resulted in a MIS-FC with limited bandwidth that required a sophisticated multi-stage matching network. In addition, we determined that the majority of the power from the RF amplifier was dissipated in the magneto-dielectric material through hysteresis. The magneto-dielectric material heated to approximately 400° C. after 30 seconds of 25 W RF power. This approach was abandoned after we determined that it was nearly impossible to keep the magneto-dielectric material cool during the MIS process.

In addition to these fundamental technical issues with the magneto-dielectric flux concentrators, we determined that the MIS of ScNc materials requires induction heating frequencies well in excess of 100 MHz. After an extensive search for high frequency magneto-dielectric material candidates, we established that no high permeability, low loss materials exist that are suitable for operation in an MIS flux concentrator. In the end, the technical push to VHF and UHF bands for the MIS of ScNc materials ultimately lead to the complete elimination of the magneto-dielectric material in the MIS-FC.

Air-Core Flux Concentrators

In our air-core flux concentrators, a high current conductor is shaped into a coil and the turns in the coil form a localized magnetic field. Early versions of the air-core flux concentrator were simply the "pointed cylinder" flux concentrator without the magneto-dielectric material. The removal of the magneto-dielectric material from the conical coil FC resulted in a significant decrease in the inductance of the FC, as well as a large decrease in the flux density at the "tip" of the coil. The shape and magnitude of this high frequency magnetic field is determined by the shape and amp-turns of the conical coil. Overall, this FC configuration could achieve the target flux densities only at high currents. Unfortunately, the magnetic field produced by the current in the turns that are far from the "tip" of the conical coil do not contribute much flux density at the "tip". This lead to the development of the "pancake" coil in which there are only two turns in the flux concentrator. This configuration resulted in the highest flux density per amp-turn at that time. In order to achieve the required flux densities, we determined that any air-core FC must be energized through a high frequency tank circuit. These circuits consist of a bank of capacitors in parallel to the inductive flux concentrator. This approach was successful and established our design trend for future MIS flux concentrators, which is characterized by a resonant tank circuit with an inductive FC that has the lowest inductance possible. In other words, a MIS-FC with a single turn.

Figures 9A, 9B, 10:
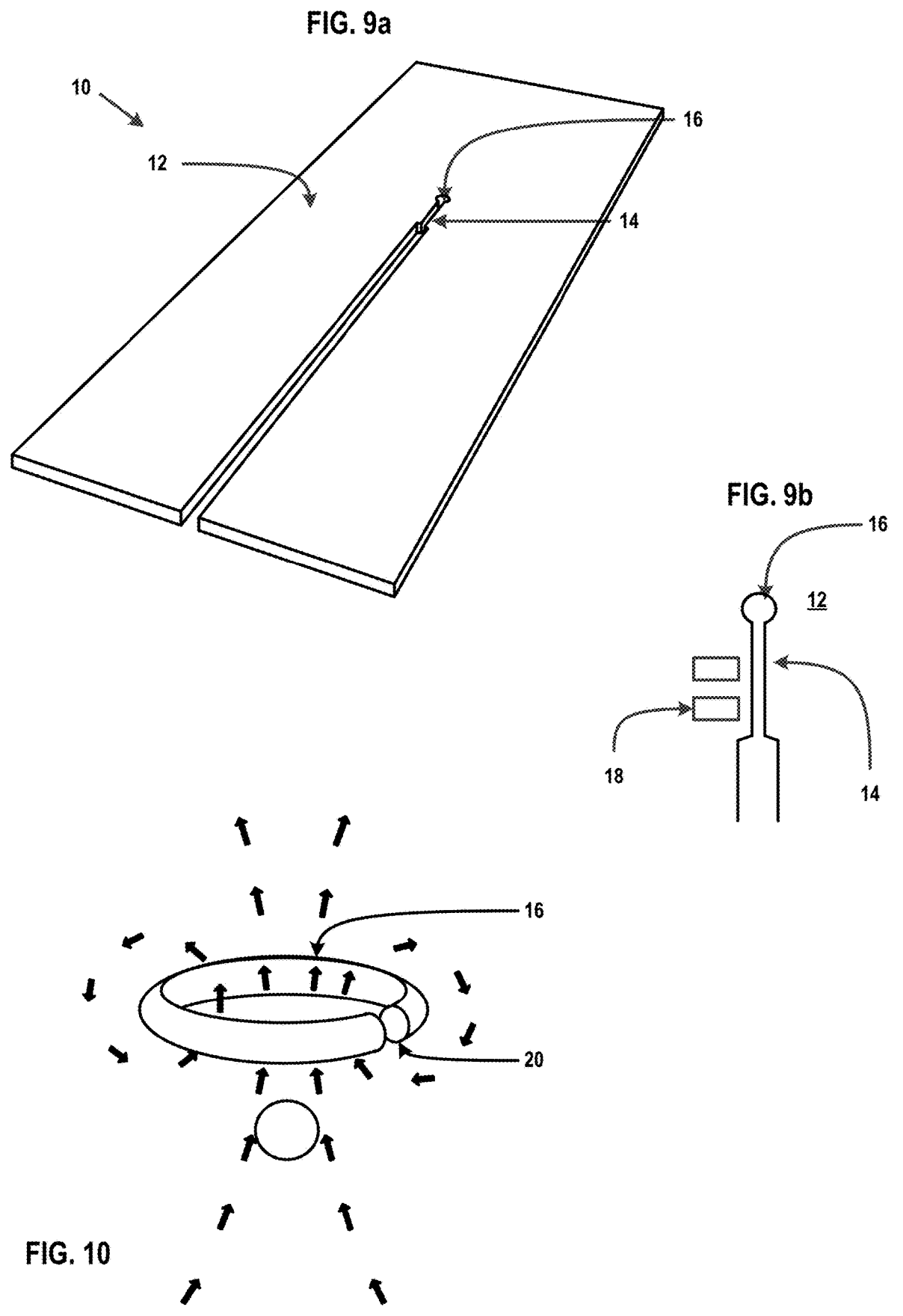

FIGS. 9a and 9b show an MIS-FCT air-core flux concentrator 10, according to an embodiment of the invention, that is fabricated from a 1 mm thick copper plate and that has a thin 0.25 mm slot 14 with a 1 mm diameter hole 16 at the end. The hole 16 is a single turn inductor with an inductance of approximately 1 to 1.5 nH, which is over 100 times lower inductance than previous MIS-FC geometries. This novel MIS-FC design concentrates the magnetic flux density within the hole 16 in the plate 12 with the appropriate placement of capacitors 18, and has several features that are ideal for use at very high frequencies. In particular, the very small inductance and parasitic capacitance allows for operation at frequencies well in excess of 1 GHz—over 2000 times higher frequencies than conventional RF induction heating. As will be shown, this is of critical importance for the MIS of metallic powders that consist of very small particles. Further, the solid-state design allows for the efficient removal of heat generated around the FC and the spatial resolution of the MIS process is determined by the diameter of the single turn inductor in the copper plate. The inductor formed by the hole 16 and capacitor 18 are in parallel in this configuration and thus form a very high frequency, micro-miniature induction heating tank circuit. The resonant frequency of the high frequency, micro-miniature tank circuit is determined by the inductance of the MIS-FC and the capacitance of the capacitor bank in parallel to the MIS-FC. The capacitance of the capacitor bank is a sum of the individual capacitances of the capacitors in parallel to the MIS-FC. The inductance of the MIS-FC is proportional to the area enclosed by the current loop that flows around the MIS-FC. Thus, the inductance is the sum of the inductance from the slot 14 and the circular loop 16, which comprises the MIS-FC. The slot inductance can be minimized by placing the capacitors very close to the circular loop 16, or by decreasing the width of the slot such that the area of the slot 14 between the capacitor bank and the circular loop 16 is much smaller than the area of the circular loop 16. In this manner, the inductance of the MIS-FC is primarily due to the inductance of the circular loop.

The MIS-FC circuit is driven by COTS RF amplifiers (ENI 3100L, Amplifier Research 100 W1000B, or Milmega AS0825) with an output impedance of 50Ω and operating bandwidth from 250 kHz up to 2.5 GHz. These amplifiers are driven by a high frequency function generator (Rohde & Schwartz SMIQ03) capable of producing a swept high frequency sine wave from 300 kHz to 3.3 GHz. The amplifier is connected directly to the MIS-FC assembly via a high-power SMA cable. As shown in FIG. 10, the hole 16 forms a magnetic field with inner flux lines 20 that define a toroidal shape. The magnitude of the magnetic field changes as the magnetic flux changes in response to the alternating electric current. The flux lines 20 form circles with an edge of the hole 16 forming the coil that passes through centers of the circles. The part is preferably approximately 50 percent, e.g. between 45 percent and 55 percent, of a diameter of the coil from the coil. Closer than 50 percent results in more heating but less resolution. Further than 50 percent results in a dramatic drop-off of field strength but increased resolution.

MIS Tank Circuit

Figure 11:
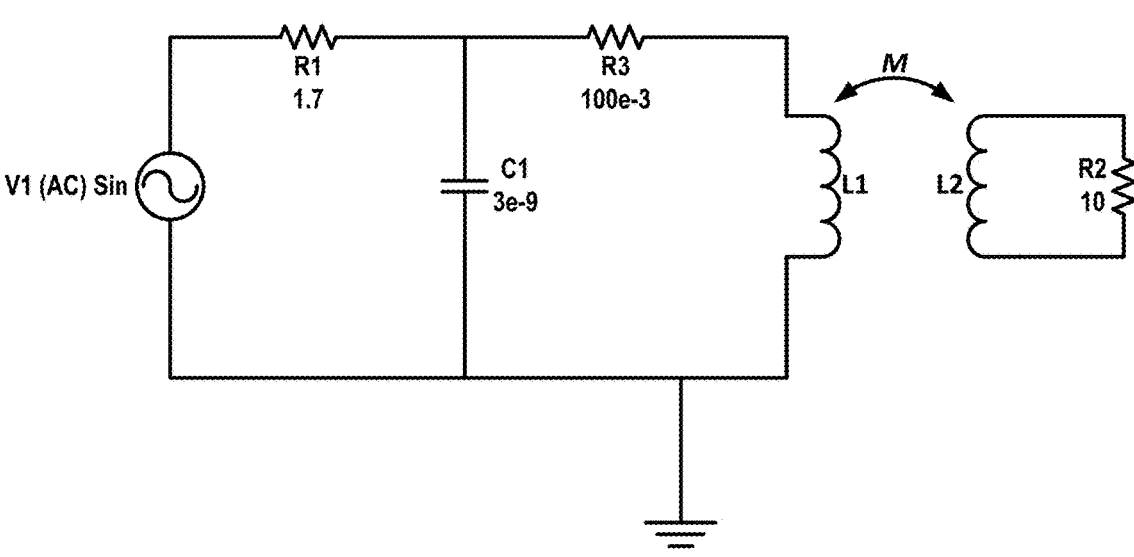
FIG. 11 is a circuit diagram that includes a tank circuit that is used for the flux concentrator.

The circuit diagram for a 75 MHz MIS-FC is shown in FIG. 11. This circuit is based on a parallel resonant tank circuit design that is typically used in induction heating power supplies. In this circuit diagram, however, the degree of coupling between the MIS-FC and the powder is explicitly described by the mutual inductance, M. Here, M is a function of the surface area of the particles exposed to the high frequency magnetic field and the skin depth of the metallic powder at the resonant frequency of the circuit. If the MIS-FC is too distant from the metal powder, or the skin depth is much larger than the particle size, M will tend to zero and the only load in the tank circuit will be due to the intrinsic AC resistance R3 of the copper of the plate 12. Reactive current in the tank portion of the circuit (i.e. between the capacitor and the MIS-FC inductor) is sharply peaked at the resonant frequency, which can be shown to be, $$f_R = \frac{1}{2\pi\sqrt{LC}}$$ [4]

where L is the inductance of the MIS-FC (L1 coil) and C is the capacitance of the capacitor bank (C1) in parallel to L. The capacitors of the capacitor bank collect charge and release the charge to the MIS-FC. A plurality of capacitors are mounted in parallel to the plate 12. At $f_R$, very large reactive currents flow between the capacitor bank and the MIS-FC, but the only power dissipated in the circuit is due to the resistive loss in R1 and R3 when K is zero. With a non-zero M, increased power is drawn from the power supply as power flows to the metal powder bed, R2. In general, the magnitude of these resistive and reactive currents depends on the voltage available from the RF power supply and the reactive current available from the capacitor at $f_R$. The MIS-FC tank circuit minimizes the power draw from the RF amplifier by operating near the resonant frequency at all times. A large coil would result in high inductance. High inductance would reduce resonance frequency for a fixed capacitor bank. A reduction in resonance frequency would result in a larger skin depth, which results in a larger outer dimension.

This circuit design not only maximizes the current flow to the MIS-FC, but also is critical to the potential real-time diagnostic features of the MIS process. If the resonant frequency of the circuit does not couple well with the particle size distribution of the powder (see Equations [1] and [2]), then there is a reduced resistive load in the circuit, which corresponds to the case where M is equal to zero. If the resonant frequency of the circuit couples well with the particle size distribution of the powder (i.e. M~1), however, an additional resistive load is introduced in the circuit and increased power will be drawn from the amplifier. In principle, this increased power will flow in the circuit only when the induction heating frequency (i.e. $f_R$) is such that the "electrical dimension" d/δ is approximately 4 to 6 (Assuming spherical particles and an ideal "electrical dimension" of 6 for the maximum power transfer to a sphere.). The frequency dependence of the real power provided by the RF amplifier using this circuit design can be directly related to the real-time diagnostics and qualification of the MIS method.

A convenient method to determine the power transfer from a source to a load is to measure the Voltage Standing Wave Ratio (VSWR) of a device under test (DUT). In this case, the DUT is the MIS-FC. The VSWR is a measure of the amplitude of the reflected RF wave relative to the incident RF wave between an RF power supply and a DUT. In general, the VSWR can be calculated by measuring the reflection coefficient F of a DUT, which can be written as, $$\Gamma = \frac{V_{reflected}}{V_{incident}}$$ [5]

where $V_{reflected}$ and $V_{incident}$ are the voltage of the reflected and incident waves, respectively. Using this definition of Γ, the VSWR can be written as, $$VSWR = \frac{1 + |\Gamma|}{1 - |\Gamma|}$$ [6]

where $|\Gamma|$ is the absolute value of $\Gamma$. As $\Gamma$ is always between 0 and 1, the VSWR has a minimum of unity, which corresponds to 100% power transferred from the source to the load.

Figure 12:
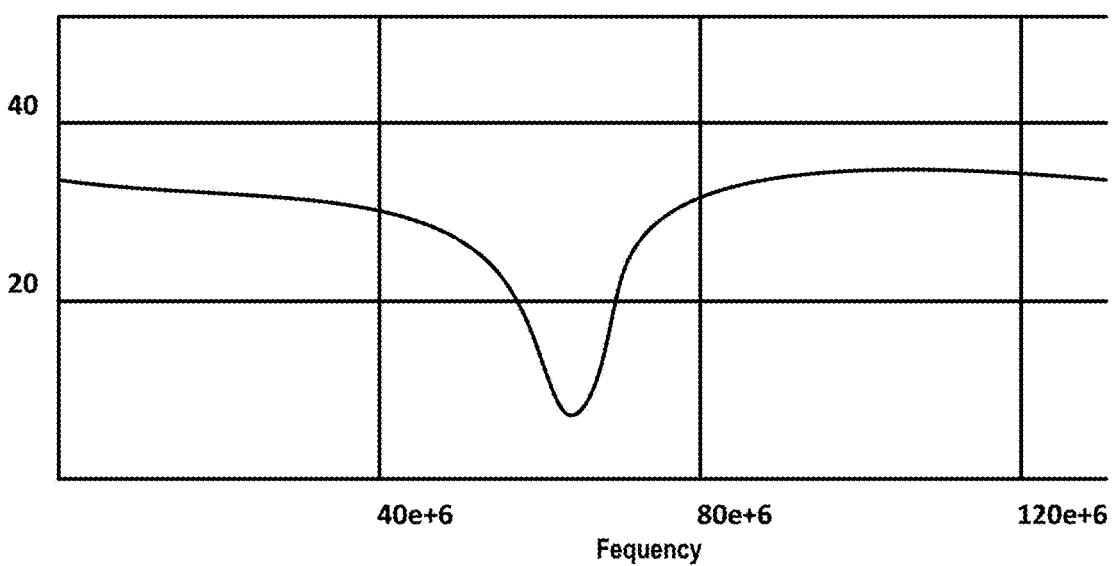
FIG. 12 is a graph illustrating calculated Voltage Standing Wave Ratio (VSWR) for an MIS tank circuit.

FIG. 12 shows the calculated VSWR of the MIS-FC circuit shown in FIG. 11 based on a source impedance of $50\Omega$. The VSWR has a minimum at the resonance frequency of the MIS-FC circuit, indicating the maximum power is transferred to the load at $f_R$. In this case, the VSWR has a minimum value of approximately 4, which corresponds to approximately 64% of the power transferred to the load with 36% reflected back to the power supply.

Figure 13:
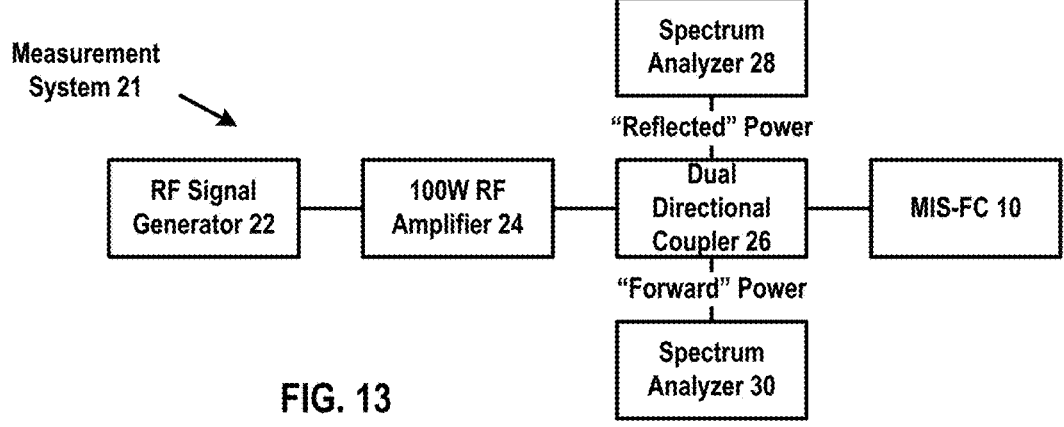
FIG. 13 is a block diagram illustrating a measurement system that carries out a VSWR procedure.
Figure 14:
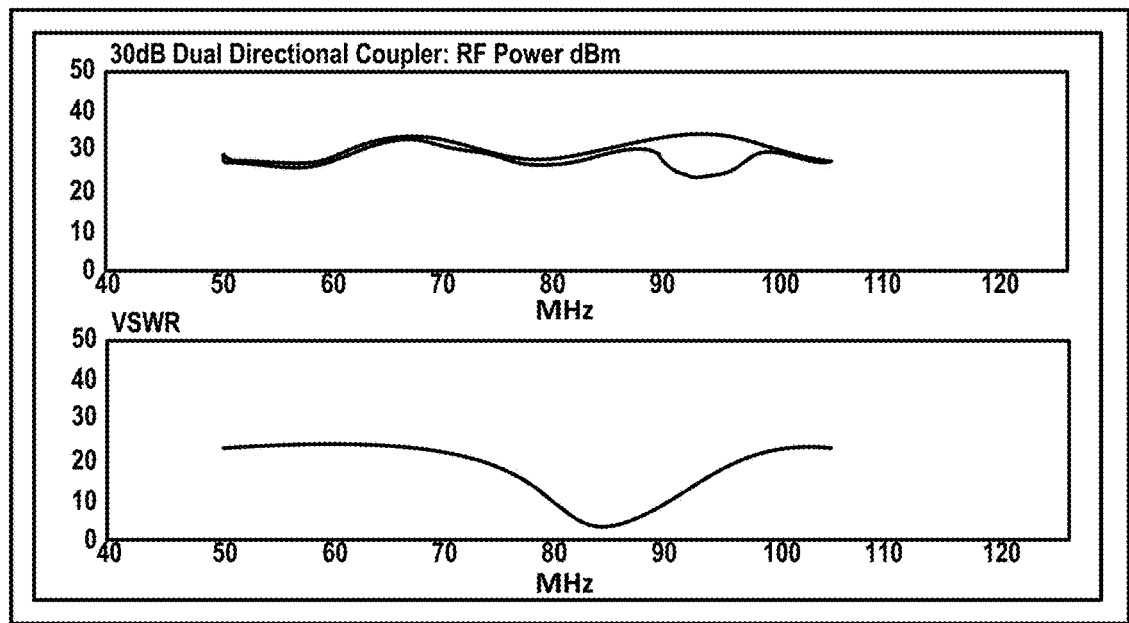
FIG. 14 is a screen shot generated by VSWR control code.

FIG. 13 shows a measurement system 21 that carries out a procedure to directly measure the VSWR of MIS-FC components in order to confirm the operation of these components for use in the MIS system. The measurement system 21 includes an RF signal generator 22, an amplifier 24, a dual directional coupler (DDC) 26, and two spectrum analyzers 28 and 30. The RF signal generator 22 drives a known RF sine wave to the amplifier 24, which is connected to the MIS-FC 10 through the DDC 26. The RF power available from the forward and reflected ports on the DDC 26 correspond to the incident and reflected power to the MIS-FC 10, which are measured by the two spectrum analyzers 28 and 30, respectively. The square root of the ratio of the reflected and incident power is equivalent to $|\Gamma|$ from which the VSWR ratio is calculated. The VSWR measurements are completely automated by a control code developed specifically for the MIS system. A screen shot of the MIS-FC VSWR control code is shown in FIG. 14.

RF Flux Density Measurements of the "Solid-State" MIS-FC

Figure 15:
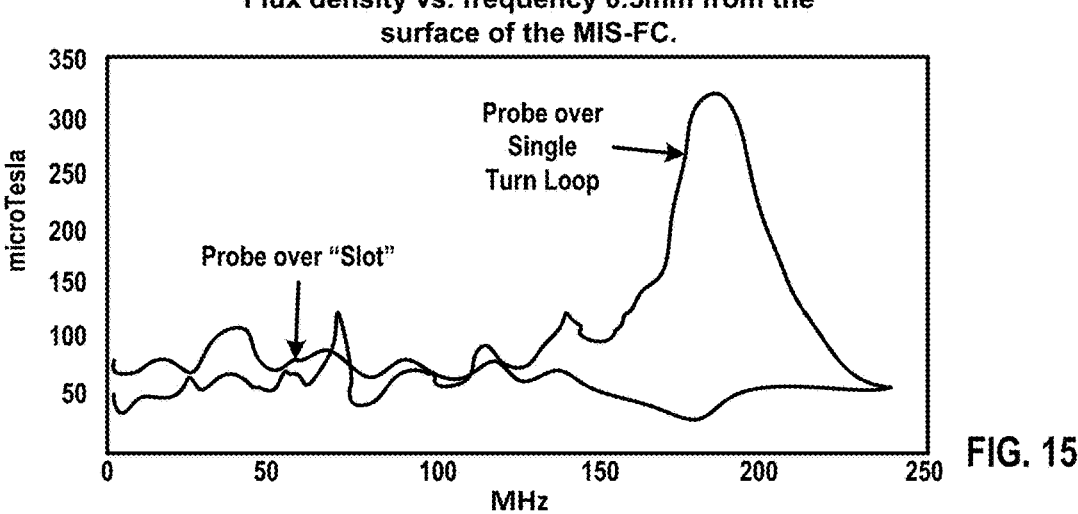
FIG. 15 is a graph showing flux density against frequency.

In addition to measuring the electrical properties of the MIS-FC and high current tank circuit, a control code is also used to measure the flux density of the MIS-FC as a function of frequency to confirm the concentration of flux density in the single turn loop of the MIS-FC. Using an RF signal generator, amplifier, and a small RF field probe (Beehive Electronics 100B Probe), we have confirmed that the high frequency magnetic field is located primarily above the single turn circular loop in the solid-state MIS-FC configuration. FIG. 15 shows the measured flux density versus frequency for a MIS-FC tank circuit with a resonant frequency of approximately 185 MHz. These data were obtained approximately 0.5 mm from the surface of the MIS-FC. The majority of the flux density is located above the circular loop, with very little flux density over the slot 14 outside of the tank circuit, thus confirming the concentration of the flux by the placement of the capacitor relative to the loop in the copper plate. Referring to Equation [2], there is nearly 40 times the power transfer over the single turn loop formed by the hole 16 as compared to the slot 14 in the MIS-FC at 185 MHz.

Figure 16A:
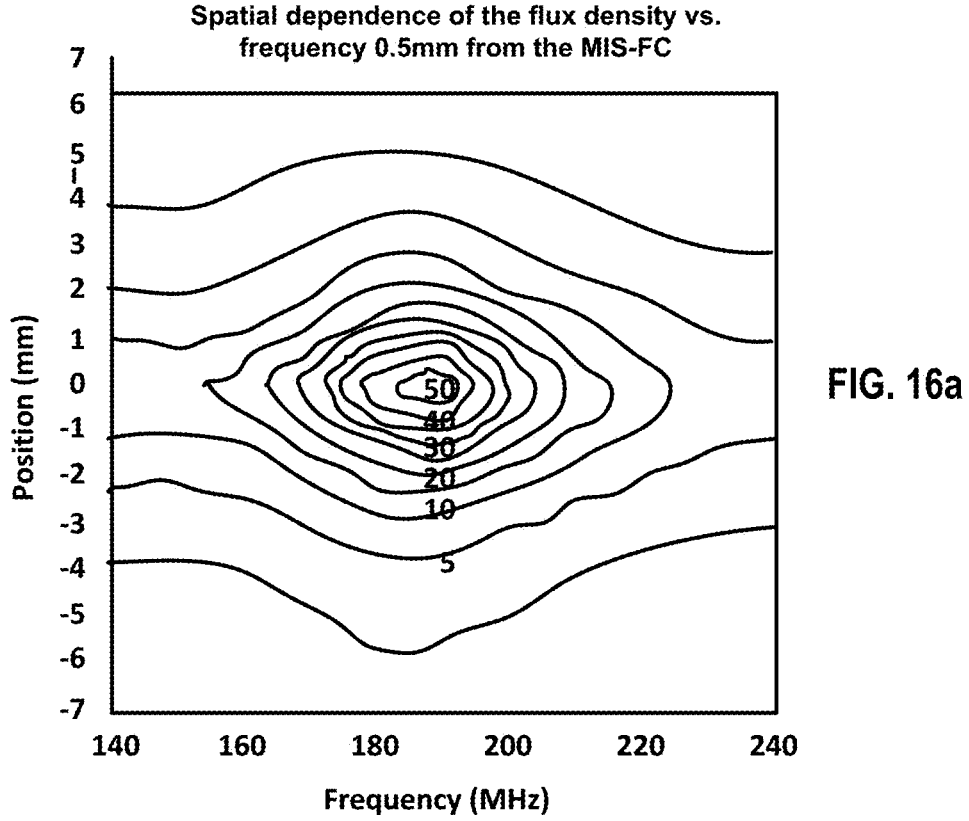
FIG. 16*a-b* are top and perspective views illustrating spatial dependence of flux density against frequency.
Figure 16B:
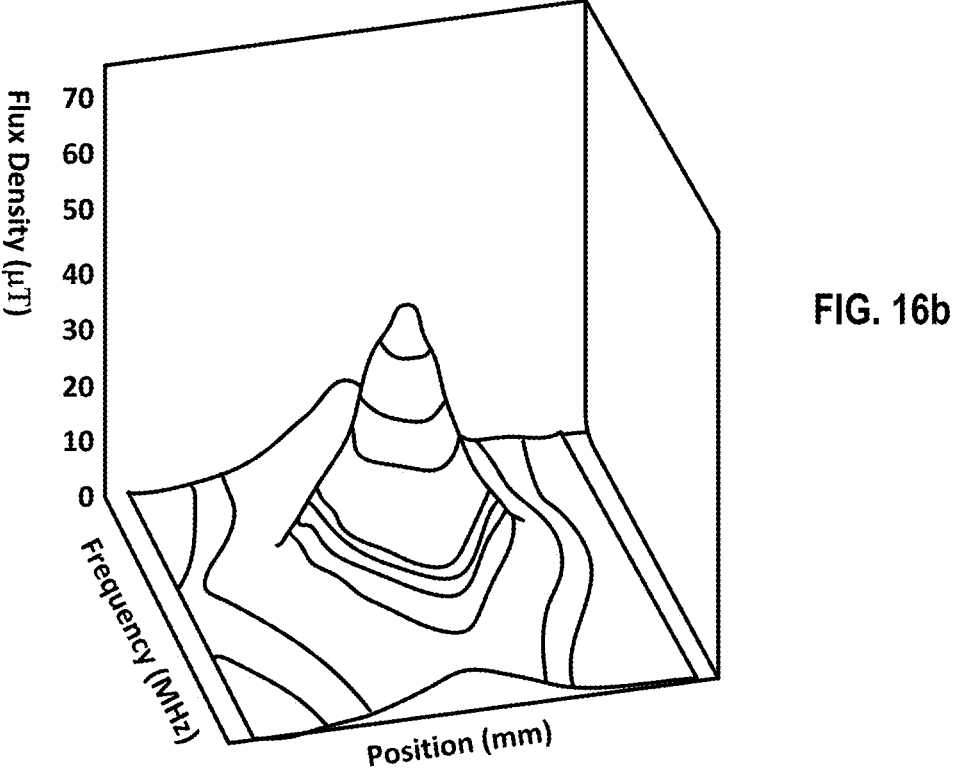

FIG. 16 shows the measured flux density as a function of frequency and position of the 185 MHz MIS-FC. The flux density is sharply peaked near the center of the loop with a full-width half-maximum of approximately 2 mm at 0.5 mm from the surface of the MIS-FC. Referring again to Equation [2], we can estimate the active heating zone to be approximately 1 mm in diameter because the power transfer by induction is proportional to the square of the flux density. This results in a very sharply peaked hot zone in the MIS-FC heating profile.

Figure 17:
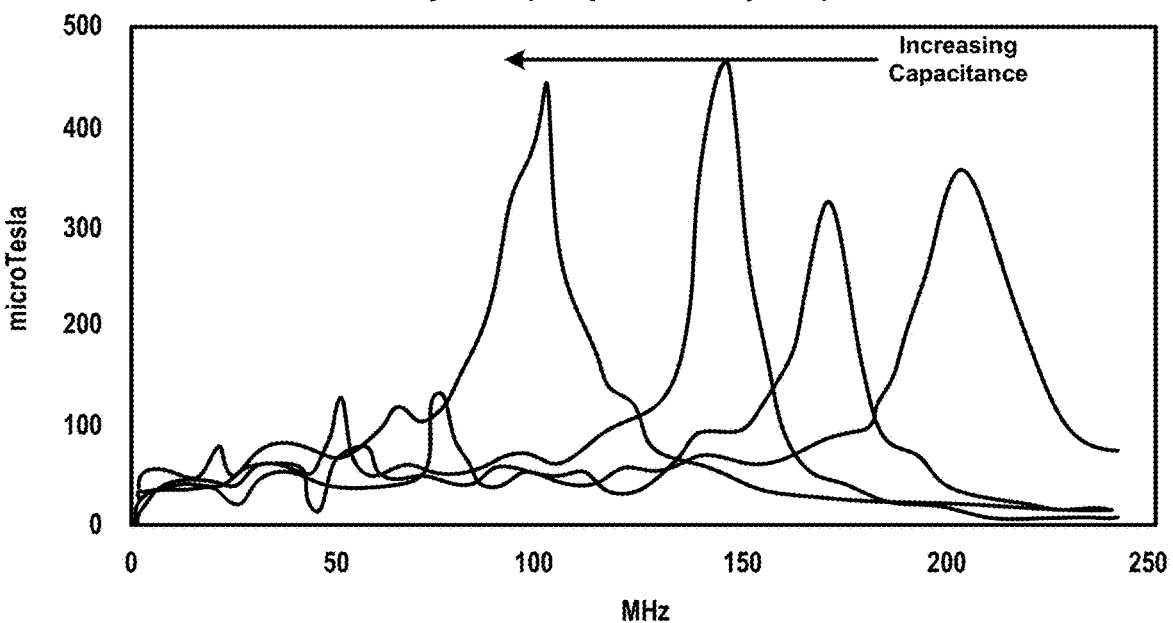
FIG. 17 is a graph illustrating flux density against frequency with a variety of capacitance values.

Early in the development of the MIS system, we focused on the development of a wide bandwidth MIS-FC as a means to couple effectively to all diameter particles in the metallic powder. While this approach is sound, in principle, it proved to be difficult to establish a low VSWR (i.e. high power transfer to the powder) over the entire bandwidth, in practice. As an alternative, the MIS-FC is designed to operate at sufficiently high frequencies such that the vast majority of particles in a given size distribution are heated by either bulk or surface heating. In this manner, a fixed parallel capacitor tank circuit can be designed specific to each powder. The resonant frequency of the MIS-FC component is easily adjusted by changing the capacitance in the tank circuit. This is illustrated in FIG. 17 that shows the measured flux density at the MIS-FC for a number of tank circuit configurations. The MIS-FC resonant frequency is seen to decrease with increasing capacitance as anticipated from Equation [4].

Figure 18:
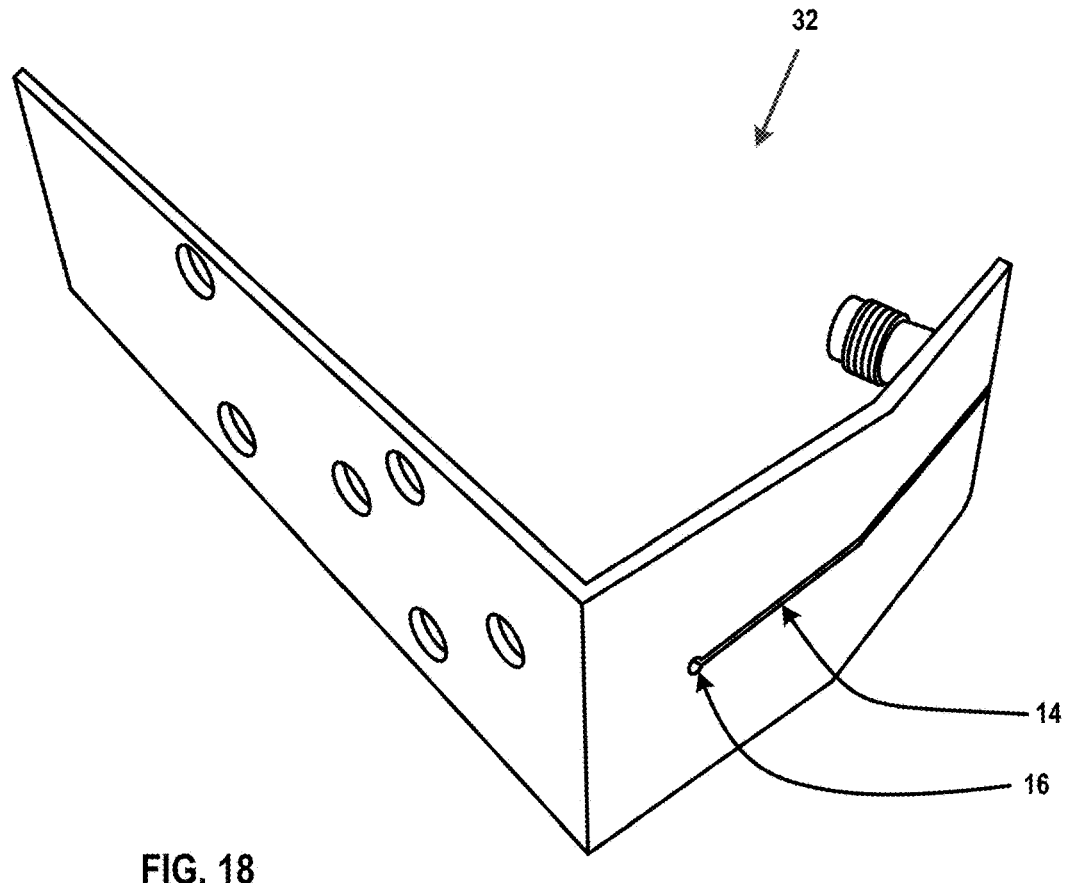
FIG. 18 is a perspective view of a print head that includes a flux concentrator according to an embodiment of the invention.

FIG. 18 shows a MIS-FC print head 32 according to an embodiment of the invention. Similar to the prototype MIS-FC 10 shown in FIG. 9, this "air-core" flux concentrator is fabricated from a 1 mm thick copper plate and consists of a thin 0.25 mm slot 14 with a 1 mm diameter hole 16 at the end. This MIS-FC design concentrates the high frequency magnetic flux within the hole 16 in the plate 12 with the appropriate matching network, and is ideal for use in close proximity to a very high temperature powder bed. The MIS-FC print head 32 is fabricated by first machining the slot and concentrator in a planar geometry, and then forming the plate into an approximate "L" geometry with a die set. The entire assembly is mounted vertically with the MIS-FC formed by the hole 16 facing down, which allows for the precise positioning of the MIS-FC above the powder bed and the easy removal and replacement of the print head, if necessary.

ScNc Powder Deposition System

Figure 19:
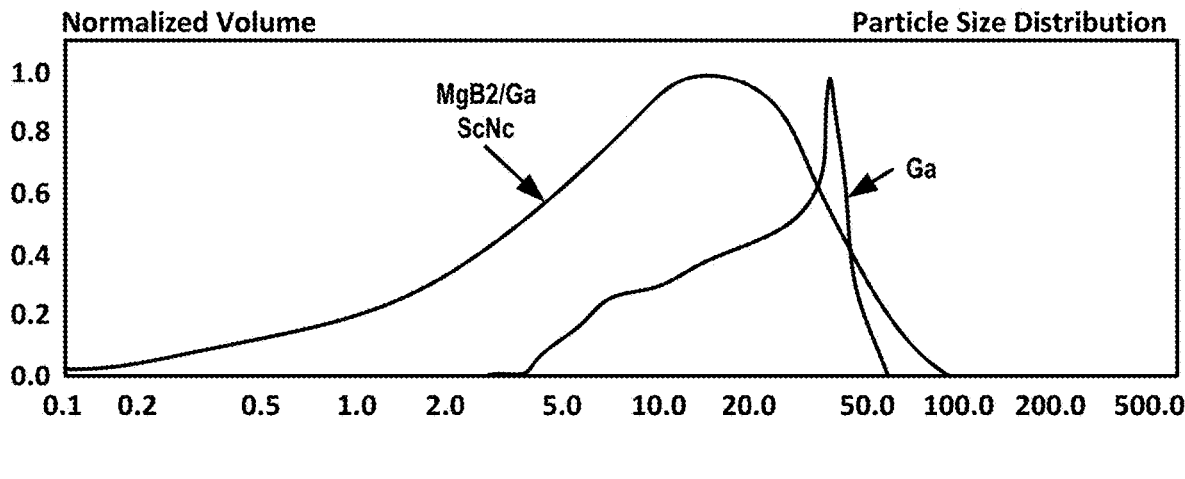
FIG. 19 is graph showing normalized particle size distribution of a Superconducting Nanocomposite (ScNc) and gallium particles.

Superconducting Nanocomposite (ScNc) powder materials consist of superconducting magnesium diboride and gallium metal prepared using a milling process that results in an intimate, homogeneous mixture of both materials. FIG. 19 shows the normalized particle size distribution of the ScNc and the gallium particles. This particular ScNc composition is 30% by volume, or approximately 50% by mass, Ga. The particle size distribution obtained through laser diffraction suggests $MgB_2$ particles as large as 100 μm, but optical analysis indicates these are agglomerates of particles will average diameters well below 50 μm.

In general, particle size, morphology, and density determine the flow characteristics of a given powder or powder mixture. These characteristics are described using a classification scheme developed by Geldart for the fluidization of powders in air driven fluidized beds, but are also useful when describing the flow properties of any powder.

Figure 20:
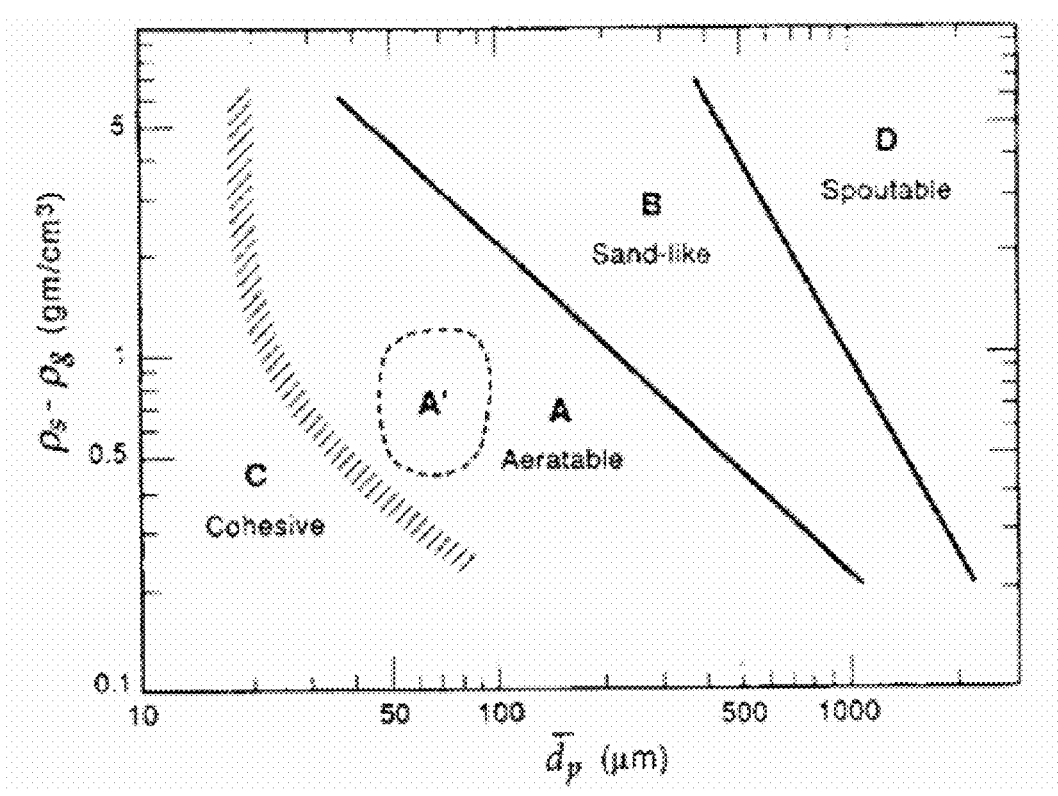
FIG. 20 is a graph showing Geldart classification for powders.

FIG. 20 shows the Geldart classification scheme for powders of a given density $\rho_S$ and particle diameter $\bar{d}_P$, where $\rho_g$ is the density of the gas used for the fluidization. Class B powders are "sand-like" and tend to fluidize and flow easily. For a given material density, however, the "flowability" of the powder decreases as the particle size decreases. In general, as the surface area of the powder increases and particle-to-particle forces dominate, the powder becomes a Geldart Class C powder, which is cohesive and possesses very poor flow properties. These flow characteristics are specific to each powder, or mixture of powders, and significantly impact the design of an effective powder delivery system for additive manufacturing.

Table 1 lists the relevant properties of ScNc powders used herein as well as some commercially available metal powders. The large particle size and moderate density of both the commercially available Al and Ti powders, for example, place these materials well within the Geldart Class B limit, as shown in FIG. 20. Because of the excellent flow characteristics of these materials, a simple mechanical screed can be used to create very uniform layers of metal powder for consolidation in an additive manufacturing system. The ScNc powder consists of very small particles with moderate to light densities, which place this composite material well within the Geldart Class (C-A) region. Unlike aluminum or titanium powders, these powders do not fluidize or flow well and thus a Geldart Class C Powder Deposition System (PDS) was designed and fabricated to manipulate The ScNc materials for use in the ScNc MIS system.

TABLE 1

| Material | Particle Size (μm) | Density (g/cm$^3$) | Geldart Class |
|---|---|---|---|
| MgB$_2$ | 1-100 | 2.57 | C: Cohesive |
| Gallium | 5-50 | 5.91 | C-A: Cohesive-Aeratable |
| Aluminum | 100-200 | 2.70 | B: Sand-like |
| Titanium | 200-400 | 4.51 | B: Sand-like |

MIS of ScNc Powder

FIG. 21 shows representative Scanning Electron Microscope (SEM) images of the MgB$_2$/Ga ScNc material. This particular ScNc composition is 30% by volume, or approximately 50% by mass, Ga. Though the particle size distribution obtained through laser diffraction suggests ScNc particles as large as 100 μm, SEM image analysis indicates these large particles are, in fact, agglomerates of 1 to 5 μm particles. The fact that these agglomerates consist of such small individual particles has dramatic consequences on the MIS-FC frequency. Theoretically, a 100 μm diameter spherical ScNc particle, for example, can be bulk heated using a high frequency magnetic field at approximately 180 MHz. If, however, the effective "electrical dimension" of the ScNc is much smaller than 100 μm, then the MIS-FC must be designed to operate at much higher frequencies.

Based on the observed ScNc particle/agglomerate morphology and the unknown "electrical dimension" of the ScNc powder, fabricated a series of MIS-FC assemblies and directly measured the power transfer by detecting heat from the ScNc material located over the MIS-FC. This method was very effective in determining the minimum frequency required for the ScNc MIS process. It was found experimentally that induction heating of the ScNc did not occur for frequencies less than approximately 700 MHz, which indicates that the "electrical dimension" of the ScNc is on the order of 35 μm, which is well below the physical size of the ScNc agglomerate.

After a series of measurements with increasing resonant frequencies, we fabricated an ultra-high frequency MIS-FC suitable for ScNc materials. FIG. 22 shows the forward and reflected power spectrum of the ScNc MIS-FC with a resonant frequency of approximately 1.2 GHz. As seen in the Figure, there are many resonances in the MIS-FC circuit over this wide bandwidth. The resonance at 1229 MHz, however, corresponds to the resonance in the tank circuit associated with installed tank capacitor. The flux density only occurs at the single turn MIS-FC with an RF field probe. The measured VSWR of the MIS-FC displays a minimum of 1.87 at 1229 MHz, which corresponds to approximately 90% transfer of power to the load.

Voltage Standing Wave Ratio Spectroscopy

A particularly unique feature of the MIS process is the potential for real time diagnostics and monitoring of the sintering and consolidation of the metal particles during the additive manufacturing of a part. To illustrate this, consider the MIS tank circuit of FIG. 11 operating at a resonant frequency that couples well to a given powder. Recall that when this circuit is driven at resonance, large reactive currents flow in the tank circuit, but little real power is drawn from the amplifier if the MIS-FC is not in close proximity to the powder bed. As the MIS-FC tip is brought near the surface of the powder bed, however, real power is drawn from the RF amplifier and the metal particles are rapidly heated by induction. Essentially, the MIS-FC acts as the primary of a transformer during this process and the individual metal particles act as the secondary.

Figure 23A:
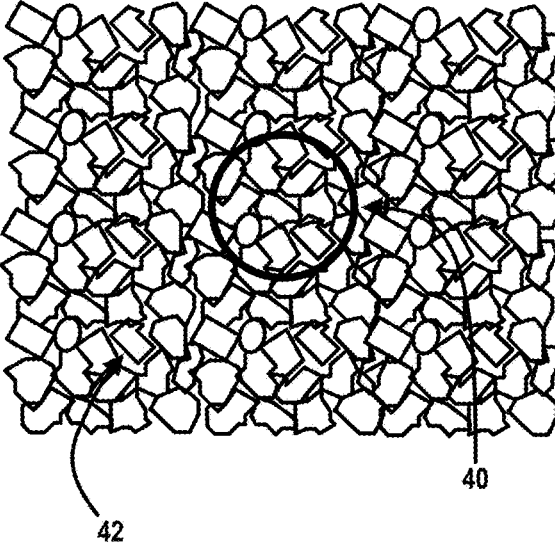
FIG. 23*a-c* illustrate sintering of particles.
Figure 23B:
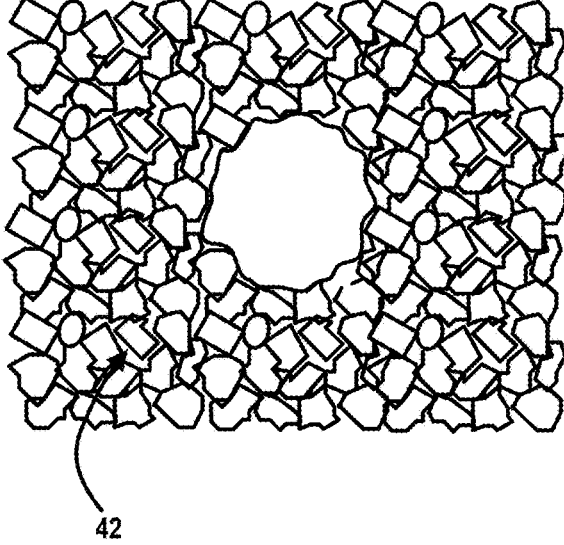
Figure 23C:
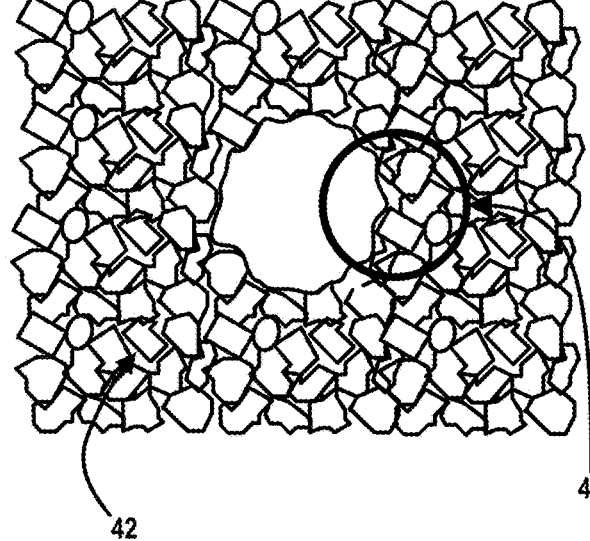

As discussed previously, bulk heating of the particles will only occur when the diameter d of the particles is on the order of 6δ. As the particles heat and sinter together, the effective diameter increases significantly and the bulk induction heating of the individual particles transforms into the surface heating of the consolidated powder in the region of the MIS-FC tip. This is illustrated schematically in FIGS. 23a to 23c, where the circle 40 represents the spatial extent of the high frequency flux density on the surface of the powder bed 42. Note: the spatial extent of magnetic flux density on the powder bed is many times larger than the average diameter of the metal particles. When the MIS-FC is energized, the particles heat rapidly and fuse together as shown schematically in FIG. 23b. If this sintered domain is 5 to 10 times larger than the individual particles, the frequency for bulk heating of the sintered domain would be reduced by 25 to 100 times (see Equation [3]). Thus, as the metal particles fuse together during the MIS process, the power flow at high frequencies to the MIS-FC is significantly reduced due to the dramatic increase in the effective "electrical dimension" d/δ. Real power will only flow to the powder bed via the MIS-FC as it moves over new, unsintered particles, as shown in FIG. 23c. This provides a real time measurement of the quality of the consolidation of the particles during the MIS process.

Figure 24:
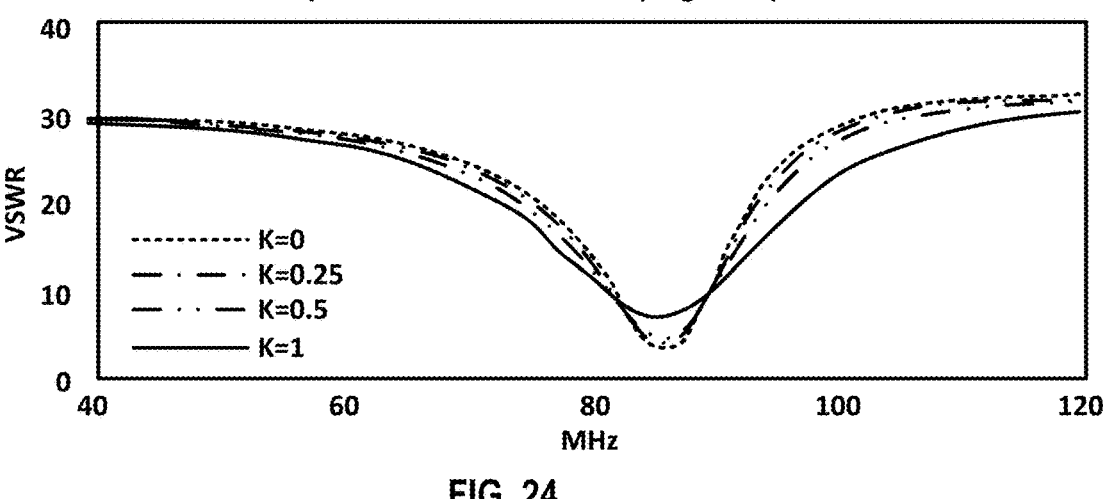
FIG. 24 is a graph showing calculated VSWR's for a particular tank circuit.
Figure 25:
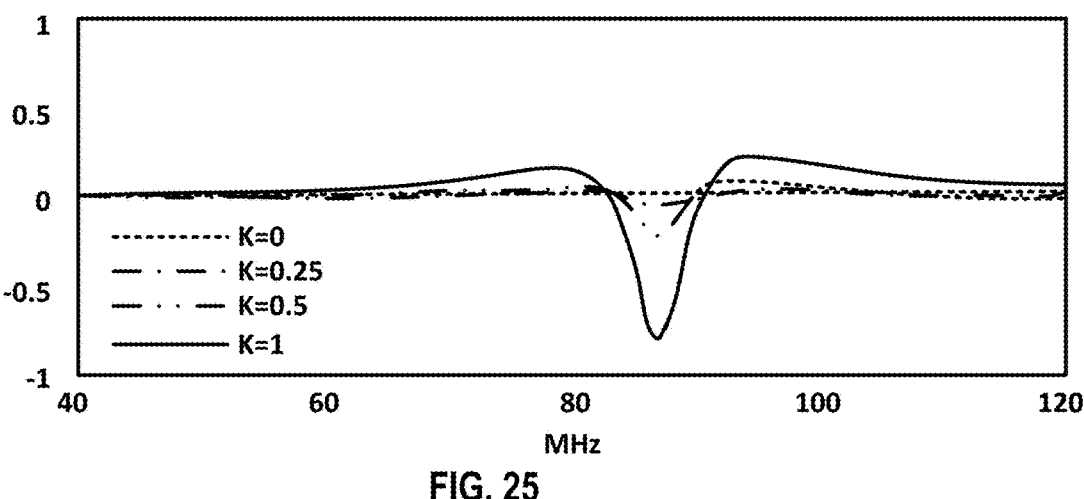
FIG. 25 shows the calculated VSWR ratio θ as a function of coupling M.

FIG. 24 shows calculated VSWRs for a MIS-FC tank circuit with a resonant frequency of approximately 86 MHz and increasing values of the coupling M. The overall shape of the VSWR changes as M increases. As discussed previously, changes in M reflect changes in the degree of coupling between the powder and the MIS-FC, which will occur when the MIS-FC passes over individual particles or fused particles. In order to emphasize the changes in the VSWR with increased coupling, we define a normalized VSWR ratio θ as:

$$\theta = 1 - \left( \frac{VSWR_{K>0}}{VSWR_{K=0}} \right), \tag{7}$$

where $VSWR_{K>0}$ is the VSWR of the MIS-FC circuit when it is coupled to the powder bed, and $VSWR_{K=0}$ is the VSWR of the MIS-FC circuit when it is completely de-coupled from the powder bed. Similar to the VSWR, this normalized quantity is also independent of the level of RF power incident on the MIS-FC. Note that θ is unity if there is no coupling to the powder bed for all frequencies. FIG. 25 shows the calculated θ as a function of coupling M for the VSWRs shown in FIG. 24. As anticipated, there is considerable structure in θ with increasing coupling of the RF power to the powder bed.

Figure 26:
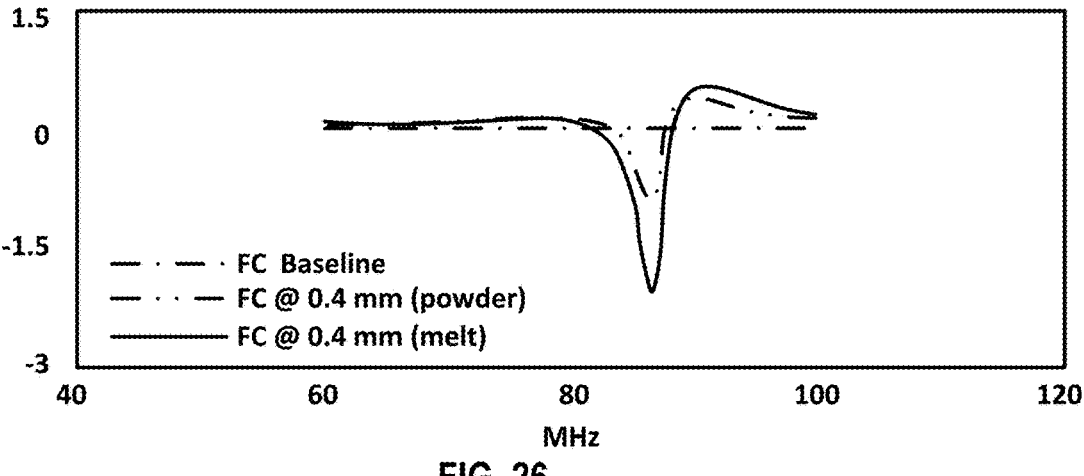
FIG. 26 is a graph showing the result of real-time monitoring of an additive manufacturing process and that indicates the normalized ratio of the VSWR's during an MIS process.

FIG. 26 shows the results of real time monitoring of the additive manufacturing process that indicate the normalized ratio of the VSWRs during the MIS process can be used to monitor the degree of sintering and consolidation of the particles. This method of non-destructive evaluation is called Voltage Standing Wave Ratio Spectroscopy.

In addition to the high frequency VSWR spectroscopy, auxiliary low frequency induction heaters located near the MIS-FC assembly could be used to probe the quality of the consolidation over larger length scales and to locally heat treat the part during fabrication to reduce the mechanical stress on the part.

Figure 27A:
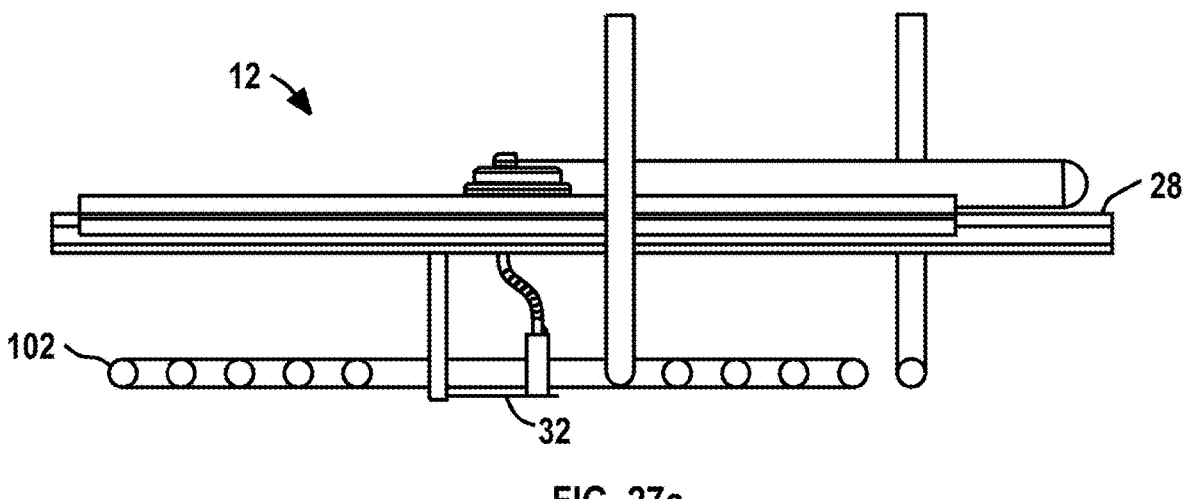
FIG. 27*a-b* are partially cross-sectioned side and perspective views of a sintering apparatus according to an embodiment of the invention.
Figure 27B:
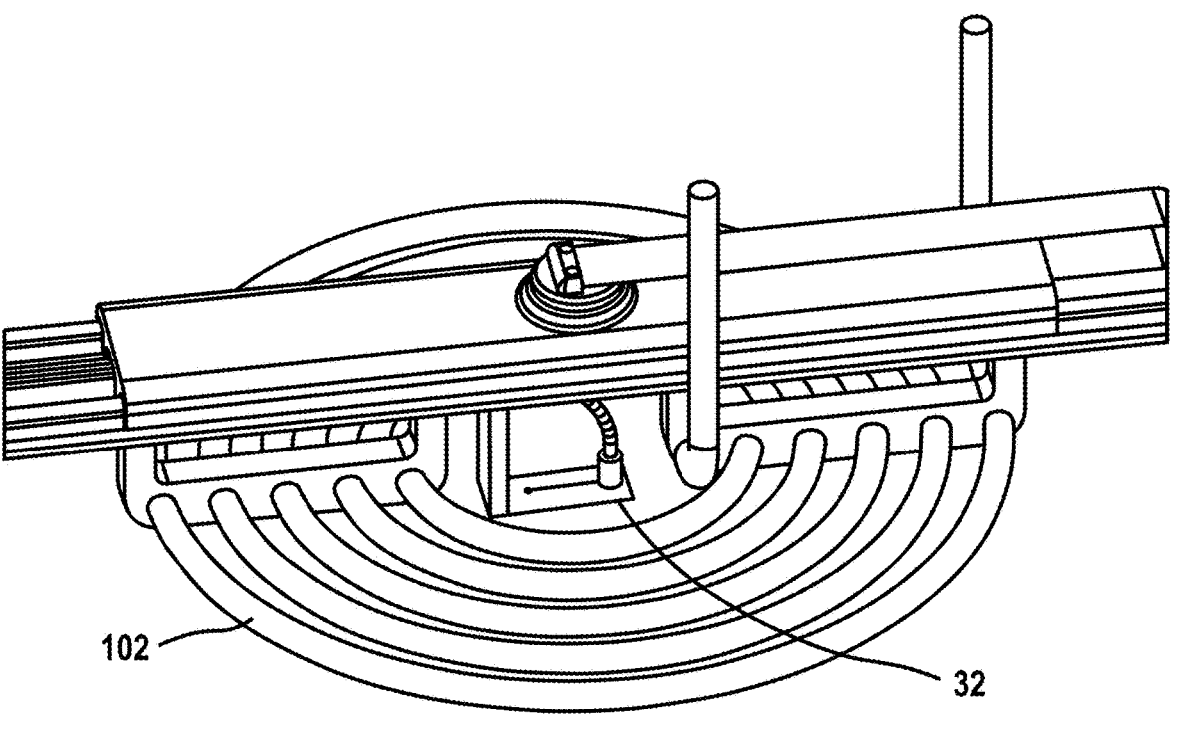

FIGS. 27a and 27b show an embodiment where a localized heater in the form of the print head 32 with high frequency flux concentrator is in the middle of bulk heater in the form of a larger, low frequency induction coil 102. The low frequency coil 102 is used to heat the consolidated part in preparation for the sintering of the powder by the high frequency flux concentrator that when the particles sinter into a larger unit, the increased domain size leads to inefficient surface heating. The high frequency of the flux concentrator of the print head 32 is not ideal for bulk heating. The low frequency, spatially disperse flux concentrator (i.e. the induction coil) can be used to heat the macroscopic part, reduce thermal and mechanical stress, and reduce the amount of power required for the initial powder consolidation.

The low frequency coil 102 is driven by its own electric current generator (not shown) and exposes the part to an alternating magnetic field generated by the alternating electric current. The high frequency of the flux concentrator of the print head 32 heats only a portion of the particles that are in contact with the part so that the particles of the portion join with the part. The alternating electric current for preheating the part is a low frequency alternating electric current that exposes the part to a low frequency alternating magnetic field. The alternating current for heating the particles is a high frequency alternating electric current that exposes a portion of the particles that are in contact with the part to a high frequency alternating magnetic field.

Figure 28:
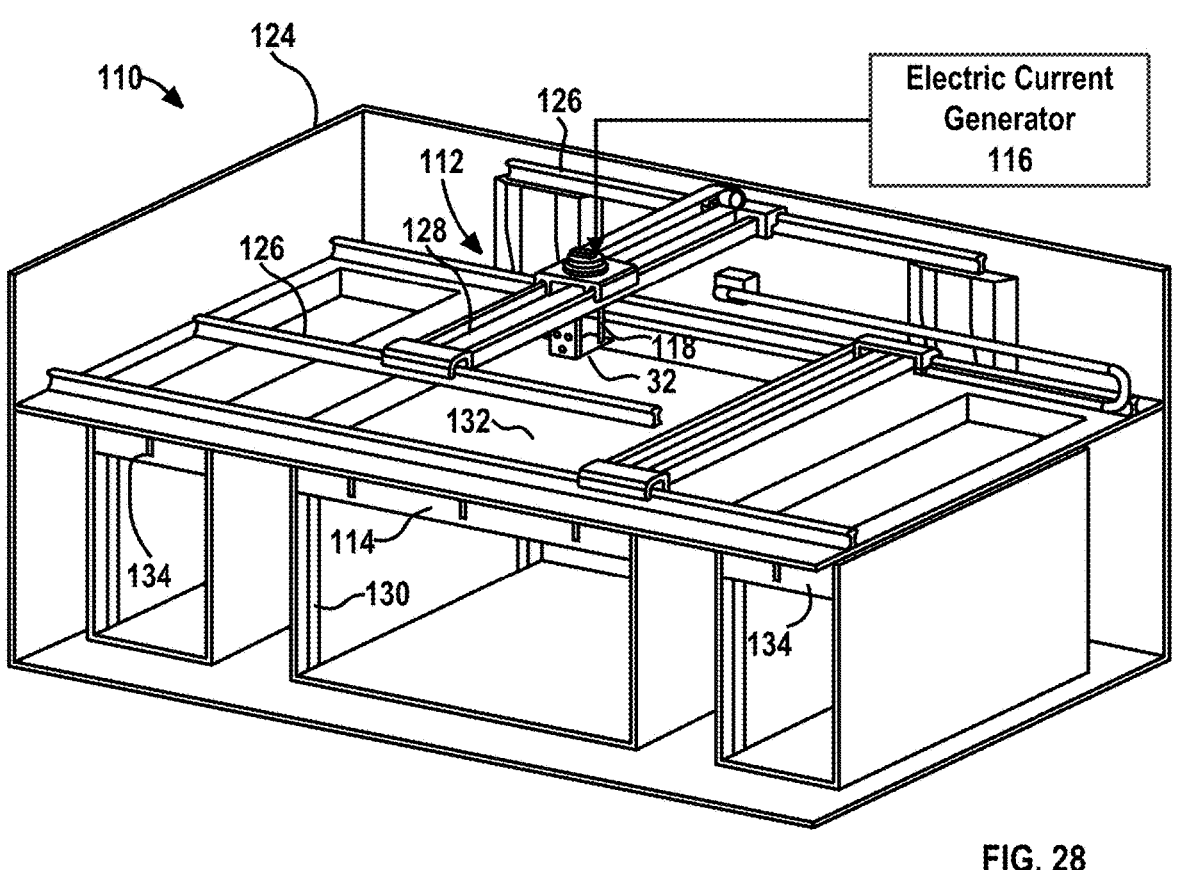
FIG. 28 is a perspective view of the sintering apparatus.

FIG. 28 illustrates an MIS apparatus 110 according to an embodiment of the invention. The apparatus 110 includes a system 112 for creating relative movement in three-dimensions, a container 114, an electric current generator 116, a high frequency electric lead 118, and the print head 32. The entire apparatus 110 resides in a controlled atmosphere environment.

The system 112 includes a frame 124, first and second tracks 126, a boom 128, and a plurality of rails 130. The tracks 126 are mounted to the frame 124 on opposing sides thereof and extend in an x direction. The boom 128 is mounted between the rails 130 and extends in a y direction. The boom 128 is movable in the x direction on the rails 130. An actuator (not shown) moves the boom 128 horizontally on the rails 130 in the x direction. The print head 32 is mounted to the boom 128 for movement in the y direction on the boom 128. An actuator (not shown) moves the print head 32 horizontally on the boom 128 in the y direction.

The container 114 is a horizontal bed with sides for containing and holding small particles 132 that contact one another. The rails 130 extend in a vertical z direction. The container 114 is mounted to the rails 130 for movement up and down in the vertical z direction. An actuator (not shown) moves the container 114 up and down the rails 130 in the vertical z direction.

The apparatus 110 further includes two powder reservoirs 134. The powder reservoirs 134 are also movable in a vertical z direction. By raising the powder reservoirs 134 and/or lowering the container 114, a height differential can be created between the particles 132 in the container 114 and particles held in the powder reservoir 134 so that particles can be scraped from the powder reservoirs 134 into and over the particles 132 already in the container 114.

It can thus be seen that the system 112 provides for movement in three-dimensions of the print head 32 relative to the particles 132. In use, a thin layer of particles 132 is scraped from the reservoirs 134 onto the container 114. The electric current generator 116 is connected through the lead 118 to the print head 32. When the electric current generator 116 is operated, it generates an alternating electric current and provides the alternating electric current through the lead 118 to an area adjacent the print head 32. The print head 32 is held close to the particles 132 and focuses an alternating magnetic field generated by the alternating magnetic current within a small first portion of the particles 132. The alternating magnetic field heats the particles so that they join. Joining of the particles occurs due to sintering and or melting of the material. The flux concentrator is then moved in x and/or y directions so that the alternating magnetic field is reduced from the first portion of the particles while exposing a second, adjacent portion of the particles to the alternating magnetic field. A reduction in the alternating magnetic field strength at the first portion of particles that has been joined allows the first portion to cool. In reality, there is a transition from the first portion to the second portion, and then to a third portion and so on so that an elongate part can be formed. The elongate part can have a two-dimensional profile in x and y directions.

After the part is formed within the particles 132, the container 114 is lowered and a new layer of particles is scraped onto the particles 132 from the reservoirs 134. The process hereinbefore described is then repeated. The particles that are heated in the second cycle are not only fused to one another, but are also fused to the part that has been manufactured in the first cycle. Should a circular plate for example be manufactured during the first cycle, the second cycle will add another layer to the circular plate and if the process is repeated, a cylinder may be manufactured. It may also be possible to manufacture more complex, three-dimensional shapes in this manner.

Figure 29:
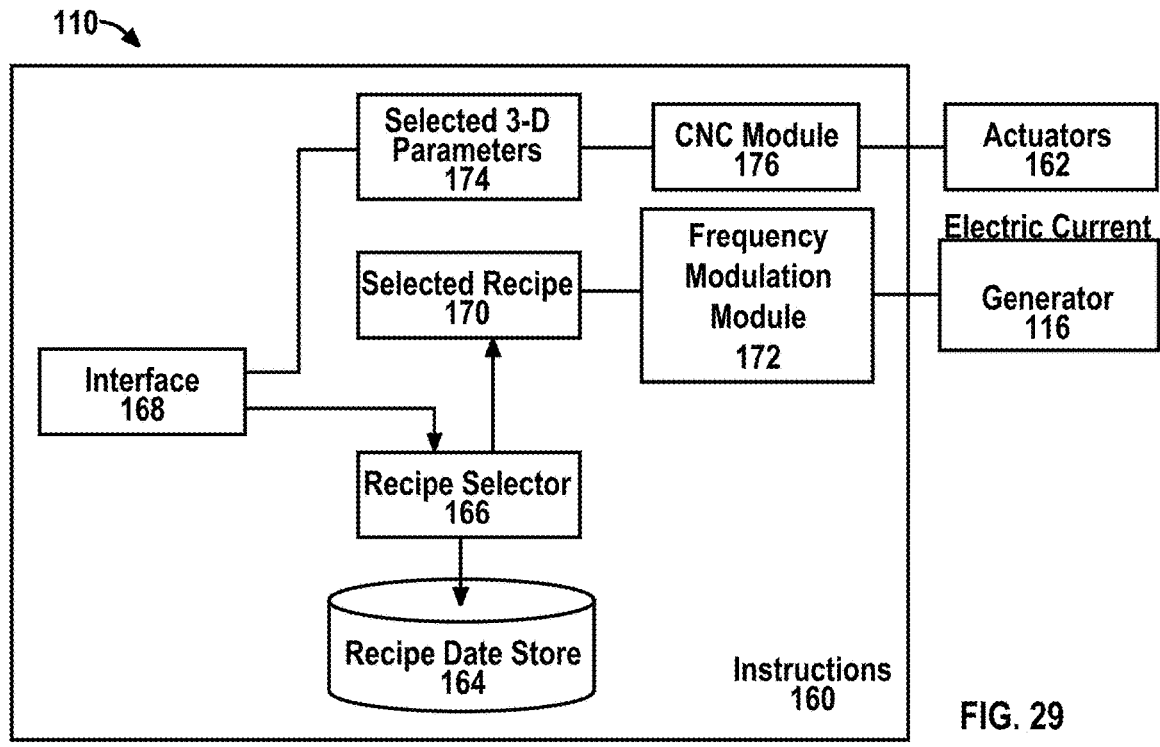
FIG. 29 is a block diagram illustrating instructions forming part of the apparatus of FIG. 28.

FIG. 29 illustrates further components of the apparatus 110 shown in FIG. 28, including instructions 160 that are executable by a processor of a computer, actuators 162 to cause movement in x, y and z directions of the print head 32 relative to the particles 132, and an electric current generator 116.

The instructions 160 include a recipe data store 164, a recipe selector 166, an interface 168, a selected recipe 170, a frequency modulation module 172, selected 3D parameters 174, and a CNC module 176.

In use, an operator can view the interface 168 on a display device. The interface 168 gives the operator access to the recipe selector 166 and the selected 3D parameters 174. The recipe selector 166 includes inputs for materials and particle sizes. A plurality of recipes are stored in the recipe data store 164. The recipe selector 166 selects one of the recipes in the recipe data store 164 based on the input provided by the operator through the interface 168. The recipe that is selected by the recipe selector 166 is then stored as the selected recipe 170.

The operator also enters 3D parameters through the interface 168, for example the manufacture of a cylinder as hereinbefore described. The parameters that are entered by the operator are then stored as the selected 3D parameters 174. The frequency modulation module 172 then utilizes the parameters of the selected recipe 170, including frequency, to modulate a frequency generated by the electric current generator 116. The CNC module 176 simultaneously operates the actuators 162 to create a desired two-dimensional, and ultimately three-dimensional part.

Figure 30:
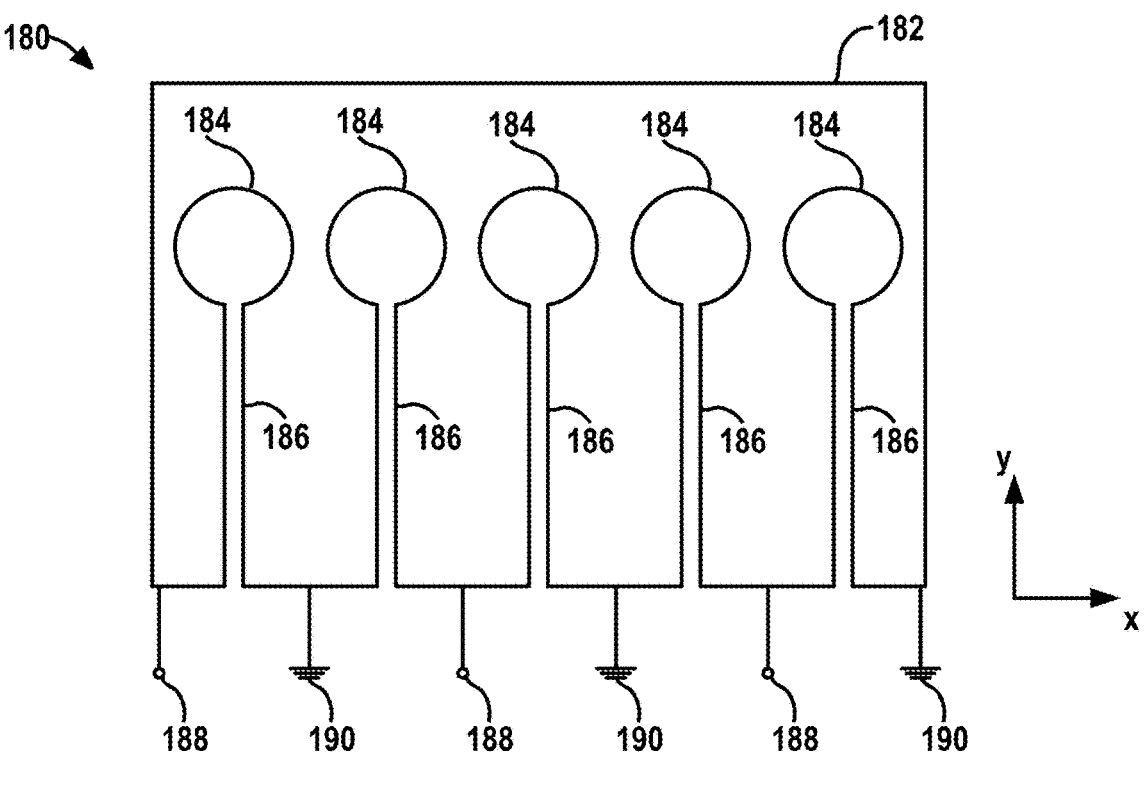
FIGS. 30 and 31 show print heads according to alternate embodiments of the invention that allow for bulk manufacture.

FIG. 30 shows a print head 180 comprising a plate 182 with a plurality of holes 184 and slots 186. Each hole 184 and slot 186 is as hereinbefore described with reference to FIG. 9. Each hole 184 thus forms a respective flux concentrator. One terminal of a flux concentrator forms an electric current terminal 188 and an opposite terminal is connected to ground 190. The holes 184 are located in a single row that extends in an x-direction.

Figure 31:
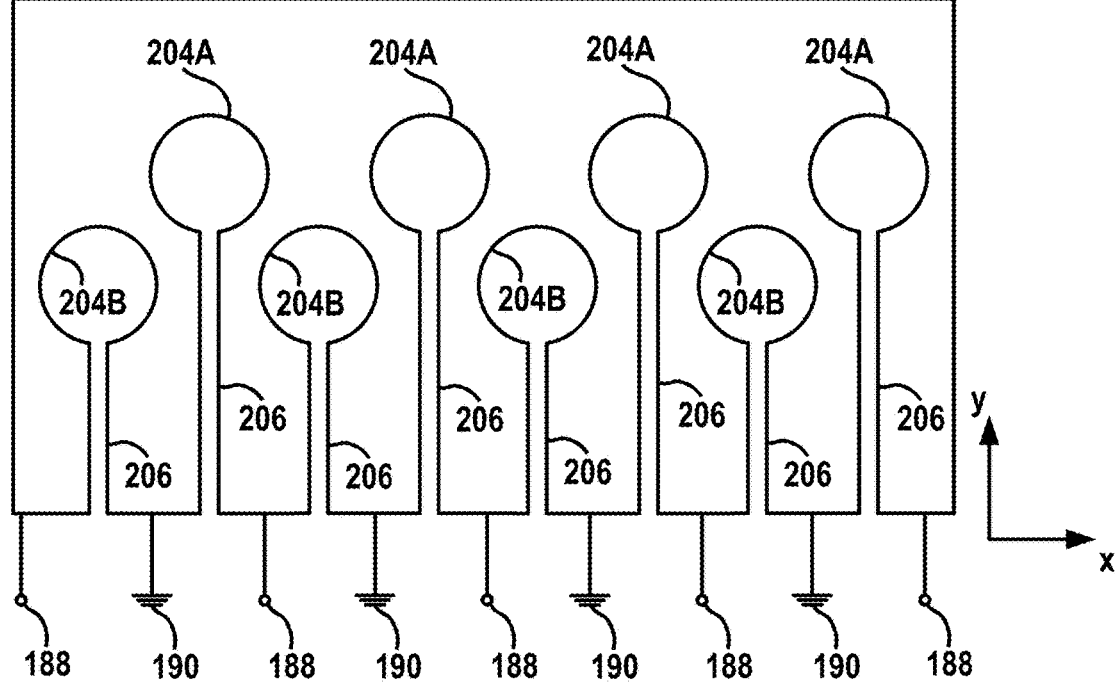
Figure 32:
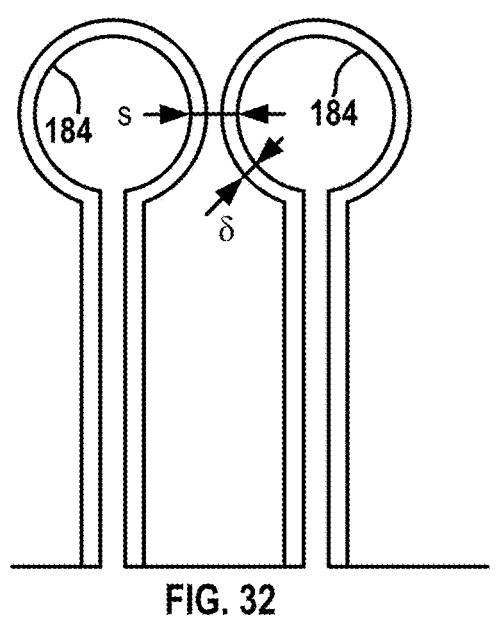
FIGS. 32 and 33 are enlarged views of FIGS. 30 and 31 showing the spacing and location of skin depth.

FIG. 31 shows a print head, according to another embodiment of the invention, having a plate 202 with holes 204A and B and slots 206. The holes 204A are located in a first row extending in an x-direction. The holes 204B are located in a second row extending in an x-direction. The second row of holes is offset from the first row of holes in a y-direction. As shown in FIG. 32, current flows within a skin depth δ. The distance within the metal at which the current is reduced by approximately 37% of the value at the surface is called the skin depth δ and can be written as:

$$\delta = \sqrt{\frac{\rho}{\pi f \mu}} \quad [8]$$

ρ is the resistivity of the material of the plate,
μ is the permeability of the material of the plate; and
f is the frequency of the magnetic field.

Figure 33:
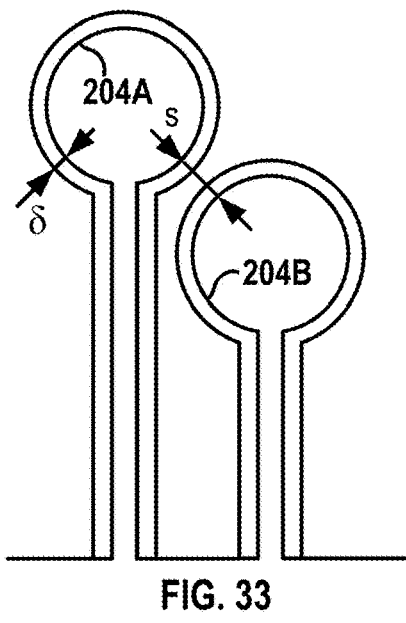

The holes 184 are spaced from one another by a distance s. In order for the currents of the holes 184 to remain separate from one another, s≥2δ. In FIG. 32, s is measured in a y-direction. In FIG. 33, s is the closest distance between adjacent ones of the holes 204A and B.

In general, each flux concentrator heats a respective region of the underlying part or parts. A respective heat affected zone is thereby created in the respective region where atom movement causes a change in a property of a material the part or parts. The material may or may not melt. A plurality of particles may be sintered together due to migration of atoms between the particles, which is an example of a non-melting change in properties of a material. A non-melting change in properties of a material may include a change in microstructure of the material. Such a change in microstructure may for example include a phase change of the material wherein a crystal structure of the material is changed. Such a change in crystal structure may involve a change in lattice structure with or without the inclusion of additional or replacement atoms or may include the inclusion or replacement of atoms without a change in the lattice structure. A phase change may involve a change in the grain size.

Figure 34A:
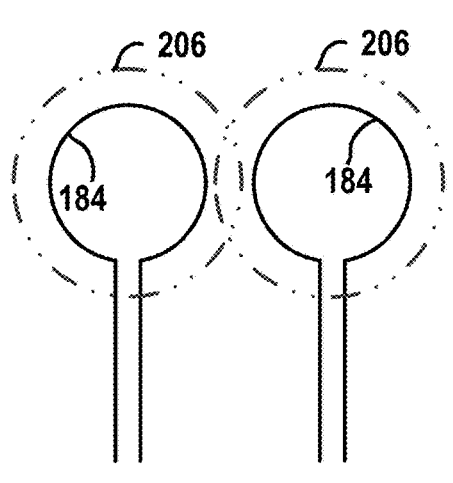
FIGS. 34*a* and 34*b* illustrate heat affected regions where phase change occurs.
Figure 34B:
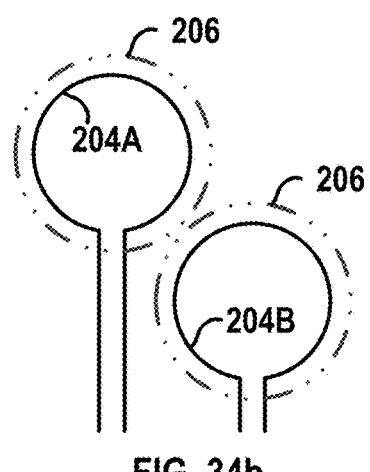

As shown in FIGS. 34a-b, the alternating magnetic fields created by the holes 184 and 204A and B create heat affected regions 206 within the underlying part or parts such as particles that are larger than the holes 184 and 204A and B.

Figure 36:
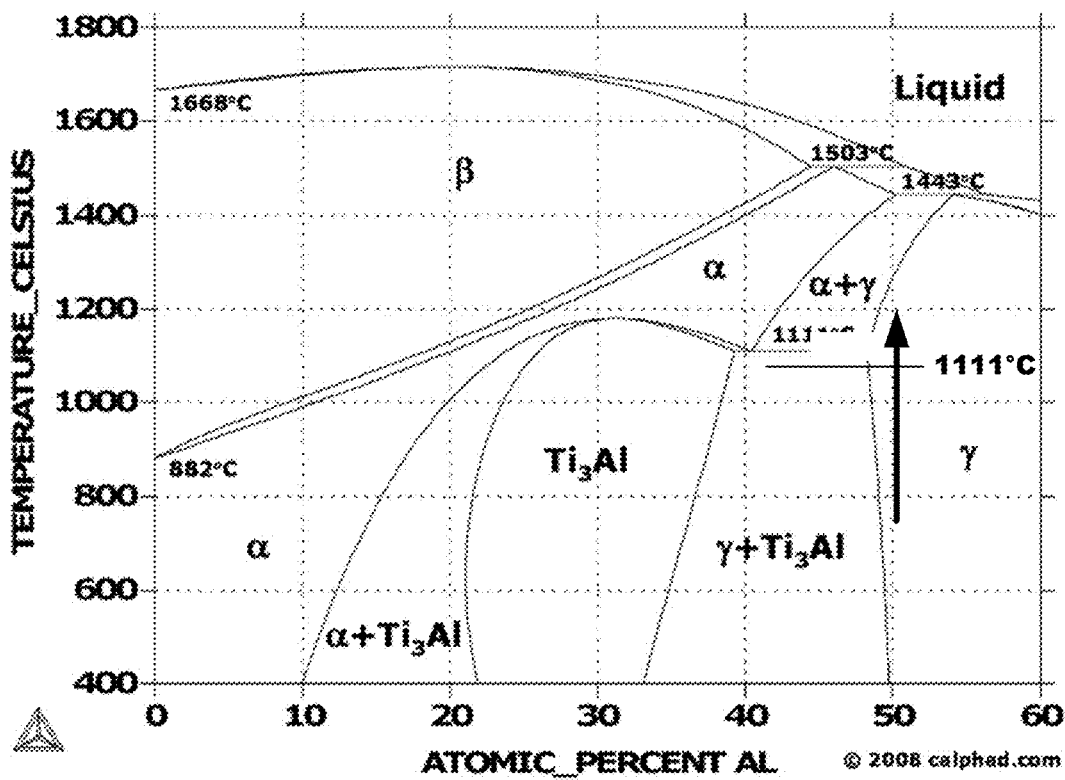
FIG. 36 is a Ti—Al phase diagram that includes a phase change at 1111° C. of Ti-48 Al-2 Cr-2 Nb.
Figure 37F:
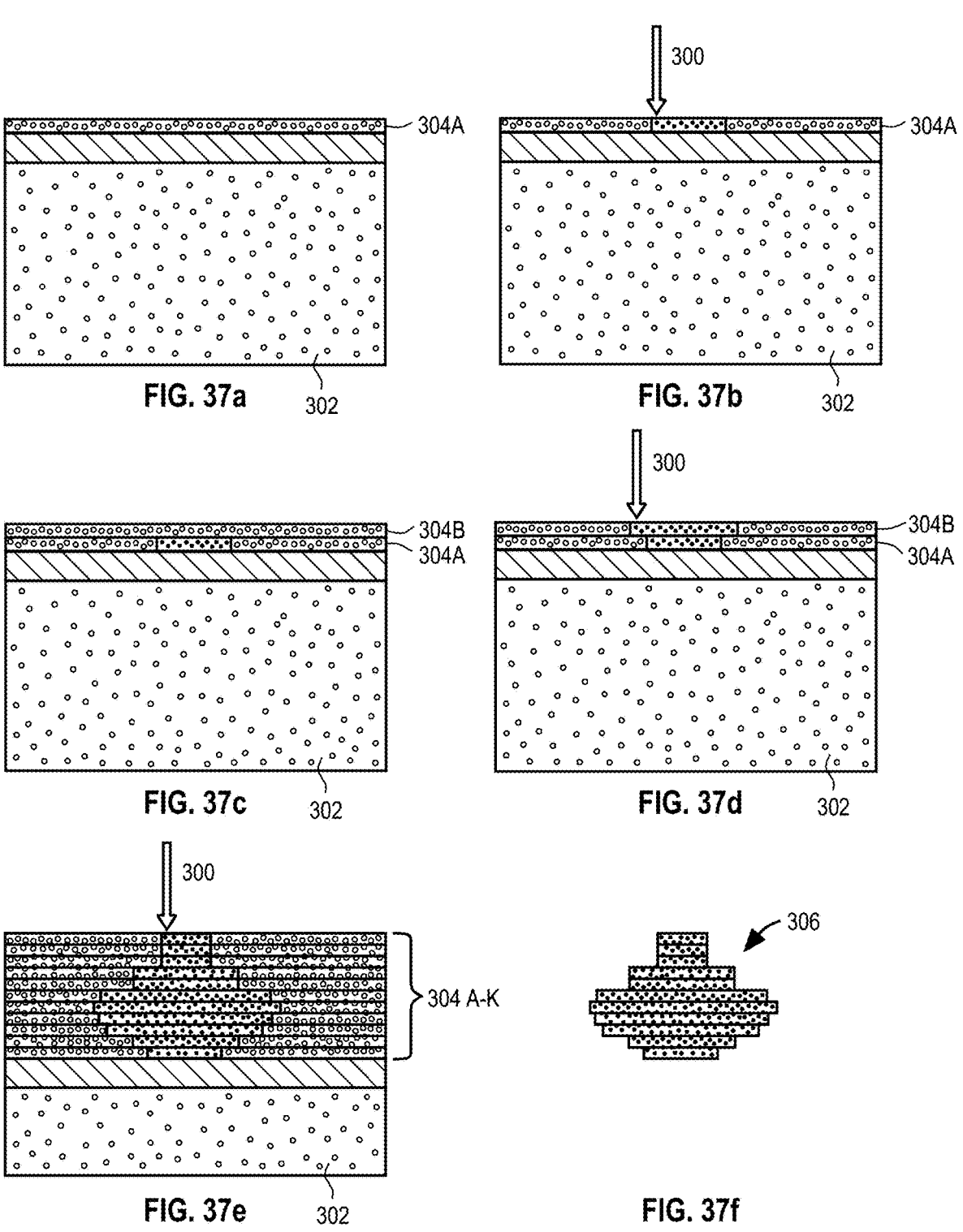

FIG. 36 shows, by way of example, a Ti—Al phase diagram to illustrate an example of a phase change in the material. A composition of Ti-48 Al-2 Cr-2 Nb (48% aluminum) has a phase change at 1111° C. Below 1111° C., the composition is a mixture of γ and Ti₃Al. Above 1111° C., the composition consists of solid a and solid γ without having been melted. A subsequent quenching to below 1111° C. will render a composition of α and γ only.

Figure 35A:
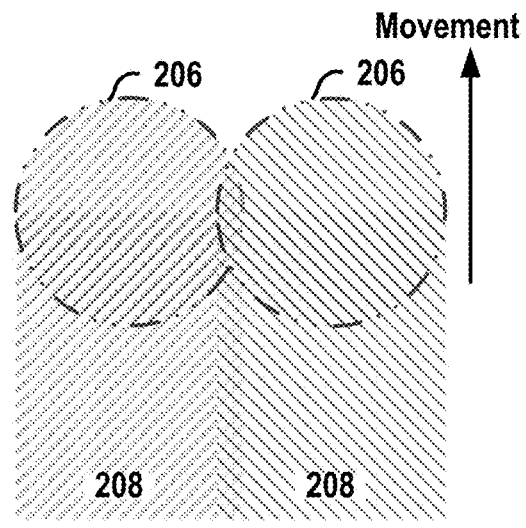
FIGS. 35*a* and 35*b* show trailing paths of the regions in FIGS. 34*a* and 34*b*, respectively, where phase change has occurred.

As shown in FIG. 35a, the regions 206 that are formed due to the holes 184 in FIG. 34a are simultaneously moved in a y-direction i.e., at right angles to the rows of holes 184 shone in FIG. 34a. Each region 206 leaves a respective trailing path 208 where the phase change has happened. The trailing path 208 of the region 206 on the left is cross-hatched from bottom left to top right and the trailing 208 of the region 206 on the right is cross-hatched from bottom right to top left. Because the regions 206 overlap, and are in-line with one another in an x-direction, the trailing paths 208 also overlap. There is thus no break between the trailing paths 208 where the phase change did not occur.

Figure 35B:
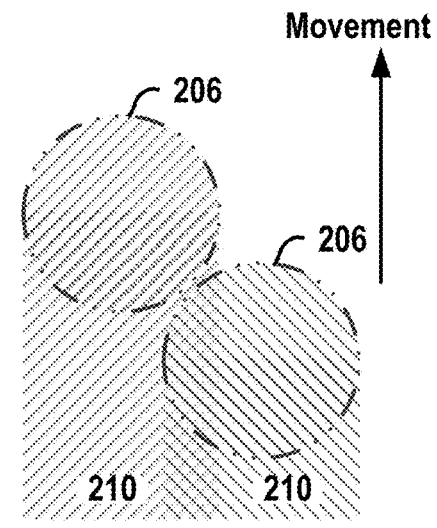

FIG. 35b shows the regions 206 where phase change occurs due to the holes 204A and B in FIG. 34b. Each region 206 forms a respective trailing path 210 where phase change has occurred. The trailing paths 210 overlap one another. Because the holes 204A and B are offset in both an x- and a y-direction, there is no need for the regions 206 to overlap at any particular moment in time.

FIGS. 37a-f illustrate a conventional AM powder manufacture method. A local energy input is represented by the arrow 300, and this energy source travels over the powder bed in a pattern that traces the profile of the two dimensional slice. The consolidated part is fabricated by slowly submerging the as-built part into a powder bed 302. After a layer 304A is consolidated for example, the as-built part is lowered and a fresh layer 304B of powder is deposited over the previously consolidated layer 304A. The process is then repeated for subsequent layers 304A-K. At the end of the process, a multi-layer, partially- to fully-consolidated part 306 is removed from the loose powder in the powder bed 302 and subjected to a number of post-processing routines such as subtractive machining or additional thermal or mechanical treatments.

In conventional AM, the final resolution of the part is determined by the spatial and temporal resolution of the input energy in the X-Y plane (i.e. the "spot" size), the penetration of the energy in the Z direction (i.e. how deep into the powder bed/substrate), and the physics of energy transport away from the fusion and heat affected zones (i.e. the heat capacity, thermal diffusivity, thermal conductivity, crystallization and solidification kinetics, heat of fusion, etc.). It is well known, for example, that the energy required to melt a small feature in a powder bed must be delivered over a very short time frame. Longer exposure times to the energy source causes "growth" of the localized melt area resulting from the sintering of neighboring particles due to thermal conduction. Thus, a very small "spot" size may result in a locally melted region with a large section of loosely sintered particles that may extend far from the "spot" and the resolution of the part is not determined simply by the X-Y dimension of the energy source.

In this invention, an alternative method of complex part fabrication is proposed in which a part is fabricated in an AM process that creates a high resolution ordered arrangement of loose or loosely consolidated materials within a powder bed, which respond in different ways to the input energy source. The energy input to the powder bed is not necessarily localized in the X-Y plane, but rather can be a dimension much larger than the resolution of the part. Thus, the resolution of the part is determined by the spatial ordering of the loose or loosely consolidated material in the powder bed and not necessarily by the spatial resolution of the input energy source.

FIGS. 38a-f shows one embodiment of the invention in which an ordered powder layer is heated layer-by-layer to produce a complex part. In FIG. 38a, the material to be consolidated is represented by the pattern 310. The pattern 312 represents material that will not be consolidated by the process used to consolidate the material represented by the pattern 310. For example, the two materials may possess very different melting points, which will result in the consolidation of the lower temperature melting point material with proper thermal processing. In this example, a low frequency induction heater 314 is used to heat the substrate. The induction frequency is chosen such that there is efficient power transfer to the substrate. As the substrate heats, the loose powder represented by the pattern 310 is heated and begins to consolidate. This is shown schematically in FIG. 38b, where the pattern 310 represents a consolidated material that no longer consists of individual particles, but consists of loosely sintered particles or fully dense material.

A first layer 320A is thus heated to consolidate the particles of a first material represented by the pattern 310 of the first layer 320A before depositing a second layer 320B on the first layer 320A. The second layer 320B is heated, after depositing the second layer 320B on the first layer 320A, to consolidate the particles of the first material represented by the pattern 310 of the second layer 320B.

A plurality of layers 320A-I are depositing on one another. A first of the layers 320A includes a portion of the first material represented by the pattern 310 and a portion of the second material represented by the pattern 312, and a second of the layers 320B includes a portion of the first material represented by the pattern 310 and a portion of the second material represented by the pattern 312. The first material of the second layer 320B is in contact with the first material of the first layer 320A. On a multi-layer level the patterns 310 and 312 define first and second volumes and an interface 322 that is formed between the first and second volumes. Consolidation by heating connects the particles of the first material of the second layer 320B to the first material of the first layer 320A. As shown in FIGS. 38g and h, a complex part 324 is fabricated in this manner through the layer-by-layer deposition of powder of layers 320A-I in an ordered fashion over the previously sintered or consolidated material. Each layer 320A-I of ordered powder is subjected to a broad energy input that selectively consolidates the material represented by the pattern 310. An edge 326 of a part 324 (FIG. 38h) is defined by the interface 322 (FIG. 38g) between the first and second volumes. As seen in the FIG. 38g, this method can be used to create internal features 320A-I (e.g. pockets, holes, and cavities) by using the material that will not sinter or consolidate when exposed to the energy source.

Although the particles of the powder are connected by heating consolidation, other connection schemes may be employed. Most cases involve (i) forming first volume of first powder having first particles of a first material in contact with a second volume of second powder having second particles of a second material and (ii) employing a connection scheme to connect the particles to one another, wherein the first material is a positive material and the second material is a negative material so that the positive material preferentially connects the first particles to one another relative to the negative material connecting the second particles to one another. In most cases the first material together with a substrate or earlier layer form a holder suitable to hold the first particles of a first powder in proximity to one another.

Figure 39A:
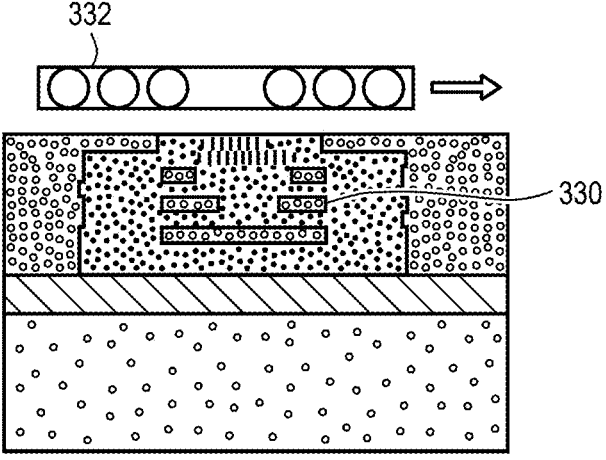
FIGS. 39*a-b* are cross-sectional side views illustrating a complex part with a number of internal features that are be fabricated using the manufacturing method.
Figure 39B:
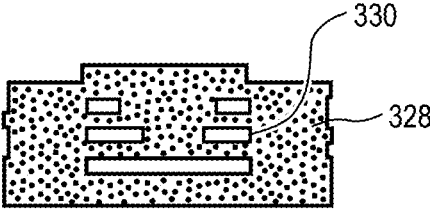

FIGS. 39a-b show a schematic of a complex part 328 with a number of internal features 330 that can be fabricated using this process. In this example, the induction heating with an induction heater 332 is used to selectively heat the previously consolidated/sintered material on a layer-by-layer basis. The induction heating technology will heat the substrate material in a reference depth determined by the skin depth of the material and the thermal conductivity and thermal diffusivity of the substrate. The internal features 330 can be closed or open. If the internal features are closed, then the loose powder remains within the cavity formed by the internal features. The negative powder within the internal features 330 also serves to hold the positive powder in place before the positive powder is consolidated.

Alternatively, the induction frequency can be tuned to specifically heat the loose powdered material, the loose powdered material and the substrate, or specifically the substrate.

While heating by induction is used in this example, any number of energy sources can be used to heat and consolidate the ordered powder layer such as laser, high intensity light, radiant heat, electron beam, etc.

Alternatively, as shown schematically in FIGS. 40a-f, a three-dimensional part 336 can be fabricated using the layer-by-layer powder deposition technology by creating a three dimensional ordered powder part within the powder bed. In FIG. 40a, complex loose powder structure is formed completely within the powder bed using multiple layers 338 of powder, each layer having powder of positive and negative materials. After the spatially ordered powder, that comprises the part 336, is fabricated, the entire system is heated as shown in FIG. 40b to a temperature that results in the partial or complete consolidation of the part. In effect, a first layer and a second layer are simultaneously heated to consolidate the particles of the first material of the first layer and the second layer. The entire system is then allowed to cool down as shown in FIG. 40c. In FIG. 40d, the partially (or fully) consolidated part 336 is removed from the powder bed for post processing. Post processing may include the machining of the part or, as shown in FIG. 40e, further heat treatments to achieve the proper microstructure, density, and materials properties.

The part 336 can be fabricated using two different materials, wherein one material has a lower melting point than the other material. A three-dimensional ordered part can be fabricated through a layer-by-layer process and heated using the method outlined in FIGS. 40a-f and internal features can be fabricated using this method.

An additively manufactured part 336 with internal cavities 340 can be formed using this process, i.e. a part 336 wherein a second volume formed by negative material is within the first volume formed by positive material and the first volume partially or entirely encloses the second volume.

Figure 41:
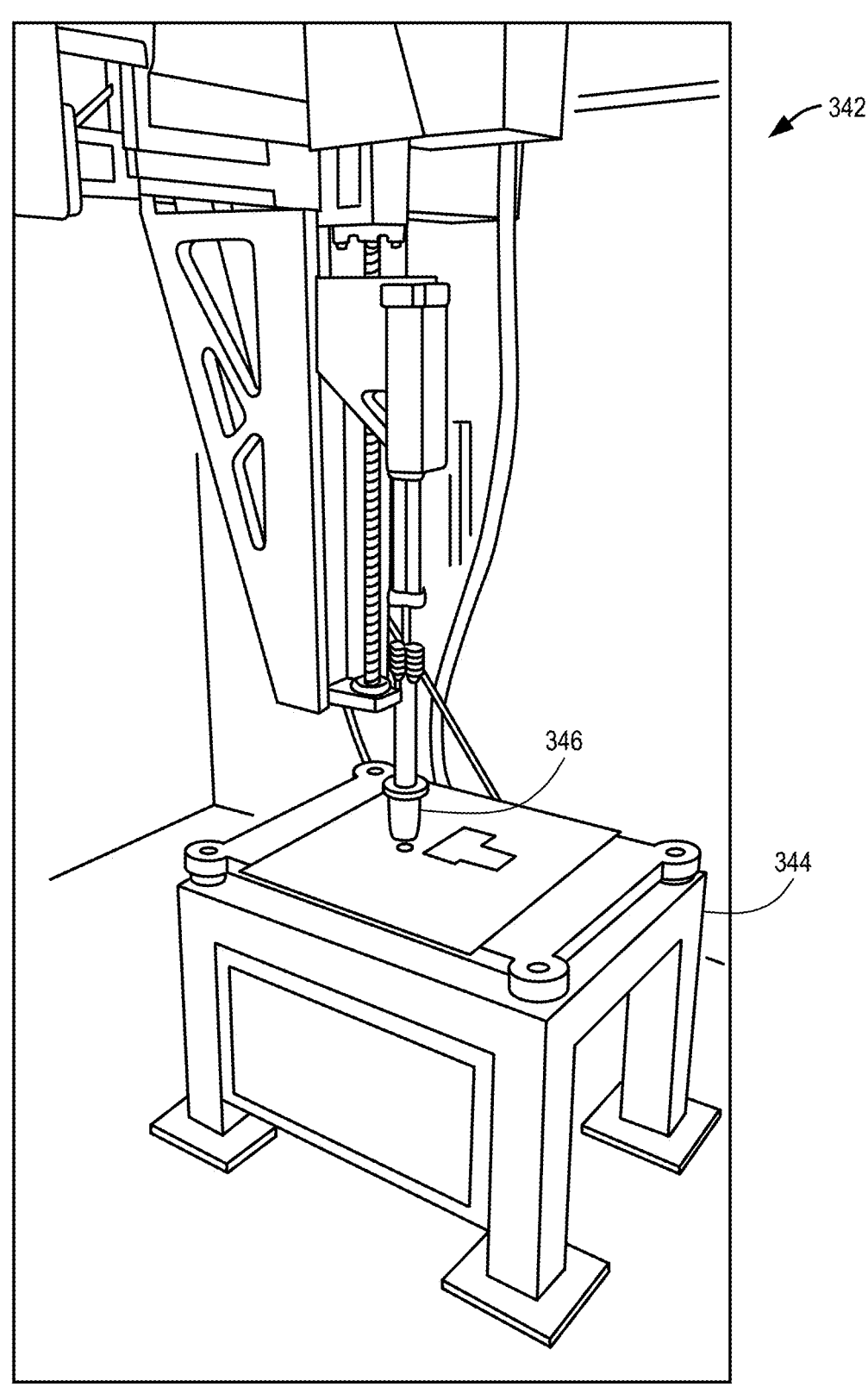
FIG. 41 is a perspective view of a manufacturing system according to an embodiment of the invention.

FIG. 41 shows an example of a manufacturing system 342 that includes a CNC stage 344 and a print head 346 used to fabricate parts by the ordered powder approach. In this specific example, the print head 346 is capable of depositing three different powders at specific flow rates. A small vibrating transducer is used within each powder deposition channel to partially or completely fluidize the powder. An integrated shutter allows for the rapid switching of the individual powders.

Each deposition channel is also equipped with a number of small transducers that monitor the flow of the powder. These transducers are small tank circuits that resonate at frequencies that couple well to the individual powders. A frequency limit is set for the each flow transducer. In general, good coupling occurs when the diameter of the particles in the powder are greater than approximately 4 to 6 times the skin depth of the material. This sets the lower bound of the frequency limit for the flow transducer.

The transducer has a specific impedance when no powder is within the inductive portion of the tank circuit. This impedance changes significantly when powder is present and when powder is flowing in through the inductive portion of the circuit (i.e., the coil). Thus, by measuring the impedance of the tank circuit, it is possible to measure the flow characteristics of the powder through the powder deposition tube.

The ordered powders are fabricated by controlling and measuring the flow of powder from the print head 346 that is mounted on a CNC stage 344, which is controlled by a computer.

Figure 42A:
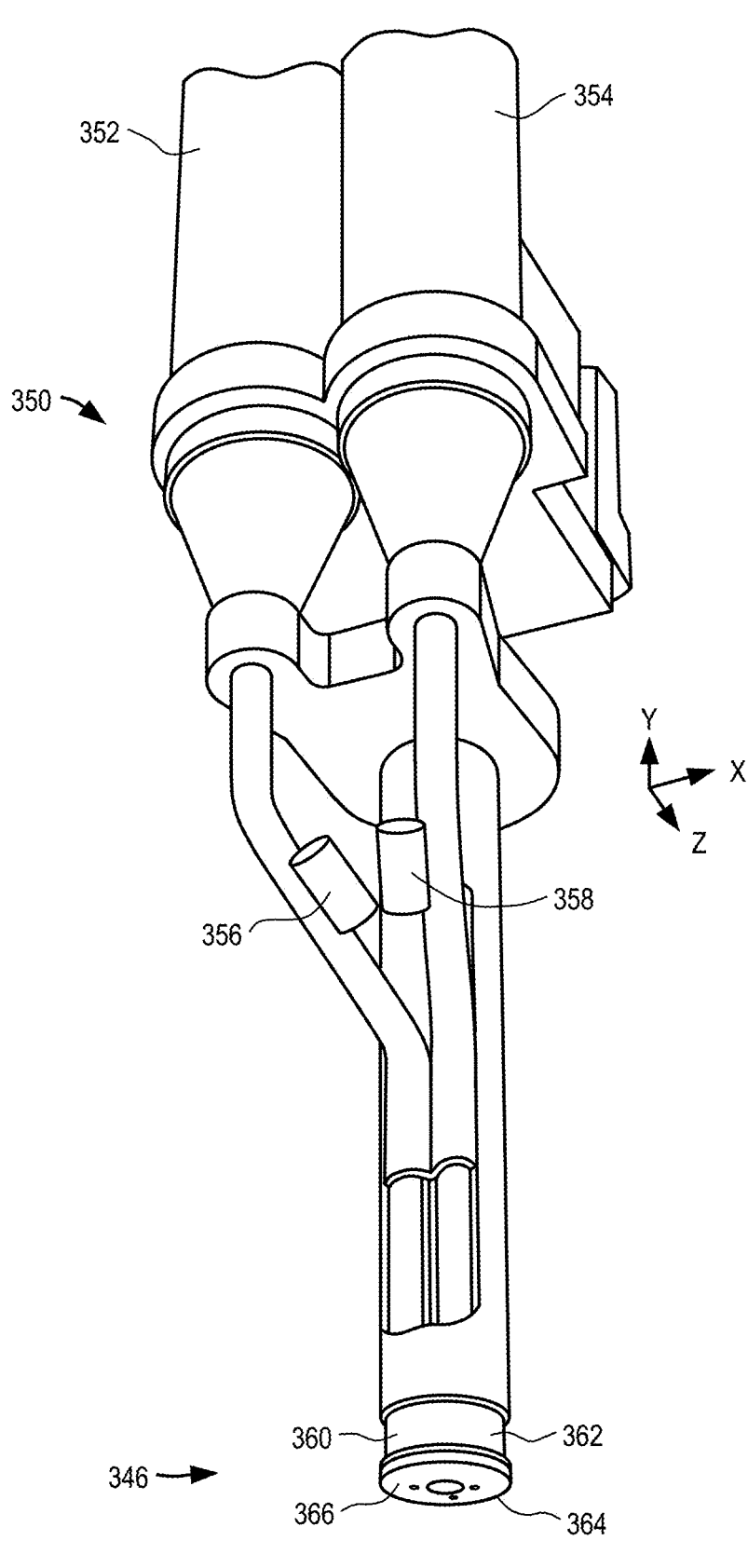
FIGS. 42*a* to 42*b* are perspective views of a print head forming part of the system in FIG. 41.
Figure 42B:
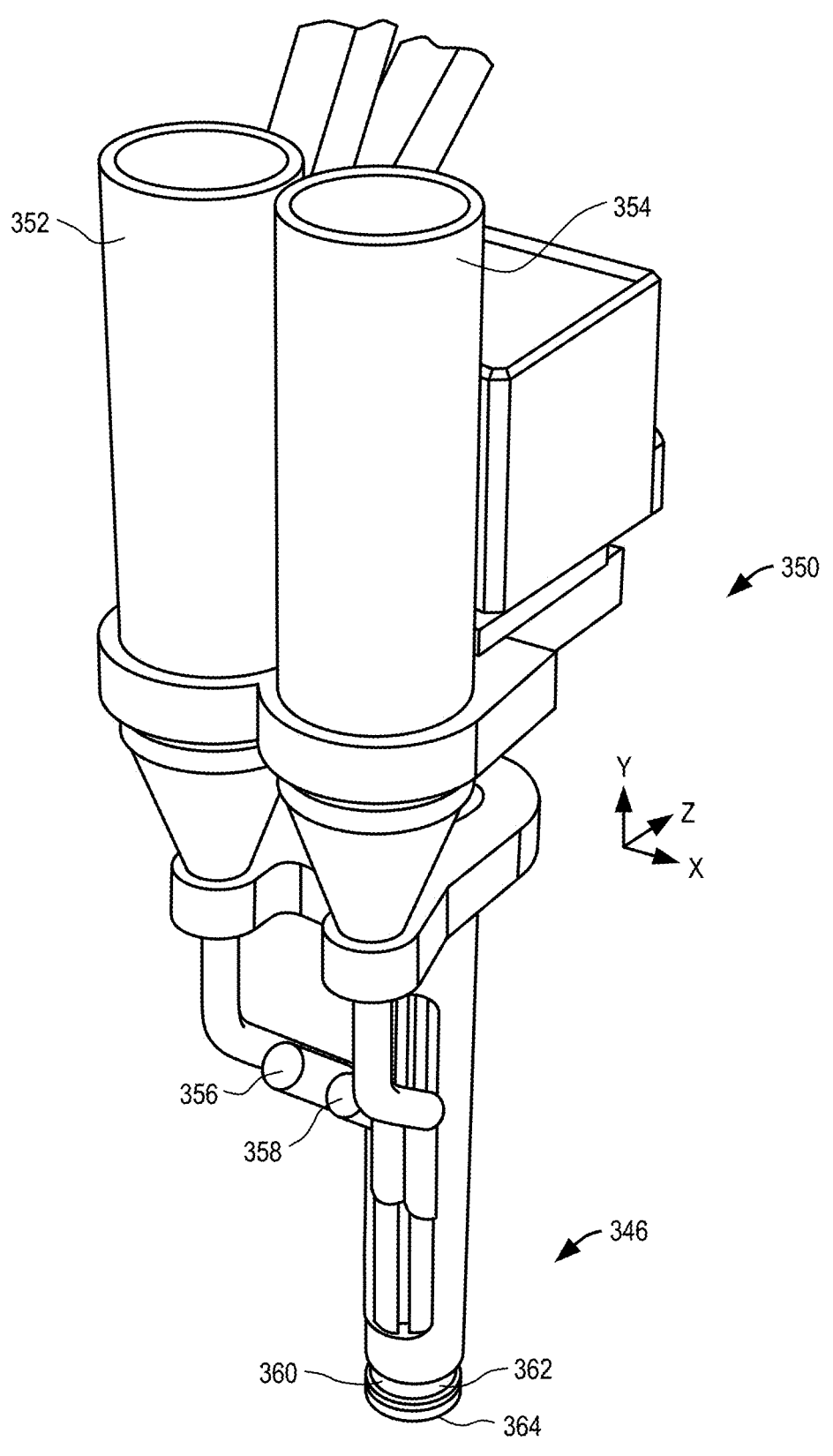

FIG. 42*a-b* show a two-powder advanced Ordered Powder Lithography (OPL) powder deposition system 350 forming part of a manufacturing system according to an embodiment of the invention. This system consists of first and second powder hoppers 352 and 354, first and second vibrating transducers 356 and 358, first and second powder flow sensors 360 and 362 and an integrated powder shutter 364. A bottom surface 366 of the shutter 364 also serves to screed the powder to form a flat, level surface. The shutter 364 forms part of an OPL print head 346 of the system 350.

In additive manufacturing it is critical to have well defined dimensions of the material that is deposited. Powder flowing from a nozzle on a surface will generally form into a loose pile with an angle specific to the particular powder. This angle is known as the angle of repose of the powder. FIGS. 43*a-b* show a schematic of a typical cross section of powder 390 that has been deposited on a supporting surface 392. As shown in FIG. 43*a*, if the powder 390 is allowed to "free fall" from the OPL print head 346, the powder 390 will form a loose pile with an angle of repose 394 specific to the powder 346. This will result in a broad line that becomes wider with distance from the surface 392 (or powder bed). As shown in FIG. 43*b*, by moving the OPL print head 346 very close to the surface 392, however, the powder flow is limited to a much narrower region. In this case, nearly vertical walls 396 can be achieved with the OPL print head 346. In addition, the flow of powder is self-limiting with the lower surface 366 of the print head 346 near the surface 392 of the substrate. Powder 390 will flow out of the nozzle 398 and stop when there is no more room underneath the print head 346. As soon as the print head 346 moves, however, powder will begin to flow if the specific powder shutter valve (not shown) is open.

This self-limiting, self-screeding, shuttered, multi-powder deposition system allows for the controlled deposition of one or more powders, thus enabling the ordered powder lithography method. FIG. 44 shows a bottom surface 366 of the OPL print head 346. A shutter actuator 372 rotates (moves) the shutter 364 from a first position to a second position. The shutter 364 dispenses the first powder without dispensing the second powder when the shutter 364 is in the first position and the shutter 364 dispenses the second powder without dispensing the first powder when the shutter is in the second position. The shutter 364 includes multiple openings 370, each being capable of depositing a separate powder or combination of two powders.

OPL is an AM technique that permits the rapid structured deposition of metallic (or other) powders to form a three-dimensional part. The method uses powder metallurgy techniques to sinter material with the use of heat. However, unlike conventional powder metallurgy techniques in which a powder is loaded into a pre-made mold and compacted, OPL additively deposits material that forms the part and the mold through the same layer-by-layer AM process.

Figure 45A:
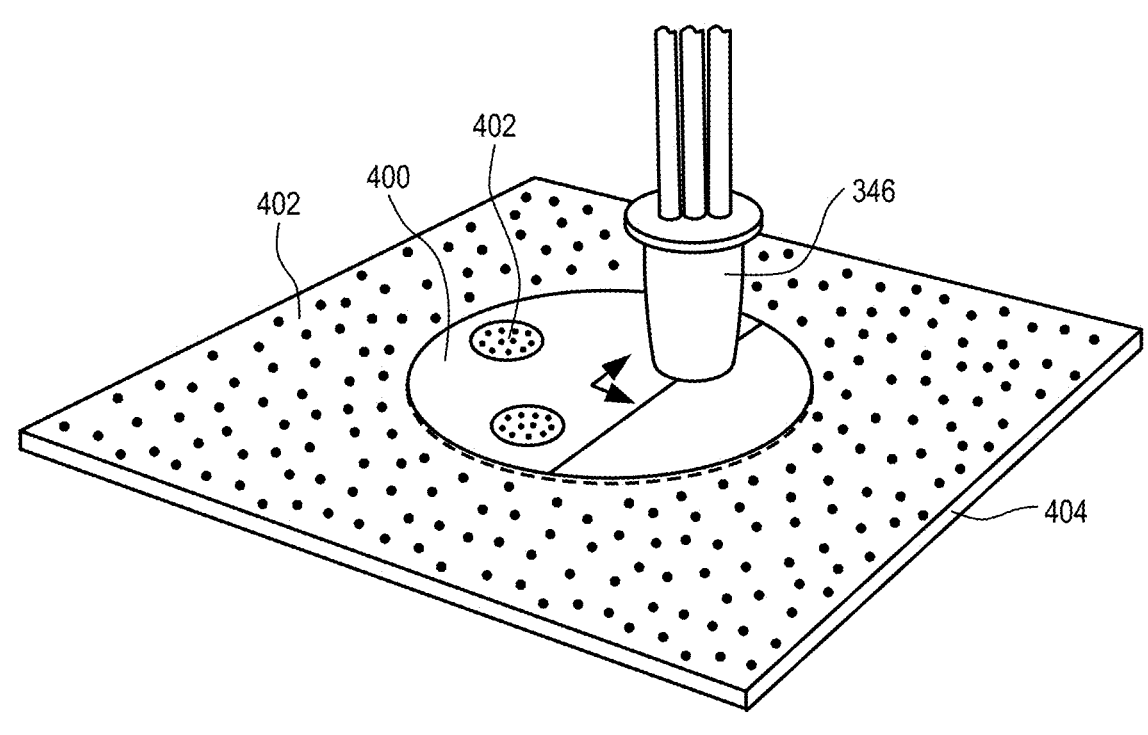
FIGS. 45*a-45f* are perspective views illustrating the manufacture of a part with internal features.
Figure 45B:
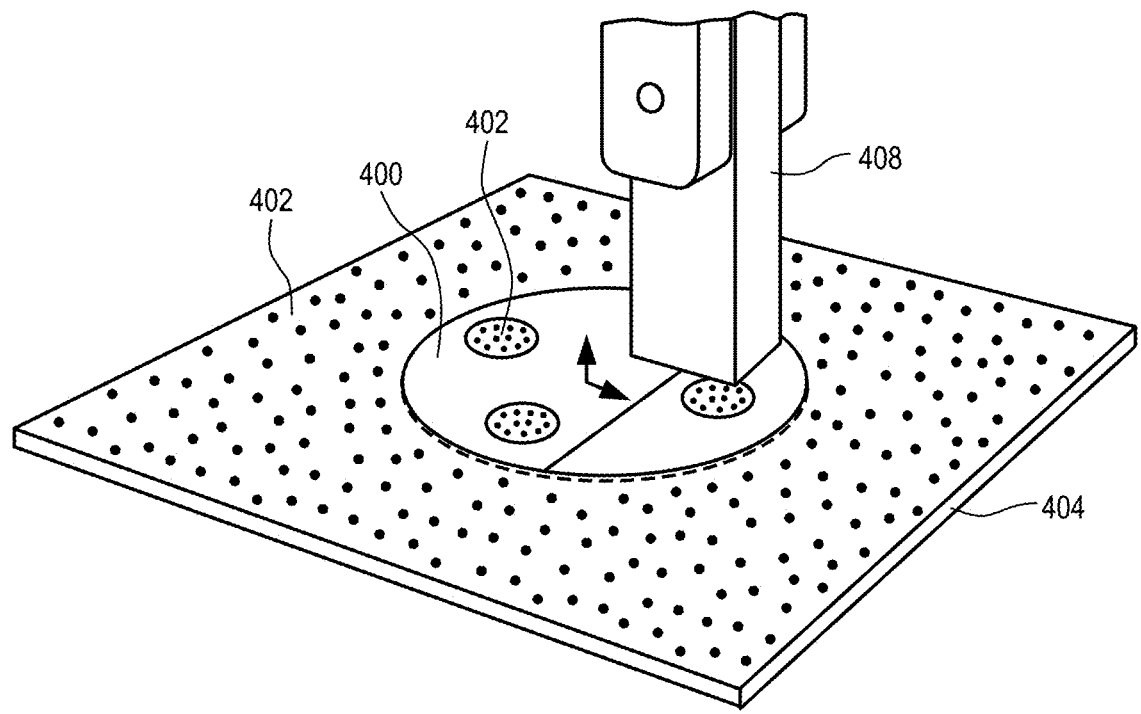
Figure 45C:
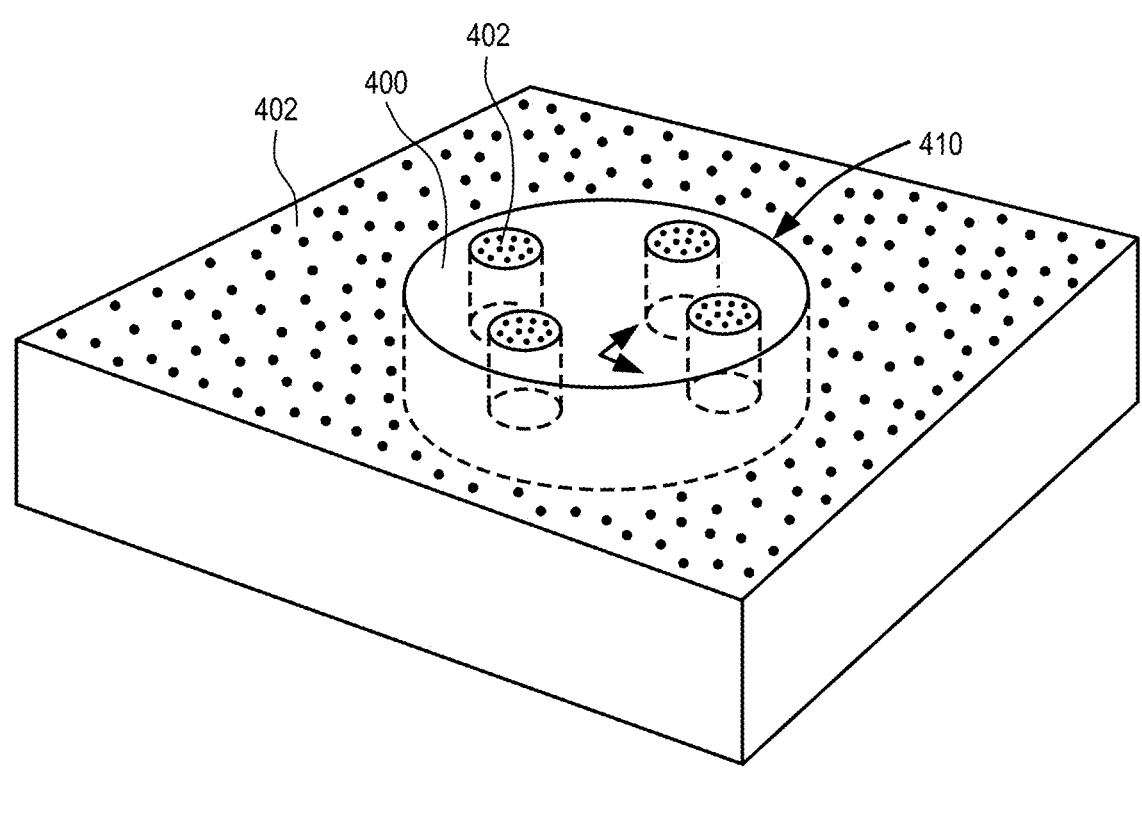
Figure 45D:
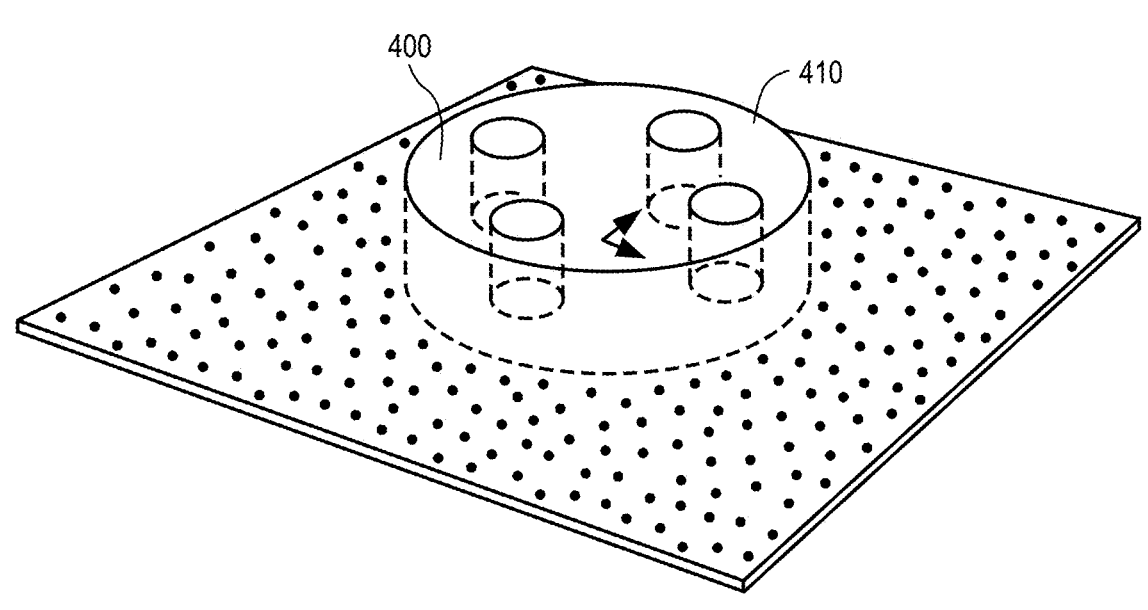
Figure 45E:
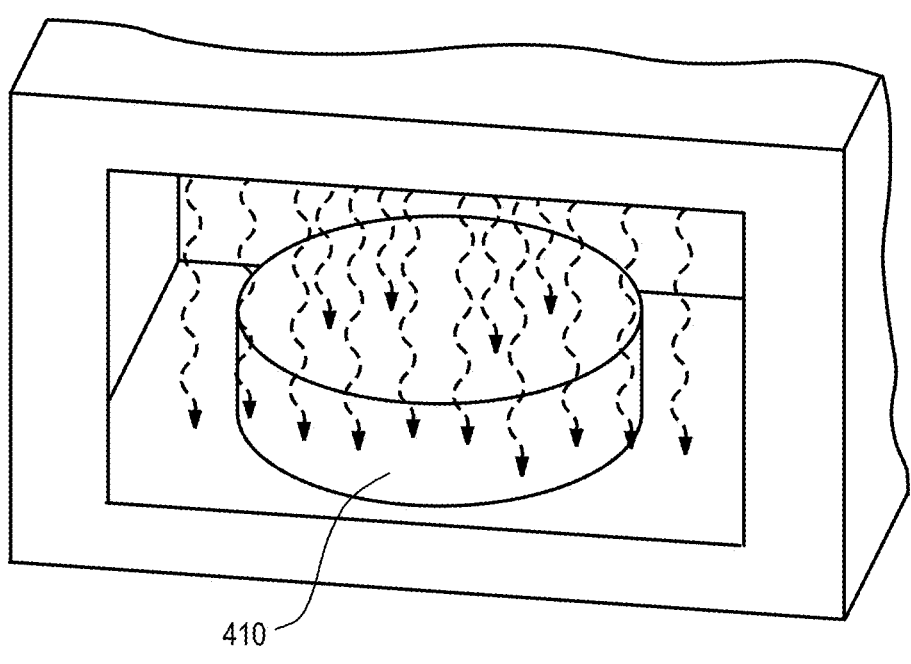
Figure 45F:
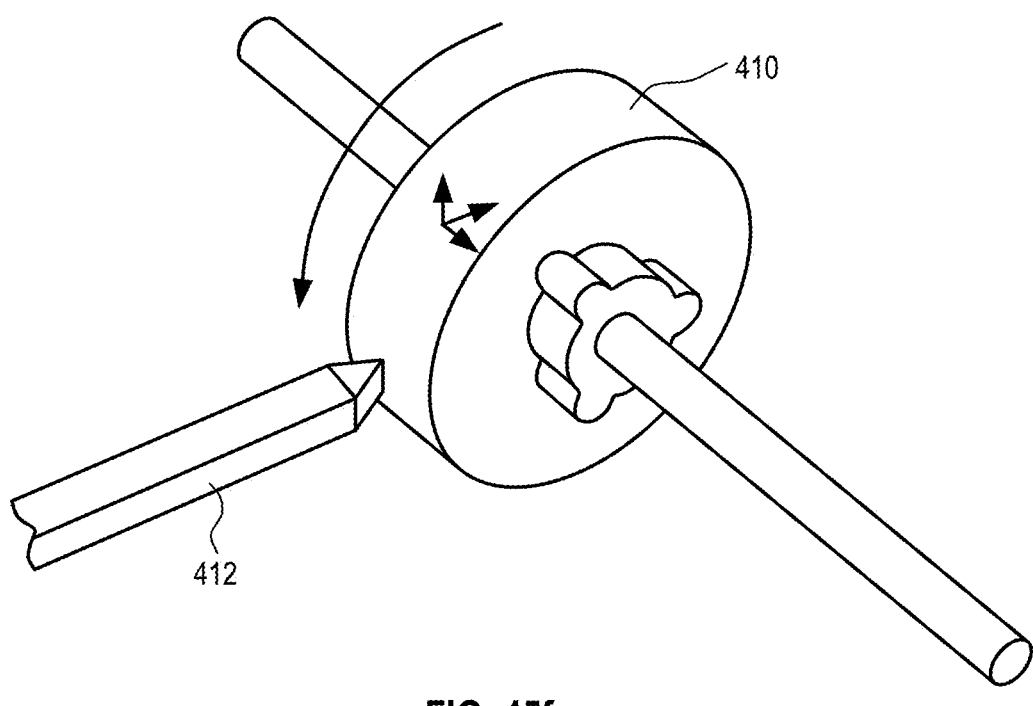

As illustrated in FIG. 45*a*, the print head 346 deposits positive powder 400 and negative powder 402 to a form an ordered powder layer 404 in shapes specified by a computer aided manufacturing (CAM) program. As shown in FIG. 45*b*, the layer 404 is loosely sintered using an MIS-based induction heater 408. As shown in FIG. 45*c*, the process is repeated on a layer-by-layer basis to form a "green" part 410 that has structural integrity both within and between each layer. As shown in FIG. 45*d*, the negative material 402 is then removed from the part 410. The green part 410 is then fully consolidated using a variable duty cycle high power induction heating process or other equivalent energy source that results in the consolidation of the powder layer. Unlike other AM techniques, OPL does not necessarily require binders (as in binder jetting techniques) and is not based on progressive consolidation of a small point of material in a powder bed (as in laser or e-beam methods). As shown in FIG. 45*e*, the part 410 may be subjected to further heat treatment using a post-processing heater. As shown in FIG. 45*f*, a machining apparatus 412 may be used to machine the part 410 to its final specifications and tolerances.

As can be seen above, OPL technology is an AM Lithographic Technique that uses positive and negative materials in powders. Negative powders form volumes that are not sintered by heating at a specific temperature and are used to define the exterior boundaries of the part (additively forming a mold) as well as the interior volumes. Positive powders are those that are sintered by heating at a specific temperature to form the three-dimensional green part. Multiple types of powders can be used to fabricate a part, permitting graded material fabrication that cannot be achieved by other additive methods.

Figure 46A:
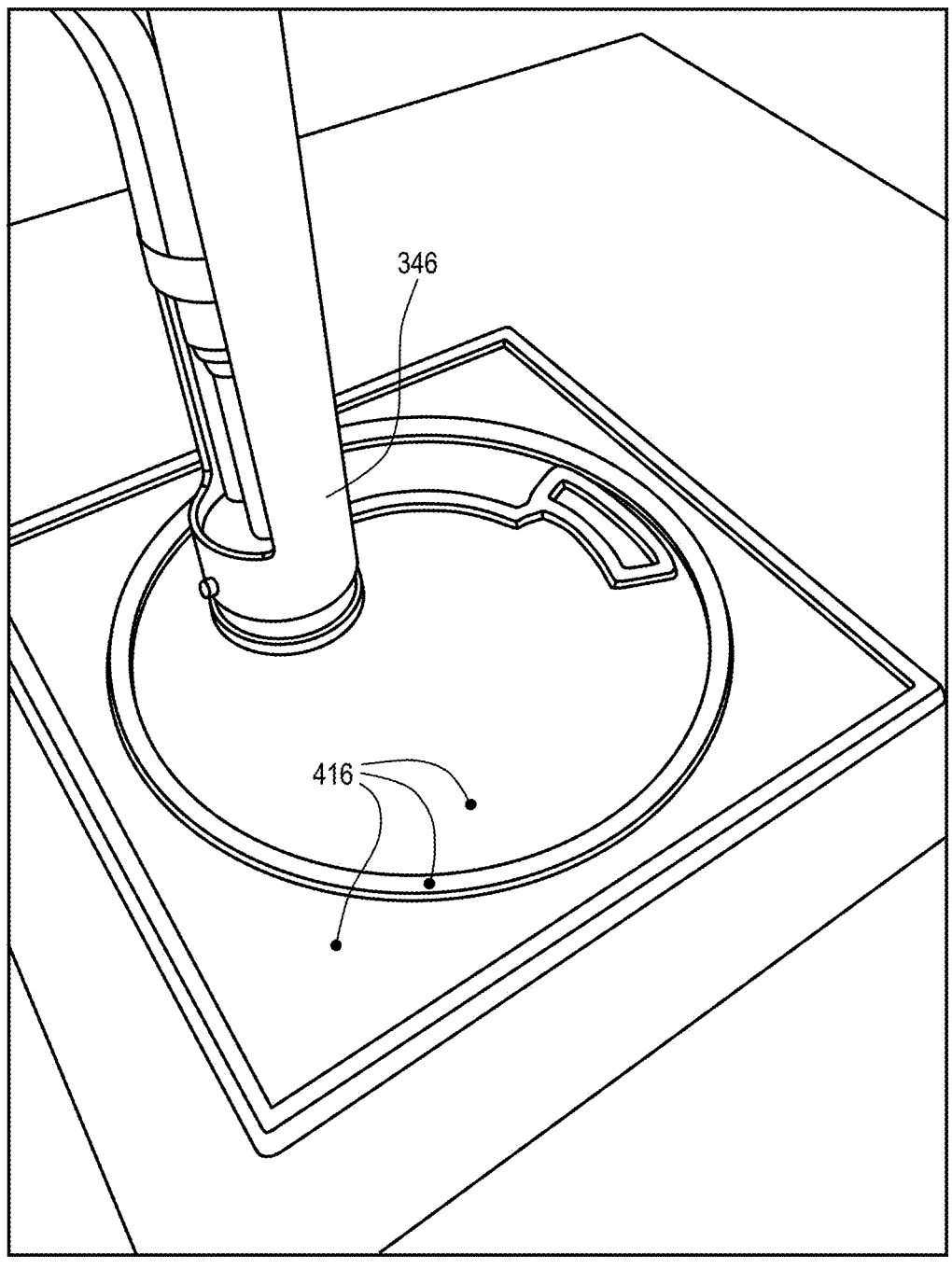
FIGS. 46*a* and 46*b* are perspective views illustrating deposition of positive and negative powders.

FIGS. 46*a* and *b* show the use of the print head 346 that is used as an OPL 3D printer. Powder is deposited on a layer-by-layer basis through a series of fine nozzles with mass flow meters in the print head 346. Different negative materials 416 and positive materials 418 can be deposited through each nozzle as the print head is swept over the build surface. Parts with graded material structures are those in which the material varies from one portion of the part to the other. The printer has a separate print head (not shown in FIGS. 46*a* and *b*) with MIS transducers that are swept across the powder layer after each layer is deposited to sinter positive powders through high frequency induction heating. Alternatively, the printer may integrate the powder deposition and MIS print heads.

The green part is brought to full density in a separate furnace using variable duty cycle induction heating or any other heating process that results in achieving the desired materials properties of the final part. The induction heating process is operated at tuned frequencies and pulsed duty cycles that permit material consolidation without damaging the multi-layer material structure. The particles are thus selectively heated using induction heating and by tuning an induction frequency to heat the first particles preferentially over the second particles, and by using pulsed duty cycles to heat the first particles preferentially over the second particles.

Many materials can be used in the OPL printer. These include metals, plastics, polymers, non-metals, ceramics, reactive materials, and un-reactive materials. If the powder flows well using the OPL print head and at least one material is partially or fully consolidated using a layer-by-layer or bulk energy source, then complex parts can be fabricated using the technology.

Other features of the OPL system:

System is "self-leveling"—Any reservoir or "build cartridge" can be inserted in the system without necessarily leveling the build surface relative to the print head 346. A build cartridge is usually an open top box that the powders are deposited into. We have made them from metal, refractory fire brick, and graphite. Any material can be used if it is stable under the heat treatment conditions. Because the powder flow is self-limiting and self-screeding, a true and level surface is created in the first powder layer that is deposited. This first powder layer serves as a foundation for the rest of the build.

Non-spherical particles are good negative materials— non-spherical free-flowing particles tend to not move in the individual powder layer and thus hold the shape of the positive material. Tungsten powder is particularly good for this application because of the powder morphology, very high melting temperature, and high density. Casting sands (such as Zircon, alumina and magnesium oxide) are also good candidate materials. These materials do not sinter at temperatures typically used to sinter/consolidate most metals. In addition, most metals do not wet these materials.

Automatic powder hopper fill—The system can be equipped with an automated powder hopper that will fill the powder reservoirs on the print head when needed. This can be a timed system (e.g. fill after a fixed number of layers) or a system equipped with a sensor such as an optical sensor to detect the level of powder the powder reservoirs on the print head, or a gravity-flow system with flexible powder feed tubes.

Powder is deposited in a controlled fashion using the self-screeding, self-limiting nozzle described previously. The tool path is generated by taking a 3D model of the part, slicing the part into well defined "2D" sections, and generating a path for each powder that creates a 2D representation of the slice with a given thickness. By stacking these slices, a 3D part can be fabricated. The tool path consists of:

Negative powder perimeter moves
Negative powder in-fill moves
Positive powder perimeter moves
Positive powder in-fill moves
Travel moves
Powder clearing moves In this tool path, the perimeters are typically deposited first, followed by the in-fill regions. There may be certain geometries, however, where the in-fill is deposited first. Any number of positive or negative materials may be deposited in the toolpath. The number of materials depends on the specific OPL print head used to fabricate the part.

Travel moves are moves during which all powder shutters are off and the print head 346 is moving to the next print position. These moves may be a direct line from the previous position, or may be programmed to avoid any region that does not contain the previous powder. For example, after depositing a positive in-fill, the shutter will close and the travel path may be a long route that avoids all positive powder regions and passes only over negative regions. This will reduce or eliminate any cross contamination of the different powders.

Powder clearing moves are coordinated complex moves that serve to move a small amount of powder from the internal of the powder shutter and deposit this material in a "safe" region. When the powder shutter closes, there is a rotating or linear movement that stops the flow of powder from the accumulator. As this moves, there is an associated movement of the print head that compensates for the shutter movement and effectively keeps the powder in the shutter at the same position on the powder bed build surface. The control program then evaluates all possible positions adjacent to this position that satisfy one of the following criteria:

The powder clearing position has the same powder that is in the shutter.

The powder clearing position is a minimum distance from the any position that contains another powder.

Ideally the powder clearing position is not yet filled with powder from the toolpath. This would occur if the perimeter was deposited first and the powder clearing position was located within the in-fill region of the same powder.

The powder clearing position can only be reached by a straight or continuous path that only contains the same powder as the powder in the shutter.

The powder clearing position is typically slightly higher in the z-direction, which allows the remaining powder in the shutter to slowly flow out of the space and fully empty the shutter. With the proper selection of the powder clearing position, the small amount of extra powder becomes fully incorporated into the existing or subsequent powder layer and is not detectable in the final build.

Figure 47A:
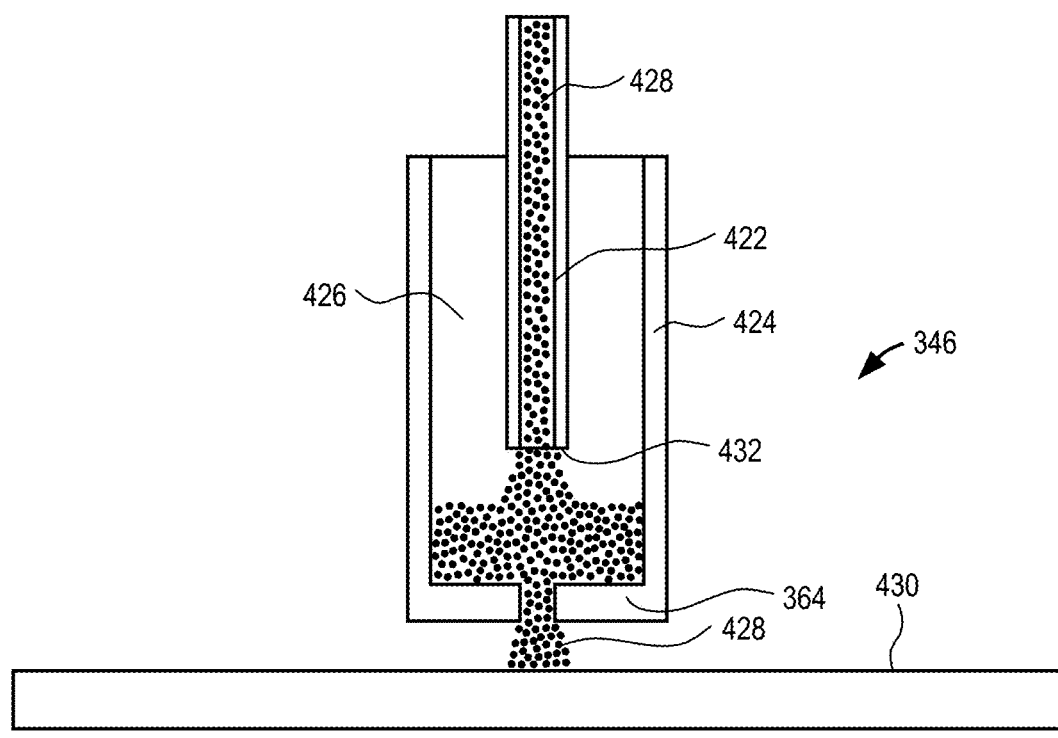
FIGS. 47*a-b* are cross-sectional side views illustrating a self-limiting regulator for powder flow.

As discussed previously and further illustrated in FIGS. 47a and b, the OPL print head 346 is a self-limiting, self-screeding system that creates powder traces with well-defined dimensions. This is achieved by incorporating a powder hopper system, which may include a mechanical fluidization system, with a powder accumulator that regulates the flow of powder to the build. The print head 346 includes a feed tube 422 and a powder hopper 424. The powder hopper 424 forms a powder accumulator 426. As shown in FIG. 47 a, powder 428 is directed through the feed tube 422 into the powder hopper 424 and accumulates within the powder accumulator 426. The feed tube 422 is vibrated and fluidizes the powder 428 in the powder accumulator 426, which results an even flow of powder out of the shutter. The cross-sectional shape of this powder 428 on the surface 430 is determined by the distance between the screed formed by the print head 346 and the surface 430 on which the powder 428 is deposited.

Figure 47B:
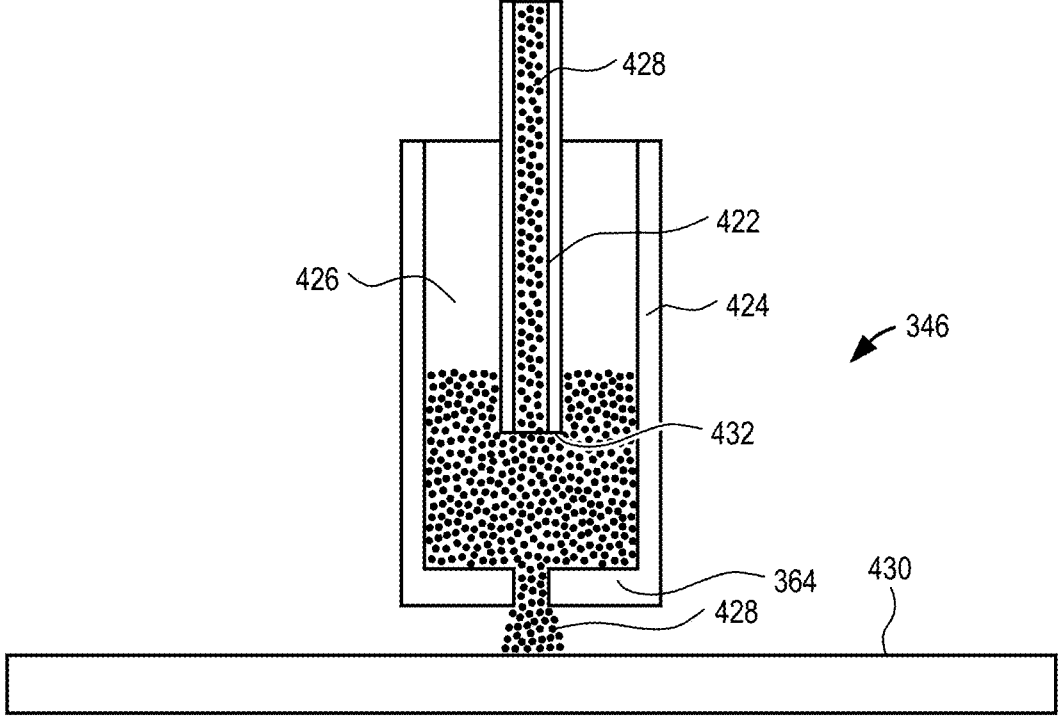

As shown in FIG. 47b, the powder accumulates within the powder accumulator 426 until the powder rises over a mouth 432 of the feed tube 422. The powder 428 then forms a natural powder cork over the mouth 432 of the feed tube 422. The cork prevents the flow of more powder 428 into the powder accumulator 426 until a level of the powder 428 in the powder accumulator 426 has dropped. This occurs even if there is a large quantity of powder in the hopper that feeds the vibrating powder feed tube 422. After a level of the powder 428 in the powder accumulator 426 has dropped, the powder 428 does not form a cork anymore and more of the powder 428 then flows through the feed tube 422 into the powder accumulator 426.

Figure 46B:
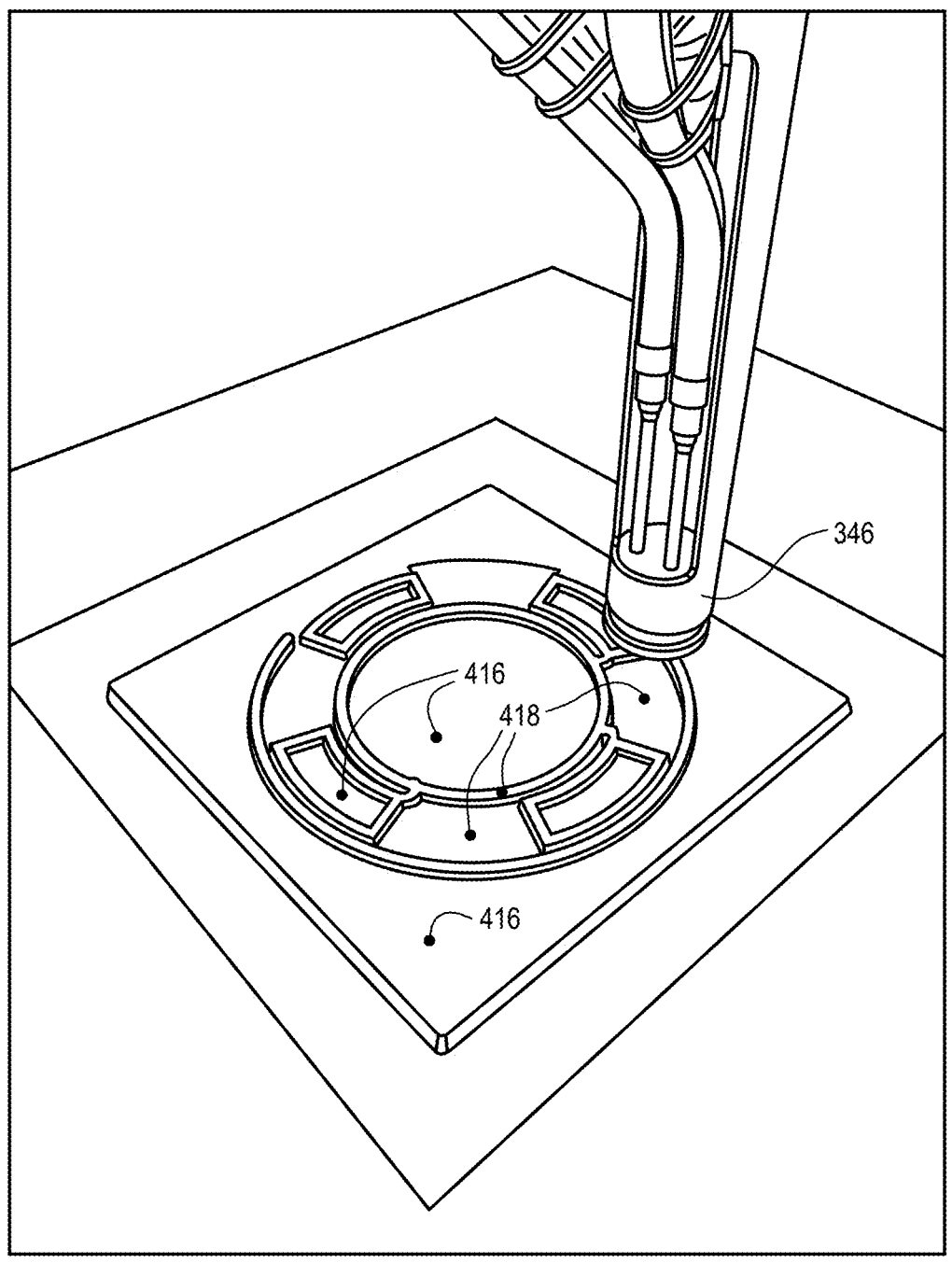

The print head shown in FIGS. 46a-b deposits a positive and negative powders onto a powder bed. This print head configuration can be expanded to accommodate any number of powders. These powders, for example may consist of an iron or iron alloy material, a copper powder, and a negative powder. The negative powder, as usual, should be inert with respect to the iron or copper powders, so as to serve as the relatively unsintered mold/holder in the process.

Figures 48A, 48B, 48C, 48D:
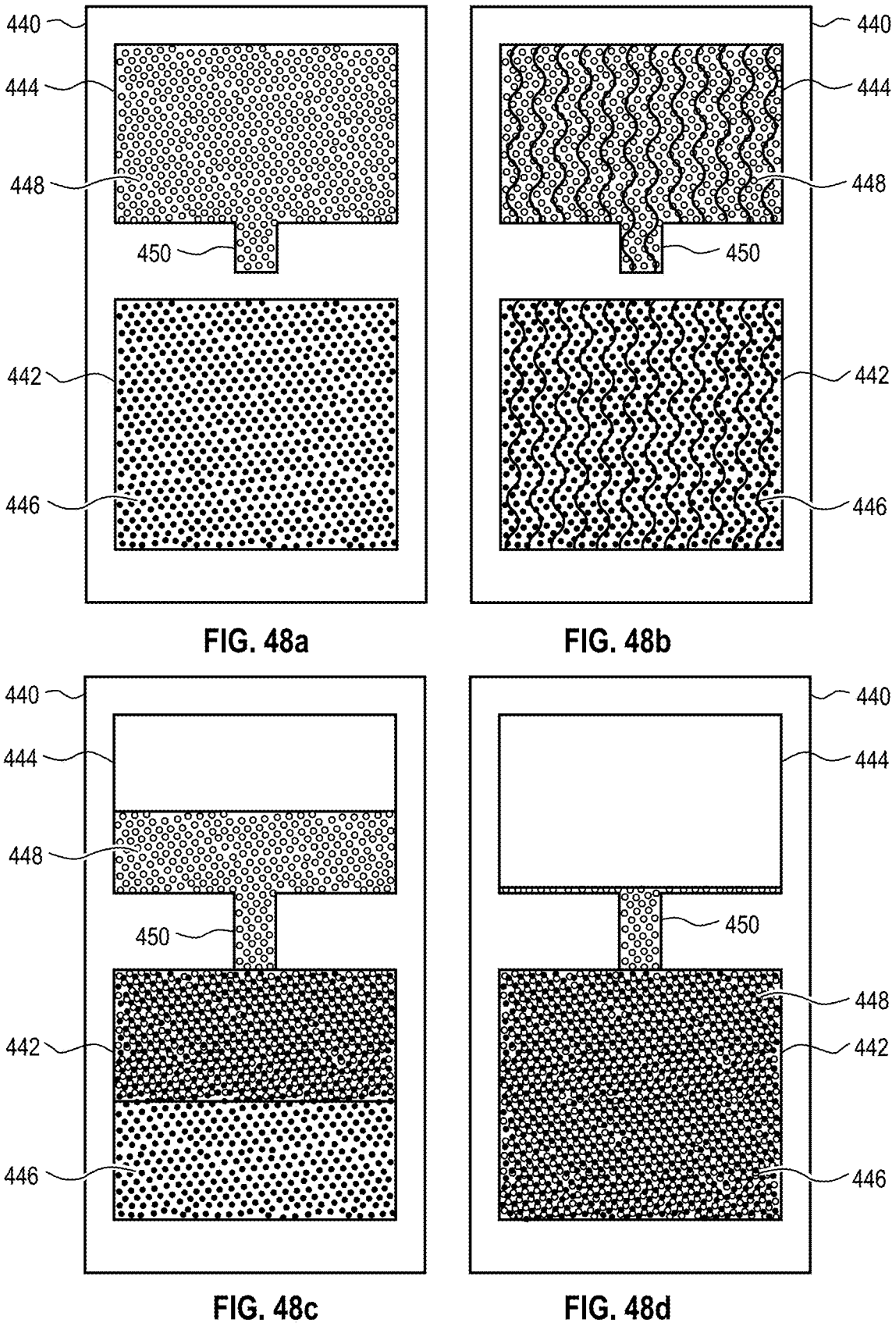
FIGS. 48*a-d* are cross-sectional side views a manufacturing method according to the invention that includes an infusion of a material.

FIGS. 48a to d illustrate that, by using multiple powders, it is possible to first sinter and then infiltrate a given part with another material. As shown in FIG. 48a, a holder 440 is formed out of a negative material to define the first and second volumes 442 and 444. First particles are of a first material 446 are held within the first volume 442. A second material 448 is held within the second volume 444. The negative material forming the holder 440, the first material 446 and the second material 448 are formed using the layer-by-layer approach as herein described.

As shown in FIG. 48*b*, the first particles are of a first material 446 and are sintered to connect the particles to one another. In another embodiment, another connection scheme can be used to connect the particles, for example a scheme that includes a press and/or a binder. If the particles are sintered, a heater, preferably an MIS induction heater, is positioned to heat the first particles to a first temperature to connect the first particles to one another. The first particles have voids between them and connecting the first particles leaves the voids within the first material.

As shown in FIGS. 48*c* and *d*, a heater is positioned to heat the second material 448 so that the second material 448 melts and flows into the first material 446. The negative material forming the holder 440 also forms a passage 450 with a smaller cross-section than the second volume 444 connecting the second volume 444 to the first volume 442 for directing the second material 448 under the force of gravity from the second volume 444 through the passage into the first volume. The passage 450 thus forms an infiltration system directing the second material into the voids so that the second material infiltrates the first material. After the first material 446 is infiltrated with the second material 448, the negative material forming the holder 440 can be removed, thus releasing the part from the negative material. This example shows the infiltration using gravity, but it is also possible to infiltrate the first material 446 using capillary action. In this case, the infiltrant material 448 could be located at the same level as the first material, or even below the level of the first material. When the infiltrant material becomes a fluid, it will naturally wick into the voids of the first material 446 by capillary action.

By way of example, an Iron (Fe)-based OPL part is fabricated in a standard build volume. After the layer by layer fabrication of the part is complete, an additional negative volume is deposited on top of the part. At a certain distance from the part, a volume of copper (Cu) powder is deposited. This powder will act as the infiltrant in the fabrication process.

The entire assembly is then heated to sufficient temperature to bring about sintering, while not reaching temperatures required for liquid phase sintering or melting. This could result in the loss of features in the part.

At around 950° C., for example, both the Cu and the Fe alloy will partially sinter. The Fe alloy part will acquire some degree of structural integrity at this point, as will the copper volume. As the temperature is increased above the melting temperature of copper, the copper will melt and move towards the Fe-alloy part, which has a melting temperature well above that of copper. The molten copper will move through the voids in the Fe-alloy part and slowly infiltrate the material. Ideally, all voids in the Fe-alloy part will be infiltrated with copper and the resulting part will consist of a Fe-alloy substructure with a Cu matrix.

FIGS. 48*a* to *d* illustrate an example of reactive material deposition using an OPL technique. The OPL technique allows for the deposition of a number of powdered materials in an ordered fashion. In principle, certain positive materials can be reactive in nature. An article formed using this method may consist of a positive "containment" material that encloses one or more volumes of "reactive" powder that may behave in a specific manner upon mechanical, thermal or otherwise environmental conditions. The part should consist of the negative mold material, a positive material, and an additional material that is contained within the positive material. The positive material is sintered/consolidated under a post process treatment and contains the additional material. The additional "reactive" material may be sintered or may remain loose, but is contained within the positive material. The "reactive" material retains all reactive properties during the sintering/consolidation of the positive material.

FIGS. 49*a* to *c* illustrate aspects relating to coordinated movement of the print head 346 and the powder shutter.

The OPL print head consists of a shutter/screed system that regulates the flow of a number of powders into a powder bed. The shutter 364 itself may consist of a surface with a number of openings 370 of differing sizes that control the flow of powder from the powder accumulator to the surface of the powder bed.

The "X" in FIGS. 49*a* to *c* marks the reference point for the build. In the FIG. 49*a*, there is no flow of powder from the print head 346 through the shutter 364. In the FIG. 49*b*, the shutter 364 is rotated in a clockwise direction 460 to the larger of the two openings 370 in the shutter 364, and powder flows from the accumulator to the powder bed. When the shutter 364 closes as shown in FIG. 49*c*, it rotates in a counter-clockwise direction 462 back to the closed position. The shutter 364 thus rotates (moves) from a first position shown in FIG. 49*b* to a second position shown in FIG. 49*c* relative to the print head 364 to close the opening 370 forming a dispensing hole defined by the shutter 364. When the shutter moves from the first position to the second position, a finite mass of powder is retained in the opening 370 of the shutter 364. To maintain print integrity, the print head 346 undergoes a simultaneous coordinated motion 464 while the shutter 364 rotates in the counter-clockwise direction 462 in order to keep the remaining finite mass of powder in the same position "X" on the powder bed. The remaining powder is then moved to the "powder clearing position" as described previously.

Figures 50A, 50B, 50C, 50D, 50E, 50F, 50G, 50H, 50I, 50J, 50K, 50L, 51A, 51B, 51C, 51D, 51E, 51F, 51G, 51H, 51I:
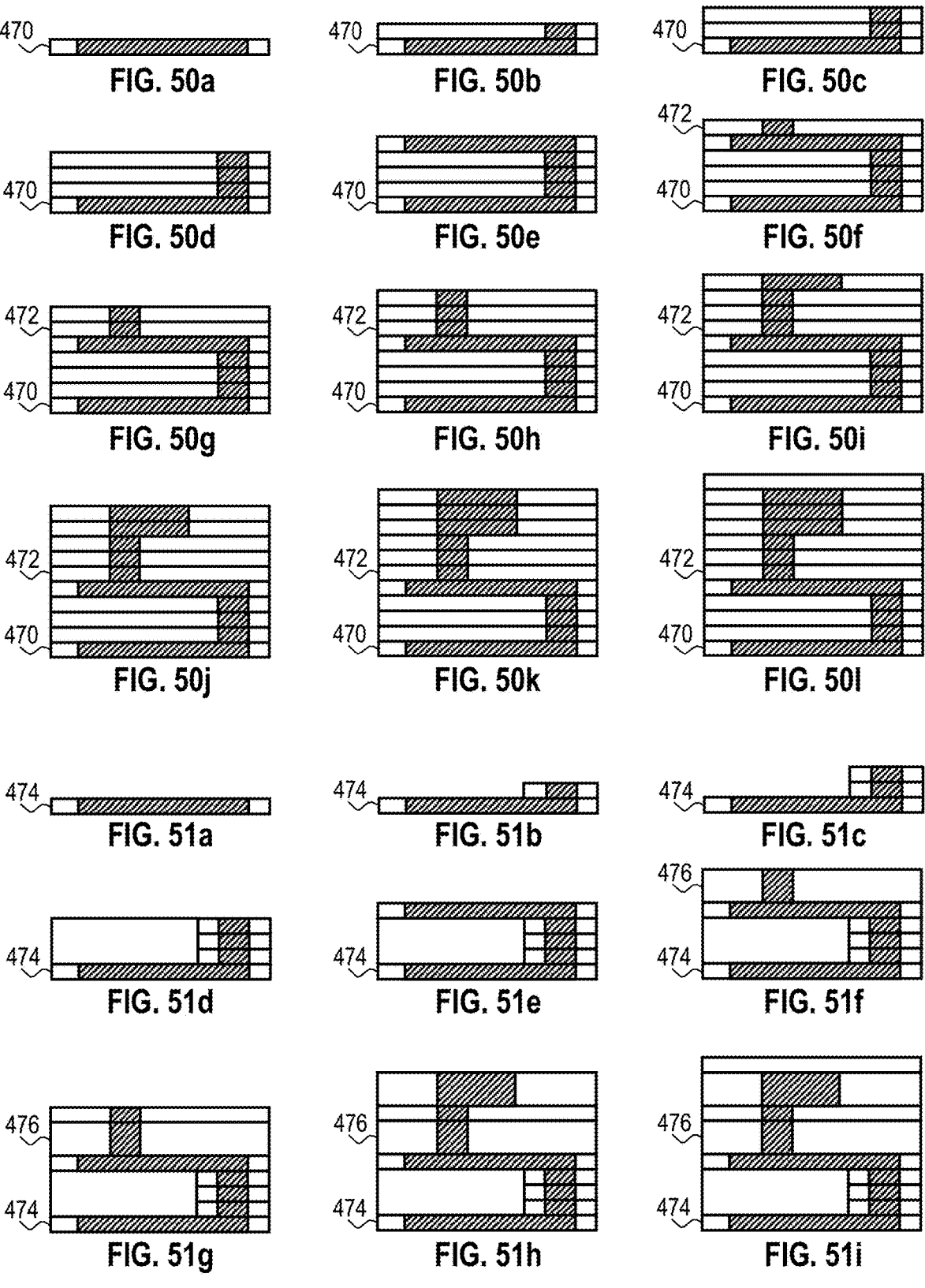

FIGS. 50 and 51 show aspects of the invention that relate to variable thickness layers that are used in a build. As shown in FIG. 50, in conventional additive manufacturing, a layer 470 of powder is deposited and some of that layer 470 is fused together using an external energy source (e.g. laser, electron beam). Because the energy that is absorbed penetrates only a short distance, it is necessary to fabricate the part (indicated by the cross-hatching) using relatively thin, uniform layers (e.g. the layers 470 and 472) of powder. Layer-by-layer consolidation of a material with a given uniform thickness results in a slow build up of a complex part.

In the OPL process, shown in FIG. 51, it is not necessary to constrain the build to uniform thicknesses of the build. Instead, the fabrication of the part can be optimized by using build layers of varying thicknesses (e.g., the layers 474 and 476) based on the geometry of the part. If a portion of the part requires high resolution, for example, the thickness can be reduced to accommodate the finer detail of the part. For large structures, or large regions of negative powder, it is faster to use larger OPL print head nozzles and thicker layers to build up the part. This is illustrated in FIG. 51, which shows the fabrication of the same part shown in FIG. 50. Varying thicknesses of layers may be accomplished by positioning the print head further from a deposition surface for thicker layers than for thinner layers, while depositing all necessary materials in a given layer with two or more internal or external nozzles of the print head.

An advantage of OPL is that it provides complete part support using negative powders. It is well known that powder bed additive manufacturing methods require the addition of supporting structures in the fabrication of parts with large overhangs. Supporting structures of this kind are required because the powder bed has a relatively low density and cannot support the mass of a consolidated overhang in the build structure. OPL, which is a powder based AM method, does not require extensive supporting structures during the fabrication process. It may be that is necessary in some circumstances to fabricate supports to manufacture an extremely complex part, but it is not a requirement of the technique.

Figure 52:
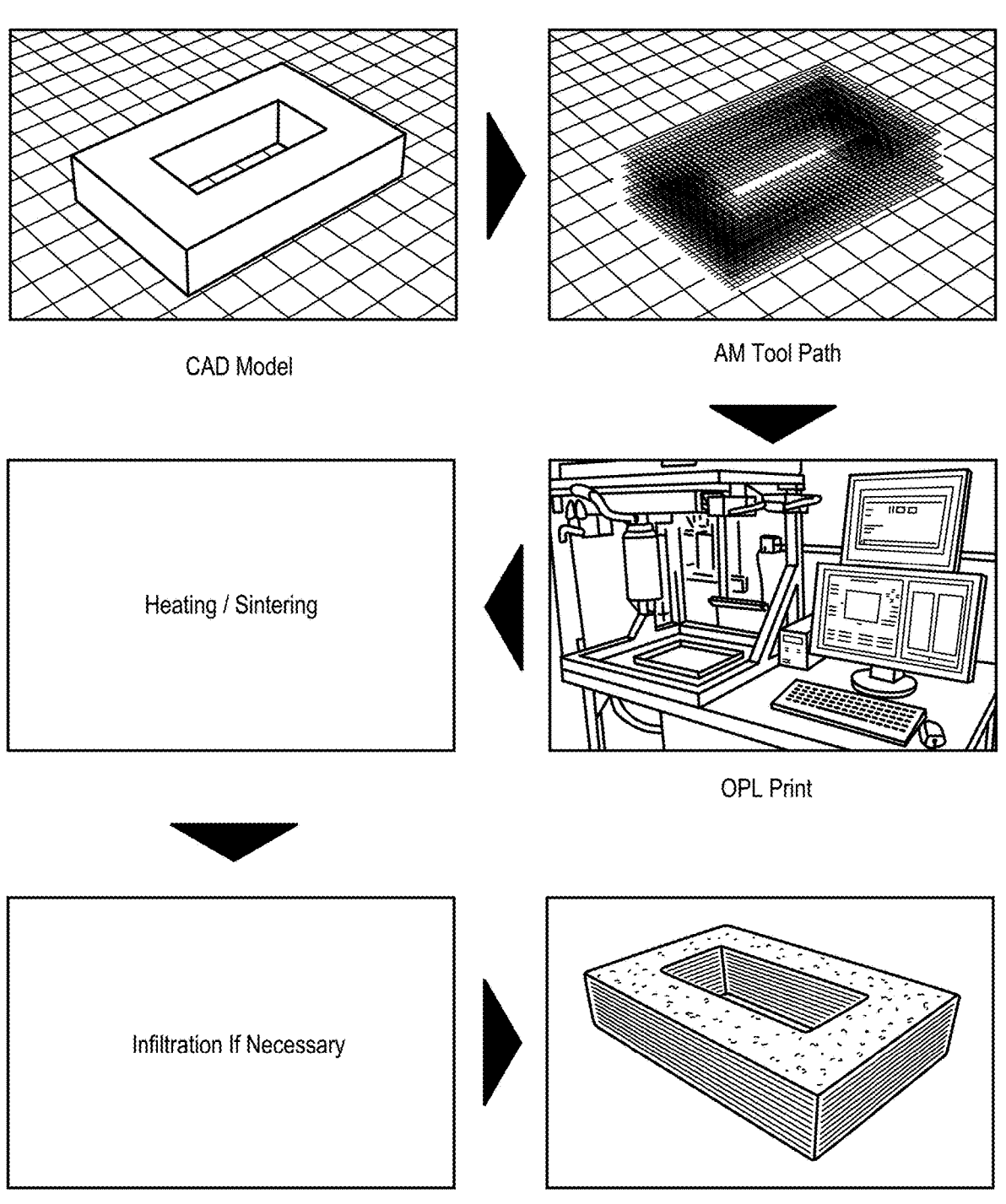
FIG. 52 includes schematics illustrating an integrated method for part fabrication.

FIG. 52 shows the overall process of part fabrication using the OPL build process. First, the part is designed in a computer-aided design (CAD) program. This 3D design is then "sliced" into 2D layers and a tool path is generated. The tool path is uploaded to the OPL printer, which creates a 3D image of the part and mold using two or more powders. This cartridge is then subjected to post-processing methods (e.g. heating, infiltration, etc.) to create the final near net shape part.

Negative powder materials, in general, may be a material that does not sinter at the processing temperatures required to form the green part. Partial sintering is acceptable as long as the positive material is more mechanically robust. Tungsten, Zircon, Silicon Carbide, Alumina, WC, and Chromite are examples of negative materials.

Positive powder materials are usually materials that sinter or react at the processing temperatures to form the green part. Iron and iron alloys, copper and copper alloys, aluminum and aluminum alloys, titanium and titanium alloys, and ceramic powders are examples of positive powders.

Figures 53A, 53B, 53C, 53D:
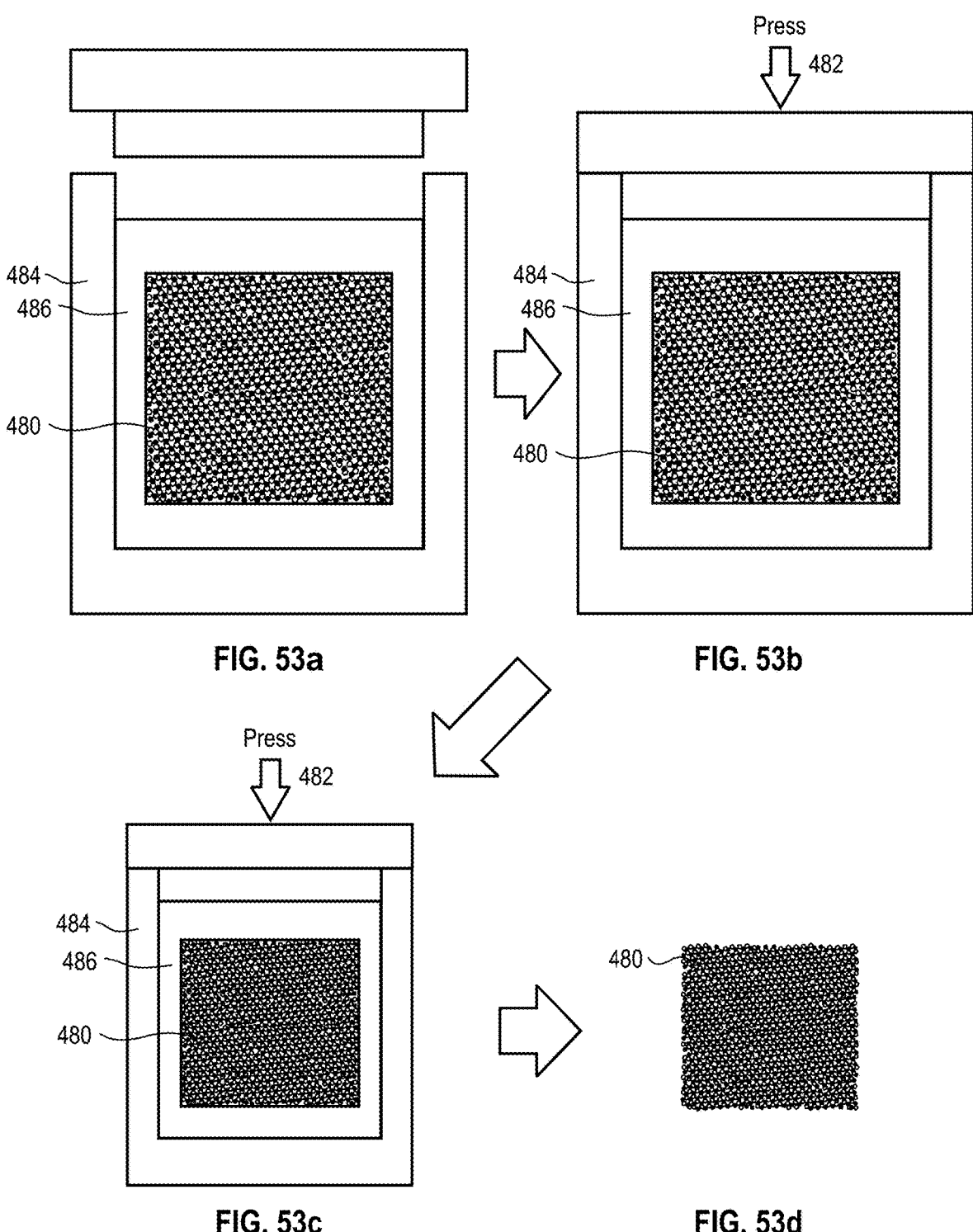
FIGS. 53*a-d* are cross-sectional side views a manufacturing method that includes the use of a press.

FIGS. 53a to d illustrate that it is possible to fabricate the part 480 using OPL technique and a cold isostatic press (CIP) 482. In FIG. 53a the powders are formed directly into a flexible mold 484 using the OPL technique described above. The positive material forms the part 480 within a negative material 486. In FIG. 53b the mold is degassed, sealed, and inserted into a cold isostatic press 482. In FIG. 53c the powders are compressed under hydrostatic pressure, which increases the density of the packed powders. In this case, the positive powder may require a small amount of binder so that the green part stays together. The use of binders in powder metallurgy is well known in the field.

Unlike the previous part fabrication process, the "green" part in this case was formed from and ordered powder method and pressed to shape using the cold isostatic press (CIP). In FIG. 53d, the green part is removed from the mold 484 and subjected to the usual heat treatments designed to increase the density and improve the mechanical properties of the material of the heat treated part.

FIGS. 53a to d thus provide an example of a connection scheme that includes a mold 482 suitable for locating the first and second powders and a pressurizing device (the press 482) suitable for creating a pressure to increase the density of the first powder under pressure. The connection scheme includes a binder included in the first powder.

Similar to the OPL/CIP process, high-density metal or ceramic parts can be fabricated using a Hot Isostatic Press (HIP) and a metal mold. In this case, the ordered powders are formed within a metal container. The metal container is degassed, sealed, and loaded into a HIP at elevated temperatures and pressures. The elevated temperatures of the hip transfers heat to the mold and the powders, thereby increasing a temperature of the mold and the powder. The resulting part has positive powder that reaches near-full to full density after the HIP process. In this example the connection scheme includes a press heater to increase a temperature of the mold.

Complex structures using internal chemistry can be manufactured following the OPL technique. High performance intermetallic materials, in general, are difficult to form into complex shapes using conventional machining methods. A materials such as gamma Titanium Aluminide (TiAl), for example, display high strength at high temperatures but is known to be difficult to machine. An alternative approach to fabricating complex parts from these materials is to form the part using precursor material (e.g. Ti and Al) and then heat the part to form the gamma TiAl part. In this case the Ti and Al powders are mixed in the proper proportions and printed as the positive powder in an OPL printer. Any number of negative powder materials may be used as long as there is no detrimental reaction with the precursor components. Upon heating, the gamma TiAl is formed in the shape of the precursors.

An alternative method involves the printing of a Ti part with partial sintering. This green Ti part may then be infiltrated with Al metal and held at a temperature at which the gamma TiAl phase forms. Though this method is described using TiAl as an example, any number of intermetallic or multiple element phases of materials can be fabricated into complex shapes using this process. Other examples include; WC/Co, W/Ni, $MgB_2$/Ga, Ti/MgZn and more.

Note: this process may be used to form intermetallic materials into complex shapes, but it can also be used to form alloys into complex shapes. For example, copper powder can be printed into a shape and then infiltrated with tin to form a bronze part.

Figure 54A:
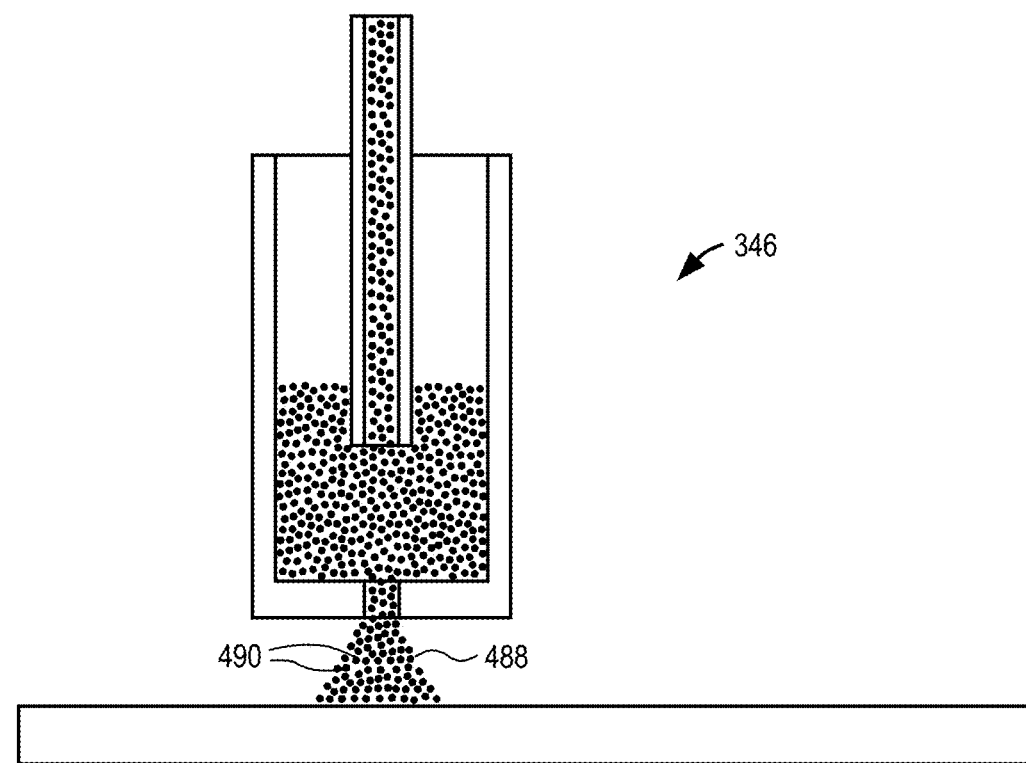
FIGS. 54*a* and 54*b* are cross-sectional side views illustrating deposition of positive and negative powders at different times.
Figure 54B:
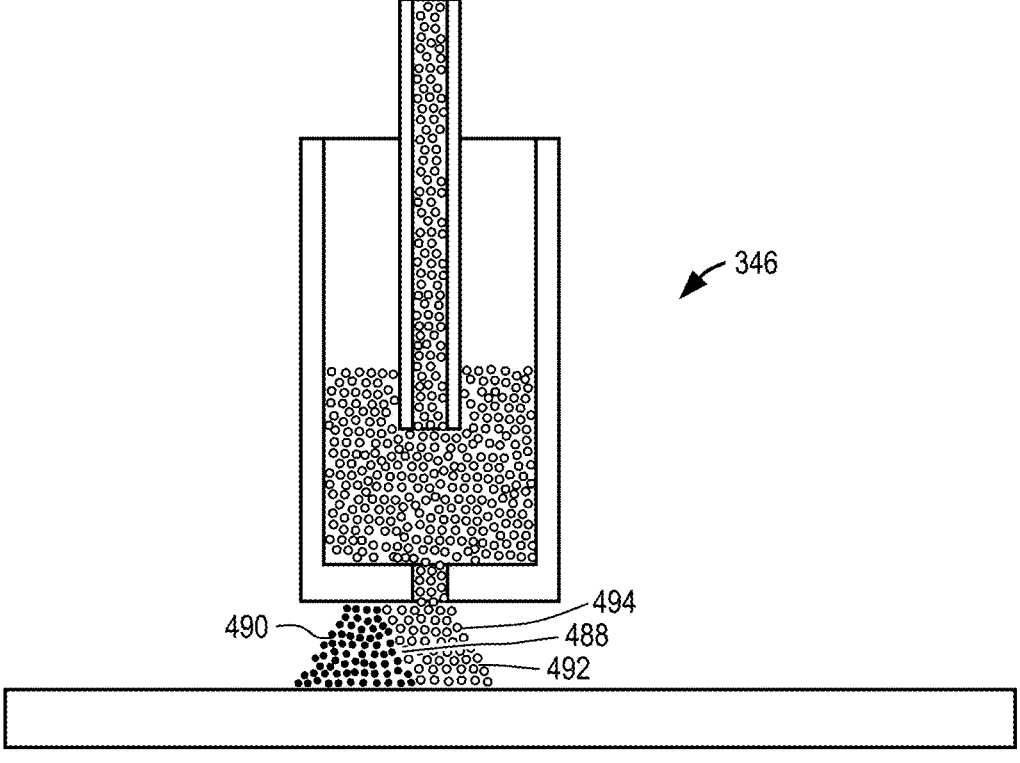

As illustrated in FIGS. 54a to d, high deposition rates can be achieved by increasing the OPL print head speed and by increasing the layer or slice thickness of the build. As illustrated in FIG. 54a, for large slices, the angle of repose 488 of the specific powder may lead to a loss of resolution of the ordered powder structure 490 due to the powder being deposited on the build surface at a height that results in a significant angle. As shown in FIG. 54b, as the next powder is deposited, it forms a structure 492 that fills over the top of the other powder in the region defined by the angle of repose and displays another angle 494 on the side of the deposited powder structure 492 opposing the previously deposited powder structure 490.

Figures 54C, 54D:
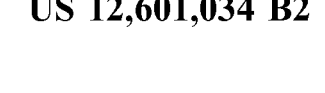
FIGS. 54*c* and 54*d* are cross-sectional side views illustrating the use of a print head that causes simultaneous deposition of positive and negative powders.

FIG. 54c illustrates a print head 500 that deposits positive and negative powders at the same time. The print head 500 includes a first hopper 502 for a positive powder 504 and a first nozzle 506 through which the positive powder 504 flows out of the first hopper 502 to form a first volume 508. The print head 500 further includes a second hopper 510 for a negative powder 512 and a second nozzle 514 through which the negative powder 512 flows out of the second hopper 510 to form a second volume 516. The positive and negative powders 504 and 512 are simultaneously deposited onto the substrate 518. The first volume 508 is in contact with the second volume 516 with an interface 520 between the first and second volumes 508 and 516.

By simultaneously depositing two powders 504 and 512, the resolution of the OPL part can be maintained. The volumes 508 and 516 formed by the two powders meet in the middle and fill up to the screed level. The interface 520 between the volumes 508 and 516 is nearly vertical with essentially no angle of repose. This method is ideal for the generation of thick perimeters in the two-dimensional (2D) build slice as the resolution of the boundary (and thus the part) is maintained. An alternative design is shown in FIG. 54d in which a thin mechanical barrier 522 is located between the two flowing powders. This barrier 522 moves with the print head and results in a highly defined interface between the two materials.

As described previously, the OPL print head can be equipped with a number of nozzle diameters. The build speed, or deposition rate, of the print head is determined by the print head speed, the diameter of the OPL nozzle, and the thickness of the build slice. In any given part, there are many deposition rates used in order to minimize the total deposition time of the part.

FIG. 55a-i show a schematic of the OPL process used to fabricate near net shape (NNS) parts. An original CAD model with details of the part is created and stored in computer memory (FIG. 55a). This representation of the part is a high resolution, complex 3D model of the part to be fabricated with all of the details. Most additive manufacturing methods use this as the fabrication target. In the NNS OPL process, the original CAD model is "blurred" and fine details are lost. The original CAD model is modified by eliminating fine details of the part in the original CAD model to render a fabrication target model (FIG. 55b). The fine details will be regained during a subtractive machining process, but for now the fabrication target model is a lower resolution representation of the original CAD model. An OPL tool path is then created (FIG. 55c). The OPL tool path is based on this lower resolution fabrication target model and not the original CAD model. The resulting tool path is much simpler and can be executed much more quickly than the high definition tool path that would be generated by from the original CAD drawing. The NNS tool path is uploaded to the OPL printer and the part is fabricated (FIGS. 55d and 55e). A print head is moved relative to a substrate based on the tool path (FIG. 55d). The first powder is formed and held in a shape according to the fabrication target model before connecting the first particles of the first powder to one another (FIG. 55e) to form a green part. At this stage, the green part is optionally machined to the details of the original CAD model (FIG. 55f). Depending on the part, it may be easier to infiltrate and/or consolidate the part to the final density before it is machined. The NNS tool path and part are simply used to reduce the printing time and provide a NNS form from which to create the near final machined green part.

This machined green part can then be further processed through infiltration (FIG. 55g) or heat treatments (FIG. 55h) under ambient pressure or elevated pressures to form the final part (FIG. 55i). For highly detailed parts, additional finish machining/grinding/polishing methods may be used. It can be seen that the objective is not to fabricate a detailed part from the outset, but rather to fabricate a lower resolution representation of the part quickly, and then to use conventional machining operations to add the detail to the final component. The print head forms the shape according to the fabrication target. The green part is then machined to the details of the original CAD model to form the part.

FIG. 56 shows control components of the manufacturing system 342, including the powder flow sensor 360, shutter actuator 372, vibrating transducer 356, a computer 600, heaters 602 and print head actuators 604. The computer 600 receives input from the powder flow sensor 360. A sensor scheme that measures the total mass of the build cartridge during the build may also be implemented. Input from a total mass measurement system allows the computer 600 to qualify the build for each layer and is an extra monitor on the flow of the powders. The computer 600 controls the shutter actuator 372, vibrating transducer 356, a computer 600, heaters 602 and print head actuators 604. The heaters 602 may be one or more heaters that may include layer-by-layer a consolidation heater, a bulk consolidation heater to consolidate multiple layers at the same time, an infusion heater and a post-manufacture heat treatment heater. One heater may perform one or more function. The computer 600 is programmable to perform the functions hereinbefore described. The components in the figure work together in the manner of a programmed robot that receives human input and feedback from its components such as the powder flow sensor 360 to fabricate a part.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art. A system has been described that uses relative movement of flux concentrators to create overlapping heat affected zones. Another system may not make use of relative movement without departing from the scope and spirit of the inventions. A static system may for example make use of an array of flux concentrators that create an array of heat affected zones. Although an array is generally rectangular, other layouts may be used depending on the intended purpose.

What is claimed:

1. A manufacturing system comprising:
a support structure; and
a deposition system that includes:
   a first powder hopper for holding a first powder having first particles of a first material;
   a second powder hopper for a second powder having second particles of a second material
   a print head having a first nozzle for directing the first powder from the first powder hopper onto a substrate to form a first volume, and a second nozzle for directing the second powder from the second hopper to form a second volume, the first and second powders being simultaneously deposited with the second volume in contact with the first volume with an interface between the first volume and the second volume, the second particles forming at least part of a holder suitable to hold first particles in proximity to one another, the print head having a lower surface that is sufficiently near the substrate for powder to flow out of the first nozzle and out of the second nozzle and stop flowing out of the first nozzle and out of the second nozzle when there is no more room below the print head;
   a print head actuator;
   a computer connected to the print head actuator, including:
   a processor;
   a computer readable medium connected to the processor;
   a set of instructions on the computer readable medium, the set of instructions executable by the processor to cause movement of the print head actuator for the print head actuator to move the print head relative to the support structure, causing the powder to resume flow out of the first nozzle and out of the second nozzle;
   a heating system which, when energized, connects the first particles to one another to form a part, wherein the first material is a positive material and the second material is a negative material so that the positive material preferentially connects the first particles to one another relative to the negative material connecting the second particles to one another, the positive material forming the part with an edge of the part defined by the interface.

2. The system of claim 1, wherein the heating system includes a heater and the particles are connected by heating the particles to consolidate the particles.

3. The system of claim 2, wherein the heater is an induction heater, laser heater, high intensity light heater, radiant heater or electron beam heater.

4. The system of claim 3, wherein the heater is an induction heater and the particles are selectively heated using induction heating and by tuning an induction frequency to heat the first particles preferentially over the second particles.

5. The system of claim 3, wherein the induction heater uses pulsed duty cycles to heat the first particles preferentially over the second particles.

6. The system of claim 1, wherein the computer is programmed to cause movement of the print head actuator for the print head actuator to move the first and second nozzles relative to the support structure to deposit a plurality of layers on one another, wherein at least a first of the layers includes a portion of the first material and a portion of the second material and at least a second of the layers includes a portion of the first material and a portion of the second material, wherein the first material of the second layer is in contact with the first material of the first layer, and the heating system connects the particles of the first material of the second layer to the first material of the first layer.

7. The system of claim 6, wherein the computer is programmed to move the first and second nozzles relative to the support structure to deposit the second volume within the first volume.

8. The system of claim 7, wherein the computer is programmed to move the first and second nozzles relative to the support structure so that the first volume entirely encloses the second volume.

9. The system of claim 6, wherein the computer is programmed to move the first and second nozzles relative to the support structure so that the first and second layers have different thicknesses.

10. The system of claim 6, the heating system further comprising:

a heater positioned to heat the first layer to consolidate the particles of the first material of the first layer before depositing the second layer on the first layer, and heat the second layer, after depositing the second layer on the first layer, to consolidate the particles of the first material of the second layer.

11. The system of claim 6, the heating system further comprising:

a heater positioned to simultaneously heat the first layer and the second layer to consolidate the particles of the first material of the first layer and the second layer.

12. The system of claim 3, further comprising:
a machining apparatus to machine the part.

13. The system of claim 12, wherein the part is a green part with structural integrity, further comprising:

a heater for heat treatment of the green part to form heat treated part.

14. The system of claim 1, further comprising:

a shutter that is mounted for movement from a first position to a second position; and a shutter actuator connected to the shutter, wherein the computer is programmable for the shutter actuator to move the shutter such that the shutter dispenses the first powder without dispensing the second powder when the shutter is in the first position and the shutter dispenses the second powder without dispensing the first powder when the shutter is in the second position.

15. The system of claim 14, wherein the computer is programmed to actuate the print head actuator and the shutter actuator such that:

(1) moving a shutter from a first position to a second position relative to the print head to close a dispensing hole defined by the shutter, such that, when the shutter moves from the first position to the second position, a finite mass of the first powder is retained in the hole of the shutter and at a location on the substrate, and (2) moving the print head while moving the shutter in a simultaneous coordinated motion to keep the finite mass of powder in the location on the substrate.

16. The system of claim 1, further comprising:
a vibrating transducer which, when activated, to partially or completely fluidize the first powder.

17. The system of claim 1, further comprising:
a flow transducer positioned to monitor flow of the first powder.

18. The system of claim 17, wherein the flow transducer is a tank circuit that resonates at a frequency that couples to the first powder.

19. The system of claim 18, wherein the computer is programmed to set a frequency limit wherein a lower bound of the frequency limit for the flow transducer is set so that diameters of the first particles in the first powder are greater than 4 to 6 times the skin depth of the material.

20. The system of claim 18, wherein the computer measures an impedance of the tank circuit to measure flow characteristics of the powder through the first powder.

21. The system of claim 1, further comprising:

a feed tube, the first powder being directed through the feed tube into the first powder hopper, the first powder hopper forming a first powder accumulator, the first powder accumulating within the first powder accumulator until the first powder forms a cork over a mouth of the feed tube, the cork preventing more of the first powder from entering the first powder accumulator until a level of the first powder in the first powder accumulator has dropped.

\* \* \* \* \*